United States Patent
Berestka et al.

(10) Patent No.: US 12,440,102 B2
(45) Date of Patent: Oct. 14, 2025

(54) SYSTEMS AND METHODS FOR ANALYZING THE EYE

(71) Applicant: Lightfield Medical Inc., Minneapolis, MN (US)

(72) Inventors: John S. Berestka, Minneapolis, MN (US); Jan Bonel, Gava (ES); Charilaos Gkinis, Megara (GR); Dimitrios Christaras, Athens (GR); Alexandros Pennos, Larisa (GR); Spyridon Tsoukalas, Athens (GR); Matthew Berestka, Minneapolis, MN (US)

(73) Assignee: Lightfield Medical Inc., Minneapolis, MN (US)

( * ) Notice: Subject to any disclaimer, the term of this patent is extended or adjusted under 35 U.S.C. 154(b) by 0 days.

(21) Appl. No.: 19/094,328

(22) Filed: Mar. 28, 2025

(65) Prior Publication Data
US 2025/0221622 A1    Jul. 10, 2025

Related U.S. Application Data

(63) Continuation of application No. PCT/US2024/054811, filed on Nov. 6, 2024.
(Continued)

(51) Int. Cl.
  *A61B 3/14* (2006.01)
  *A61B 3/00* (2006.01)
  *A61B 3/107* (2006.01)
(52) U.S. Cl.
  CPC ............ *A61B 3/145* (2013.01); *A61B 3/0083* (2013.01); *A61B 3/107* (2013.01)

(58) Field of Classification Search
  CPC ........ A61B 3/145; A61B 3/0083; A61B 3/107
  (Continued)

(56) References Cited

U.S. PATENT DOCUMENTS

| | | |
|---|---|---|
| 725,567 A | 4/1903 | Ives |
| 2,039,648 A | 5/1936 | Ives |

(Continued)

FOREIGN PATENT DOCUMENTS

| | | |
|---|---|---|
| CN | 102871643 A | 1/2013 |
| EP | 2527901 A2 | 11/2012 |

(Continued)

OTHER PUBLICATIONS

The Wayback Machine; https://web.archive.org/web/20230607064040/http://slitled.com/; SlitLED; 12 pages; archived Jun. 7, 2023.
(Continued)

*Primary Examiner* — Mohammed A Hasan
(74) *Attorney, Agent, or Firm* — Faegre Drinker Biddle & Reath LLP

(57) ABSTRACT

Medical devices and methods of use are disclosed to exam an eye of a patient. A medical device may include a digital projector as part of an illumination system. A medical device may include one or more cameras as part of an observation system to capture reflected light from the eye. The observation system may include one or more adjustable optical systems. The digital projector may produce a slit of light to be projected onto the eye. The slit of light and the observation system may be focused at a plurality of focal depths within the eye.

27 Claims, 38 Drawing Sheets

Related U.S. Application Data

(60) Provisional application No. 63/547,628, filed on Nov. 7, 2023.

(58) Field of Classification Search
USPC .......................................................... 351/206
See application file for complete search history.

(56) References Cited

U.S. PATENT DOCUMENTS

| | | |
|---|---|---|
| 2,427,689 A | 9/1947 | Harold et al. |
| 3,948,585 A | 4/1976 | Heine et al. |
| 3,971,065 A | 7/1976 | Bayer |
| 3,985,419 A | 10/1976 | Matsumoto et al. |
| 4,099,051 A | 7/1978 | Gugliotta |
| 4,180,313 A | 12/1979 | Inuiya |
| 4,193,093 A | 3/1980 | St Clair |
| 4,230,942 A | 10/1980 | Stauffer |
| 4,370,033 A | 1/1983 | Kani et al. |
| 4,383,170 A | 5/1983 | Takagi et al. |
| 4,422,736 A | 12/1983 | Nunokawa |
| 4,477,159 A | 10/1984 | Mizuno et al. |
| 4,504,129 A | 3/1985 | Van Iderstine |
| 4,580,219 A | 4/1986 | Pelc et al. |
| 4,642,678 A | 2/1987 | Cok |
| 4,661,986 A | 4/1987 | Adelson |
| 4,694,185 A | 9/1987 | Weiss |
| 4,715,704 A | 12/1987 | Biber et al. |
| 4,732,453 A | 3/1988 | De et al. |
| 4,774,574 A | 9/1988 | Daly et al. |
| 4,812,643 A | 3/1989 | Talbot |
| 4,838,678 A | 6/1989 | Hubertus |
| 4,844,617 A | 7/1989 | Kelderman et al. |
| 4,849,782 A | 7/1989 | Koyama et al. |
| 4,920,419 A | 4/1990 | Easterly |
| 5,000,563 A | 3/1991 | Gisel et al. |
| 5,076,687 A | 12/1991 | Adelson |
| 5,099,354 A | 3/1992 | Lichtman et al. |
| 5,189,511 A | 2/1993 | Parulski et al. |
| 5,202,708 A | 4/1993 | Sasaki et al. |
| 5,220,360 A | 6/1993 | Verdooner et al. |
| 5,248,876 A | 9/1993 | Kerstens et al. |
| 5,255,026 A | 10/1993 | Arai et al. |
| 5,270,747 A | 12/1993 | Kitajima et al. |
| 5,282,045 A | 1/1994 | Mimura et al. |
| 5,321,446 A | 6/1994 | Massig et al. |
| 5,349,398 A | 9/1994 | Koester |
| 5,361,127 A | 11/1994 | Daily |
| 5,387,952 A | 2/1995 | Byer |
| 5,394,205 A | 2/1995 | Ochiai et al. |
| 5,400,093 A | 3/1995 | Timmers |
| 5,436,679 A | 7/1995 | Ohtsuka et al. |
| 5,446,276 A | 8/1995 | Iyoda et al. |
| 5,493,335 A | 2/1996 | Parulski et al. |
| 5,548,354 A | 8/1996 | Kasahara et al. |
| 5,652,621 A | 7/1997 | Adams et al. |
| 5,659,390 A | 8/1997 | Danko |
| 5,659,420 A | 8/1997 | Wakai et al. |
| 5,668,597 A | 9/1997 | Parulski et al. |
| 5,717,480 A | 2/1998 | Brooks et al. |
| 5,729,011 A | 3/1998 | Sekiguchi |
| 5,748,371 A | 5/1998 | Cathey et al. |
| 5,757,423 A | 5/1998 | Tanaka et al. |
| 5,763,871 A | 6/1998 | Ortyn et al. |
| 5,793,379 A | 8/1998 | Lapidous |
| 5,883,695 A | 3/1999 | Paul |
| 5,912,699 A | 6/1999 | Hayenga et al. |
| 5,943,118 A | 8/1999 | Koschmieder et al. |
| 5,946,077 A | 8/1999 | Nemirovskiy |
| 5,949,433 A | 9/1999 | Klotz |
| 5,993,001 A | 11/1999 | Bursell et al. |
| 6,023,523 A | 2/2000 | Cohen et al. |
| 6,028,606 A | 2/2000 | Kolb et al. |
| 6,070,981 A | 6/2000 | Mihashi et al. |
| 6,072,623 A | 6/2000 | Kitajima et al. |
| 6,091,075 A | 7/2000 | Shibata et al. |
| 6,097,394 A | 8/2000 | Levoy et al. |
| 6,097,541 A | 8/2000 | Davies et al. |
| 6,137,535 A | 10/2000 | Meyers |
| 6,137,937 A | 10/2000 | Okano et al. |
| 6,192,162 B1 | 2/2001 | Hamilton et al. |
| 6,201,619 B1 | 3/2001 | Neale et al. |
| 6,201,899 B1 | 3/2001 | Bergen |
| 6,268,846 B1 | 7/2001 | Georgiev |
| 6,283,596 B1 | 9/2001 | Yoshimura et al. |
| 6,292,218 B1 | 9/2001 | Parulski et al. |
| 6,301,416 B1 | 10/2001 | Okano et al. |
| 6,320,979 B1 | 11/2001 | Melen |
| 6,339,506 B1 | 1/2002 | Wakelin et al. |
| 6,351,269 B1 | 2/2002 | Georgiev |
| 6,474,815 B1 | 11/2002 | Ulbers et al. |
| 6,476,805 B1 | 11/2002 | Shum et al. |
| 6,483,535 B1 | 11/2002 | Tamburrino et al. |
| 6,538,249 B1 | 3/2003 | Takane et al. |
| 6,575,575 B2 | 6/2003 | O'Brien et al. |
| 6,577,342 B1 | 6/2003 | Wester |
| 6,580,502 B1 | 6/2003 | Kuwabara |
| 6,597,859 B1 | 7/2003 | Lienhart et al. |
| 6,711,283 B1 | 3/2004 | Soenksen |
| 6,715,878 B1 | 4/2004 | Gobbi et al. |
| 6,738,533 B1 | 5/2004 | Shum et al. |
| 6,838,650 B1 | 1/2005 | Toh |
| 6,842,297 B2 | 1/2005 | Dowski, Jr. |
| 6,875,973 B2 | 4/2005 | Ortyn et al. |
| 6,900,841 B1 | 5/2005 | Mihara |
| 6,927,922 B2 | 8/2005 | George et al. |
| 6,934,056 B2 | 8/2005 | Gindele et al. |
| 7,015,418 B2 | 3/2006 | Cahill et al. |
| 7,019,671 B2 | 3/2006 | Kawai |
| 7,034,866 B1 | 4/2006 | Colmenarez et al. |
| 7,054,067 B2 | 5/2006 | Okano et al. |
| 7,085,062 B2 | 8/2006 | Hauschild |
| 7,109,459 B2 | 9/2006 | Kam et al. |
| 7,118,217 B2 | 10/2006 | Kardon et al. |
| 7,156,518 B2 | 1/2007 | Cornsweet et al. |
| 7,216,980 B2 | 5/2007 | Mihashi et al. |
| 7,336,430 B2 | 2/2008 | George et al. |
| 7,338,167 B2 | 3/2008 | Zelvin et al. |
| 7,377,644 B2 | 5/2008 | Davis |
| 7,377,645 B2 | 5/2008 | Wrobel et al. |
| 7,425,067 B2 | 9/2008 | Warden et al. |
| 7,458,683 B2 | 12/2008 | Chernyak |
| 7,485,834 B2 | 2/2009 | Gouch |
| 7,542,077 B2 | 6/2009 | Miki |
| 7,549,748 B2 | 6/2009 | Davis |
| 7,620,309 B2 | 11/2009 | Georgiev |
| 7,623,726 B1 | 11/2009 | Georgiev |
| 7,706,632 B2 | 4/2010 | Gouch |
| 7,723,662 B2 | 5/2010 | Levoy et al. |
| 7,732,744 B2 | 6/2010 | Utagawa |
| 7,736,001 B2 | 6/2010 | Tanaka et al. |
| 7,744,219 B2 | 6/2010 | Davis |
| 7,792,423 B2 | 9/2010 | Raskar et al. |
| 7,828,436 B2 | 11/2010 | Goldstein et al. |
| 7,847,837 B2 | 12/2010 | Ootsuna et al. |
| 7,854,510 B2 | 12/2010 | Verdooner et al. |
| 7,880,794 B2 | 2/2011 | Yamagata et al. |
| 7,936,392 B2 | 5/2011 | Ng et al. |
| 7,949,252 B1 | 5/2011 | Georgiev |
| 7,956,924 B2 | 6/2011 | Georgiev |
| 7,965,936 B2 | 6/2011 | Raskar et al. |
| 8,019,215 B2 | 9/2011 | Georgiev et al. |
| 8,226,232 B2 | 7/2012 | Ribak |
| 8,228,417 B1 | 7/2012 | Georgiev et al. |
| 8,237,835 B1 | 8/2012 | Muller |
| 8,238,738 B2 | 8/2012 | Georgiev |
| 8,289,440 B2 | 10/2012 | Knight et al. |
| 8,363,783 B2 | 1/2013 | Gertner et al. |
| 8,388,134 B2 | 3/2013 | Goldstein et al. |
| 8,434,869 B2 | 5/2013 | Davis |
| 8,471,897 B2 | 6/2013 | Rodriguez et al. |
| 8,593,564 B2 | 11/2013 | Border et al. |
| 8,619,177 B2 | 12/2013 | Perwass et al. |
| 8,851,671 B2 | 10/2014 | Ribak |
| 9,020,580 B2 | 4/2015 | Friedman et al. |

(56) References Cited

U.S. PATENT DOCUMENTS

| | | |
|---|---|---|
| 9,301,682 B2 | 4/2016 | Teijido |
| 9,480,394 B2 | 11/2016 | Verdooner |
| 9,532,708 B2 | 1/2017 | Juhasz et al. |
| 9,545,200 B2 | 1/2017 | Catanzariti et al. |
| 9,545,338 B2 | 1/2017 | Frey et al. |
| 10,092,183 B2 | 10/2018 | Berestka et al. |
| 10,524,656 B2 | 1/2020 | Wiltberger et al. |
| 10,687,703 B2 | 6/2020 | Berestka et al. |
| 11,179,032 B2 | 11/2021 | Chen et al. |
| 11,179,576 B2 | 11/2021 | Muller |
| 11,324,400 B2 | 5/2022 | Raymond et al. |
| 11,452,447 B2 | 9/2022 | Berestka et al. |
| 11,911,109 B2 | 2/2024 | Berestka et al. |
| 11,925,415 B2 | 3/2024 | Ohmori et al. |
| 11,998,277 B2 | 6/2024 | Nagarajan et al. |
| 12,011,225 B2 | 6/2024 | Oomori et al. |
| 12,076,083 B2 | 9/2024 | Gagnon et al. |
| 12,150,708 B2 | 11/2024 | Dellagiacoma et al. |
| 12,150,712 B2 | 11/2024 | Oomori |
| 2001/0012149 A1 | 8/2001 | Lin et al. |
| 2001/0050813 A1 | 12/2001 | Allio |
| 2002/0101567 A1 | 8/2002 | Sumiya |
| 2002/0140835 A1 | 10/2002 | Silverstein |
| 2002/0159030 A1 | 10/2002 | Frey et al. |
| 2003/0020883 A1 | 1/2003 | Hara |
| 2003/0067596 A1 | 4/2003 | Leonard |
| 2003/0103670 A1 | 6/2003 | Schoelkopf et al. |
| 2003/0117511 A1 | 6/2003 | Belz et al. |
| 2003/0156077 A1 | 8/2003 | Balogh |
| 2003/0160957 A1 | 8/2003 | Oldham et al. |
| 2003/0231255 A1 | 12/2003 | Szajewski et al. |
| 2004/0114176 A1 | 6/2004 | Bodin et al. |
| 2004/0114807 A1 | 6/2004 | Lelescu et al. |
| 2004/0223214 A1 | 11/2004 | Atkinson |
| 2004/0256538 A1 | 12/2004 | Olson et al. |
| 2004/0257360 A1 | 12/2004 | Sieckmann |
| 2005/0080602 A1 | 4/2005 | Snyder et al. |
| 2005/0088714 A1 | 4/2005 | Kremen |
| 2005/0122418 A1 | 6/2005 | Okita et al. |
| 2005/0286019 A1 | 12/2005 | Wiltberger et al. |
| 2005/0286800 A1 | 12/2005 | Gouch |
| 2006/0050229 A1 | 3/2006 | Farberov |
| 2006/0104542 A1 | 5/2006 | Blake et al. |
| 2006/0176566 A1 | 8/2006 | Boettiger et al. |
| 2006/0238847 A1 | 10/2006 | Gouch |
| 2007/0024931 A1 | 2/2007 | Compton et al. |
| 2007/0036462 A1 | 2/2007 | Crandall et al. |
| 2007/0046862 A1 | 3/2007 | Umebayashi et al. |
| 2007/0071316 A1 | 3/2007 | Kubo |
| 2007/0091197 A1 | 4/2007 | Okayama et al. |
| 2007/0147673 A1 | 6/2007 | Crandall |
| 2007/0230944 A1 | 10/2007 | Georgiev |
| 2007/0252074 A1 | 11/2007 | Ng et al. |
| 2007/0257772 A1 | 11/2007 | Marcelle et al. |
| 2008/0007626 A1 | 1/2008 | Wernersson |
| 2008/0018668 A1 | 1/2008 | Yamauchi |
| 2008/0044063 A1 | 2/2008 | Friedman et al. |
| 2008/0056549 A1 | 3/2008 | Hamill et al. |
| 2008/0107231 A1 | 5/2008 | Miyazaki et al. |
| 2008/0131019 A1 | 6/2008 | Ng |
| 2008/0152215 A1 | 6/2008 | Horie et al. |
| 2008/0165270 A1 | 7/2008 | Watanabe et al. |
| 2008/0166063 A1 | 7/2008 | Zeng |
| 2008/0180792 A1 | 7/2008 | Georgiev |
| 2008/0187305 A1 | 8/2008 | Raskar et al. |
| 2008/0193026 A1 | 8/2008 | Horie et al. |
| 2008/0218610 A1 | 9/2008 | Chapman et al. |
| 2008/0226274 A1 | 9/2008 | Spielberg |
| 2008/0247623 A1 | 10/2008 | Delso et al. |
| 2008/0266655 A1 | 10/2008 | Levoy et al. |
| 2008/0309813 A1 | 12/2008 | Watanabe |
| 2009/0027542 A1 | 1/2009 | Yamamoto et al. |
| 2009/0041381 A1 | 2/2009 | Georgiev et al. |
| 2009/0041448 A1 | 2/2009 | Georgiev et al. |
| 2009/0086304 A1 | 4/2009 | Yurlov et al. |
| 2009/0102956 A1 | 4/2009 | Georgiev |
| 2009/0128658 A1 | 5/2009 | Hayasaka et al. |
| 2009/0128669 A1 | 5/2009 | Ng et al. |
| 2009/0140131 A1 | 6/2009 | Utagawa |
| 2009/0185801 A1 | 7/2009 | Georgiev et al. |
| 2009/0200623 A1 | 8/2009 | Qian et al. |
| 2009/0225279 A1 | 9/2009 | Small |
| 2009/0268970 A1 | 10/2009 | Babacan et al. |
| 2009/0273843 A1 | 11/2009 | Raskar et al. |
| 2009/0295829 A1 | 12/2009 | Georgiev et al. |
| 2010/0026852 A1 | 2/2010 | Ng et al. |
| 2010/0085468 A1 | 4/2010 | Park et al. |
| 2010/0128145 A1 | 5/2010 | Pitts et al. |
| 2010/0129048 A1 | 5/2010 | Pitts et al. |
| 2010/0205388 A1 | 8/2010 | Macinnis |
| 2010/0265386 A1 | 10/2010 | Raskar et al. |
| 2011/0149239 A1 | 6/2011 | Neal et al. |
| 2011/0169994 A1 | 7/2011 | Difrancesco et al. |
| 2011/0234841 A1 | 9/2011 | Akeley et al. |
| 2011/0234977 A1 | 9/2011 | Verdooner |
| 2011/0237999 A1* | 9/2011 | Muller ................ A61N 5/0625 351/215 |
| 2011/0273609 A1 | 11/2011 | Difrancesco et al. |
| 2011/0313294 A1 | 12/2011 | De et al. |
| 2012/0101371 A1 | 4/2012 | Verdooner |
| 2012/0249550 A1 | 10/2012 | Akeley et al. |
| 2012/0294590 A1 | 11/2012 | Pitts et al. |
| 2012/0310083 A1* | 12/2012 | Friedman ............. A61F 9/0079 600/431 |
| 2012/0327222 A1 | 12/2012 | Ng et al. |
| 2013/0010260 A1 | 1/2013 | Tumlinson et al. |
| 2013/0033636 A1 | 2/2013 | Pitts et al. |
| 2013/0113981 A1 | 5/2013 | Knight et al. |
| 2013/0169934 A1 | 7/2013 | Verdooner |
| 2013/0208241 A1 | 8/2013 | Lawson et al. |
| 2013/0222606 A1 | 8/2013 | Pitts et al. |
| 2013/0222633 A1 | 8/2013 | Knight et al. |
| 2013/0222652 A1 | 8/2013 | Akeley et al. |
| 2013/0235267 A1 | 9/2013 | Pitts et al. |
| 2013/0237970 A1 | 9/2013 | Summers et al. |
| 2013/0301003 A1 | 11/2013 | Wells et al. |
| 2014/0013273 A1 | 1/2014 | Ng |
| 2014/0016019 A1 | 1/2014 | Pitts et al. |
| 2014/0078259 A1 | 3/2014 | Hiramoto et al. |
| 2014/0129988 A1 | 5/2014 | Liang et al. |
| 2014/0139807 A1 | 5/2014 | Uchiyama |
| 2014/0218685 A1 | 8/2014 | Nakamura |
| 2014/0226128 A1 | 8/2014 | Lawson et al. |
| 2014/0267773 A1 | 9/2014 | Jeung et al. |
| 2014/0275935 A1* | 9/2014 | Walsh ................ A61B 3/0083 600/398 |
| 2014/0300817 A1 | 10/2014 | Bezman et al. |
| 2015/0004558 A1 | 1/2015 | Inglese et al. |
| 2015/0085254 A1 | 3/2015 | Sramek et al. |
| 2015/0131055 A1 | 5/2015 | Catanzariti et al. |
| 2015/0157198 A1 | 6/2015 | Sramek et al. |
| 2015/0305614 A1 | 10/2015 | Narasimha-Iyer et al. |
| 2015/0347841 A1 | 12/2015 | Mears |
| 2016/0085299 A1* | 3/2016 | Horesh ................ A61B 3/0025 345/156 |
| 2016/0143778 A1 | 5/2016 | Aljuri et al. |
| 2016/0213249 A1 | 7/2016 | Cornsweet et al. |
| 2017/0143442 A1* | 5/2017 | Tesar .................. H04N 23/63 |
| 2017/0156591 A1* | 6/2017 | Berestka ............... A61B 8/10 |
| 2017/0237974 A1 | 8/2017 | Samec et al. |
| 2017/0311910 A1 | 11/2017 | Inglese et al. |
| 2019/0223718 A1 | 7/2019 | Breitenstein et al. |
| 2022/0133144 A1 | 5/2022 | Shimizu et al. |
| 2022/0157114 A1 | 5/2022 | Huke et al. |
| 2022/0225876 A1 | 7/2022 | Raymond et al. |
| 2022/0280036 A1 | 9/2022 | Liu et al. |
| 2023/0016417 A1* | 1/2023 | Hart .................. A61B 5/14552 |
| 2023/0277055 A1 | 9/2023 | Fukuma et al. |
| 2023/0359008 A1 | 11/2023 | Shimizu et al. |
| 2024/0041323 A1 | 2/2024 | Yamaguchi et al. |

(56) References Cited

U.S. PATENT DOCUMENTS

| | | |
|---|---|---|
| 2024/0115132 A1 | 4/2024 | Hwang |
| 2024/0277225 A1 | 8/2024 | Berestka et al. |

FOREIGN PATENT DOCUMENTS

| | | |
|---|---|---|
| EP | 2695571 A1 | 2/2014 |
| EP | 2695572 A1 | 2/2014 |
| EP | 3434175 A1 | 1/2019 |
| EP | 3738500 A1 | 11/2020 |
| EP | 3942995 A1 | 1/2022 |
| JP | 2013-527775 A | 7/2013 |
| JP | 2014-033812 A | 2/2014 |
| WO | 2009145738 A1 | 12/2009 |
| WO | 2012149885 A1 | 11/2012 |
| WO | 2013/162471 A2 | 10/2013 |
| WO | 2016033590 A1 | 3/2016 |
| WO | 2019056042 A1 | 3/2019 |
| WO | 2019240151 A1 | 12/2019 |
| WO | 2021182235 A1 | 9/2021 |
| WO | 2022010653 A1 | 1/2022 |
| WO | 2023108287 A1 | 6/2023 |
| WO | 2023181779 A1 | 9/2023 |
| WO | 2023229690 A1 | 11/2023 |
| WO | 2024051923 A1 | 3/2024 |
| WO | 2024121566 A1 | 6/2024 |
| WO | 2024143140 A1 | 7/2024 |
| WO | 2025004029 A1 | 1/2025 |

OTHER PUBLICATIONS

CTECH; Out of Sight—Close to Mind: an Israeli Startup Revolutionizes the Field of Eye Care; 6 pages; Sep. 3, 2020.

U.S. Appl. No. 63/523,054; filed Jun. 24, 2023; 52 pages.

European Patent Office; Invitation to Pay Additional Fees; International Application No. PCT/US2024/054811; 14 pages; dated Feb. 24, 2025.

United Kingdom Intellectual Property Office; Search Report; UK Application No. GB2407009.6; 1 page; dated Sep. 24, 2024.

International Search Report and Written Opinion received for PCT Patent Application No. PCT/US2024/054811, mailed on Apr. 16, 2025, 20 pages.

Manakov, Alkhazur et al., A Reconfigurable Camera Add-On for High Dynamic Range, Multispectral, Polarization, and Light-Field Imaging, ACM Transactions on Graphics, Association for Computing Machinery, 2013, Proceeding of SIGGRAPH, 32 (4), pp. 47:1-47-14.

Raskar, Ramesh et al., Glare Aware Photography: 4D Ray Sampling for Reducing Glare Effects of Camera Lenses, Mitsubishi Electric Research Laboratories, SIGGRAPH 2008, http://www.merl.com, 12 pages.

Veeraraghavan, Ashok et al., Dappled Photography: Mask Enhanced Cameras for Heterodyned Light Fields and Coded Aperture Refocusing, Mitsubishi Electric Research Laboratories, Proc. ACM SIGGRAPH, Jul. 2007, http://www.merl.com, 12 pages.

Wilburn, Bennett et al., High Performance Imaging Using Large Camera Arrays, ACM Transactions on Graphics (proceedings SIGGRAPH) vol. 24, No. 3., 2005, pp. 765-776.

* cited by examiner

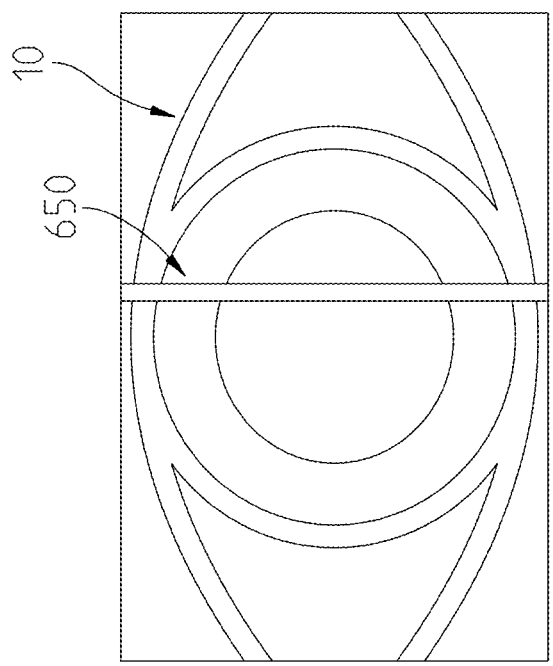
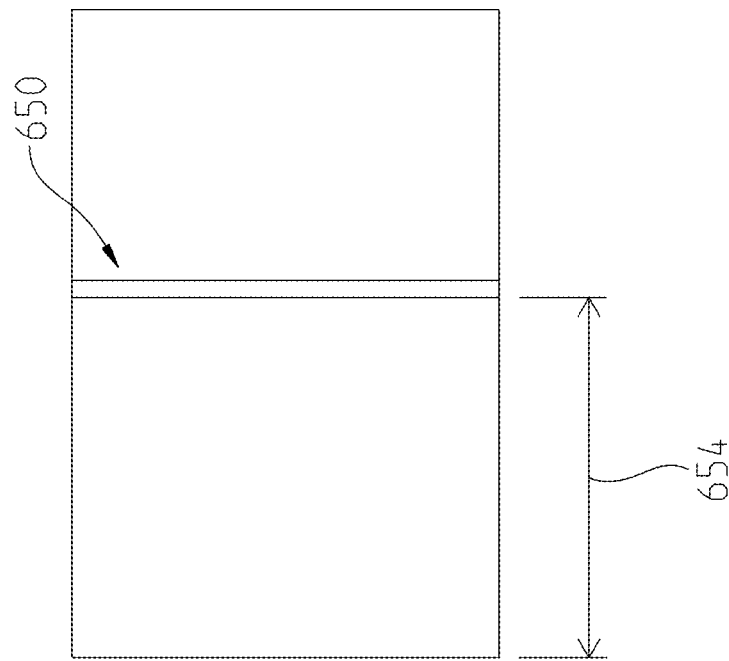
Fig. 18B
Fig. 18A

SYSTEMS AND METHODS FOR ANALYZING THE EYE

RELATED APPLICATION

This application is a continuation application of PCT Application No. PCT/US2024/054811, filed Nov. 6, 2024, titled SYSTEMS AND METHODS FOR ANALYZING THE EYE and claims the benefit of U.S. Provisional Application No. 63/547,628, filed Nov. 7, 2023, titled SYSTEMS AND METHODS FOR ANALYZING THE EYE, the entire disclosures of which are expressly incorporated by reference herein.

TECHNICAL FIELD

The present invention relates to one or more imaging systems including an illumination system and a detection system.

BACKGROUND

Ophthalmologists use a variety of devices for imaging of a patient's eye, including slit-lamps, ophthalmoscopes, fundus cameras, and scanning laser ophthalmoscopes (SLOs). The slit lamp is a versatile instrument used by ophthalmologists for examining a patient's eye. It consists of a microscope, an illumination source, and a mechanical support system to facilitate positioning the illumination source at various angles with respect to the eye. Ophthalmologists and optometrists typically examine the eye by first horizontally scanning across the eye using various slit beam thicknesses and orientations to examine the most anterior structures such as the cornea and conjunctiva. Then the examiner will adjust the focus plane posterior to horizontally scan across the anterior chamber of the eye. The focus is then adjusted more posteriorly to horizontally scan across the iris and anterior crystalline lens. The process is repeated again to examine the posterior aspect of the crystalline lens and anterior vitreous.

FIGS. 1 and 1A show a schematic view of a patient's eye. As shown in FIGS. 1 and 1A, the basic components of the eye 10 include a cornea 12, conjunctiva 14, an iris 16, a pupil 18, a crystalline lens 20, and a retina 22. An anterior chamber 24 is provided behind the cornea 12. A posterior chamber 40 is provided posterior of anterior chamber 24. The posterior chamber 40 includes the lens 20 which is positioned by the suspensory ligaments 34 of the eye. An anterior capsule 31 lines the anterior portion of the crystalline lens 20 and the posterior capsule 30 lines the posterior portion of the crystalline lens 20. The posterior capsule 30 and the suspensory ligaments 34 form the anterior boundary of the vitreous cavity 32. Light enters the front of the eye through the cornea 12, passes through the pupillary aperture 18 and then the lens 20. The curvatures of the cornea and lens invert and focus the light which is then projected onto the retina 22 at the back of the eye. The iris 16 functions as an "aperture" that opens and closes to regulate the amount of light entering the eye. The cornea, iris, pupil and lens are often referred to as the anterior segment of the eye. The retina 22 is a multi-layered structure that converts received light into a neural signal through a process known as "signal transduction." The photoreceptors on the retina are known as rods and cones. These generate neural signals that are communicated to the brain by ganglion cells that form the optic nerve 24.

SUMMARY

In an exemplary embodiment of the present disclosure, a medical device for imaging at least a portion of an eye of a patient is provided. The medical device may comprise a patient support adapted to position the eye of the patient; a movable base moveable relative to the patient support; an illumination system including at least one source producing light to illuminate the eye and an illumination system support arm supporting the at least one source; and an observation system including a plurality of cameras each configured to receive imaging rays produced by reflection of light from the eye of the patient and at least one observation system support arm supporting the imaging system. The illumination system support arm may be supported by the moveable base and rotatable relative to the moveable base. The at least one observation system support arm may be supported by the moveable base and rotatable relative to the moveable base and may be rotatable relative to the illumination system support arm. The medical device may further comprise a storage device operatively coupled to at least one of the plurality of cameras to receive and store a plurality of images of the eye imaged by the least one of the plurality of cameras and a controller operatively coupled to the storage device and configured to determine an alignment of the observation system relative to the eye of the patient.

In another exemplary embodiment of the present disclosure, a medical device for imaging at least a portion of an eye of a patient is provided. The medical device may comprise a patient support adapted to position the eye of the patient; a movable base moveable relative to the patient support; an illumination system; an observation system, and a controller. The illumination system may include at least one source producing light to illuminate the eye. The illumination system may further include an illumination system support arm supporting the at least one source. The illumination system support arm may be supported by the moveable base and rotatable relative to the moveable base. The illumination system may include a first adjustable optical assembly. The observation system may include a first camera configured to receive imaging rays produced by reflection of light from the eye of the patient. The observation system may further include an observation system support arm supporting the first camera. The observation system support arm may be supported by the moveable base and be rotatable relative to the moveable base and rotatable relative to the illumination system support arm. The observation system may include a second adjustable optical assembly having an optical axis. The observation system may image at least one plane which is normal to the optical axis of the second adjustable optical assembly. The controller may be operatively coupled to the first adjustable optical assembly of the illumination system and to the second adjustable optical system of the observation system. The controller may be configured to adjust the first adjustable optical assembly of the illumination system and the second adjustable optical system of the observation system to a plurality of focal depths relative to the patient support. The controller may further be configured to adjust a rotational position of the illumination system support arm relative to the observation system support arm.

In an example thereof, the movable base may remain stationary relative to the patient support.

In another example thereof, the controller may be configured to adjust both the first adjustable optical assembly of the illumination system and the second adjustable optical system of the observation system at a first focal depth of the plurality of focal depths relative to the patient support while the movable base remains stationary relative to the patient support; and adjust both the first adjustable optical assembly of the illumination system and the second adjustable optical system of the observation system at a second focal depth of the plurality of focal depths relative to the patient support while the movable base remains stationary relative to the patient support, the second focal depth of the plurality of focal depths being different than the first focal depth of the plurality of focal depths.

In a further example thereof, the controller based on a set of locations to focus each of the first adjustable optical assembly of the illumination system and the second adjustable optical system of the observation system may focus both of the first adjustable optical assembly of the illumination system and the second adjustable optical system of the observation system at a respective focal depth of each location in the set of locations sequentially. In a variation thereof, the illumination system projects a test pattern which is focused by the first adjustable optical assembly of the illumination system. In a further variation thereof, the illumination system includes a digital projector which displays the test pattern. In still a further variation thereof, the test pattern may include a vertical slit focused at a first focal depth of the plurality of focal depths for a first subset of the set of locations, the first subset including a first plurality of locations and the controller is configured to project a series of images with the digital projector, each respective image of the series of images having the vertical slit positioned to project to a respective location of the first plurality of locations at the first focal depth. In yet still a further variation thereof, the first plurality of locations includes a first location of the first plurality of locations having a first transverse position relative to an optical axis of the illumination system and a first image of the series of images includes the vertical slit positioned to project to the first transverse position relative to the optical axis of the illumination system and wherein the first plurality of locations includes a second location of the first plurality of locations having a second transverse position relative to the optical axis of the illumination system, the second transverse position being offset from the first transverse position and a second image of the series of images includes the vertical slit positioned to project to the second transverse location relative to the optical axis of the illumination system.

In another example thereof, the test pattern has a first color value in a first image and a second color value in a second image, the second color value being different from the first color value. In a further example thereof, the test pattern further includes one or more of a time stamp, a patient name, an indication of nasal and temporal sides of a projected image.

In yet a further example thereof, the test pattern further includes a watermark.

In still another example thereof, the test pattern includes a vertical slit. In a variation thereof, the vertical slit is focused at a first focal depth of the plurality of focal depths for a first subset of the set of locations, the first subset including a first plurality of locations. In another variation thereof, the first plurality of locations includes a first location of the first plurality of locations having a first transverse position relative to an optical axis of the illumination system and a second location of the first plurality of locations having a second transverse position relative to the optical axis of the illumination system, the second transverse position being offset from the first transverse position. In another variation thereof, the illumination system is focused at a first focal depth and a first transverse position offset from an optical axis of the illumination system for a first location of the set of locations and is focused at a second focal depth and a second transverse position offset from the optical axis of the illumination system for a second location of the set of locations, the second focal depth being offset from the first focal depth and the second transverse location being offset from the first transverse location. In yet a further variation thereof, the illumination system is focused at the second focal depth and a third transverse position offset from the optical axis of the illumination system for a third location of the set of locations, the third transverse location being offset from the second transverse location. In still a further variation thereof, the observation system is focused along an optical axis of the observation system at the first focal depth for the first location of the set of locations and at the second focal depth for the second location of the set of locations and the third location of the set of locations.

In yet still another example thereof, the test pattern includes multiple slits including a first slit and a second slit spaced apart from the first slit.

In a further still example thereof, the first adjustable optical assembly of the illumination system includes a first tunable lens.

In another still example thereof, the first adjustable optical assembly of the illumination system includes a second tunable lens.

In yet another example thereof, the at least one source producing one of a ring of light and a partial ring of light, and wherein the controller is further configured to align the one of the ring of light and the partial ring of light to a limbus of the eye of the patient.

In still yet another example, the controller is further configured to determine a movement of the eye during an examination. In a variation thereof, the controller based on images captured by the observation system determines the movement of the eye during an examination. In another variation thereof, the controller is further configured to determine a direction and a magnitude of the movement of the eye and adjust the first adjustable optical assembly of the illumination system and the second adjustable optical system of the observation system.

In another example thereof, the controller is further configured to determine a blink of the eye during an examination.

In a further example thereof, the controller is configured to (a) adjust the first adjustable optical assembly to project a first image from a digital projector of the illumination system towards the eye at a first focal depth, the first image including a first vertical slit; (b) adjust the second adjustable optical system of the observation system to the first focal depth; (c) capture a first image with the first camera of the observation system at the first focal depth of the first vertical slit; (d) adjust the first adjustable optical assembly to project the first image from the digital projector of the illumination system towards the eye at a second focal depth, the second focal depth being different than the first focal depth, the first image including the first vertical slit; (e) adjust the second adjustable optical system of the observation system to the second focal depth; and (f) capture a second image with the first camera of the observation system at the second focal depth of the first vertical slit. In a variation thereof, each of the movable base, the illumination arm, and the observation arm remain stationary relative to the patient support as the controller executes (a)-(f).

In yet a further example thereof, the controller is configured to (a) adjust the first adjustable optical assembly to project a first image from a digital projector of the illumination system towards the eye at a first focal depth, the first image including a first vertical slit; (b) adjust the second adjustable optical system of the observation system to the first focal depth; (c) capture a first image with the first camera of the observation system at the first focal depth of the first vertical slit; (d) adjust the first adjustable optical assembly to project a second image from the digital projector of the illumination system towards the eye at a second focal depth, the second focal depth being different than the first focal depth, the second image including a second vertical slit offset from a location of the first vertical slit in the first image; (e) adjust the second adjustable optical system of the observation system to the second focal depth; and (f) capture a second image with the first camera of the observation system at the second focal depth of the second vertical slit. In a variation thereof, each of the movable base, the illumination arm, and the observation arm remain stationary relative to the patient support as the controller executes (a)-(f).

In another exemplary embodiment of the present disclosure, a medical device for imaging at least a portion of an eye of a patient is provided. The medical device may comprise a patient support adapted to position the eye of the patient; a movable base moveable relative to the patient support, an illumination system, an observation system, and a controller. The illumination system may include at least one source producing light to illuminate the eye. The illumination system may further include an illumination system support arm supporting the at least one source. The illumination system support arm may be supported by the movable base and rotatable relative to the movable base. The illumination system may include a first adjustable optical assembly. The observation system may include a first camera configured to receive imaging rays produced by reflection of light from the eye of the patient. The observation system may further include an observation system support arm supporting the first camera. The observation system support arm may be supported by the movable base and rotatable relative to the movable base and rotatable relative to the illumination system support arm. The observation system including a second adjustable optical assembly. At least one of the first adjustable optical assembly of the illumination system and the second adjustable optical assembly of the observation system may include a tunable lens. The controller may be operatively coupled to the first adjustable optical assembly of the illumination system and to the second adjustable optical system of the observation system. The controller may be configured to adjust the first adjustable optical assembly of the illumination system and the second adjustable optical assembly of the observation system to a plurality of focal depths relative to the patient support and adjust a rotational position of the illumination system support arm relative to the observation system support arm.

In an example thereof, the first adjustable optical assembly of the illumination system includes a first tunable lens.

In another example thereof, wherein the second adjustable optical assembly of the observation system includes a second tunable lens.

In a further example thereof, the controller is further configured to determine a movement of the eye during an examination. In a variation thereof, the controller based on images captured by the observation system determines the movement of the eye during an examination. In another variation thereof, the controller is further configured to determine a direction and a magnitude of the movement of the eye and adjust the first adjustable optical assembly of the illumination system and the second adjustable optical system of the observation system.

In yet a further example thereof, the controller is further configured to determine a blink of the eye during an examination.

In still a further example thereof, the controller is configured to (a) adjust the first adjustable optical assembly to project a first image from a digital projector of the illumination system towards the eye at a first focal depth, the first image including a first vertical slit; (b) adjust the second adjustable optical system of the observation system to the first focal depth; (c) capture a first image with the first camera of the observation system at the first focal depth of the first vertical slit; (d) adjust the first adjustable optical assembly to project the first image from the digital projector of the illumination system towards the eye at a second focal depth, the second focal depth being different than the first focal depth, the first image including the first vertical slit; (e) adjust the second adjustable optical system of the observation system to the second focal depth; and (f) capture a second image with the first camera of the observation system at the second focal depth of the first vertical slit. In a variation thereof, each of the movable base, the illumination arm, and the observation arm remain stationary relative to the patient support as the controller executes (a)-(f).

In still another example thereof, the controller is configured to (a) adjust the first adjustable optical assembly to project a first image from a digital projector of the illumination system towards the eye at a first focal depth, the first image including a first vertical slit; (b) adjust the second adjustable optical system of the observation system to the first focal depth; (c) capture a first image with the first camera of the observation system at the first focal depth of the first vertical slit; (d) adjust the first adjustable optical assembly to project a second image from the digital projector of the illumination system towards the eye at a second focal depth, the second focal depth being different than the first focal depth, the second image including a second vertical slit offset from a location of the first vertical slit in the first image; (e) adjust the second adjustable optical system of the observation system to the second focal depth; and (f) capture a second image with the first camera of the observation system at the second focal depth of the second vertical slit. In a variation thereof, each of the movable base, the illumination arm, and the observation arm remain stationary relative to the patient support as the controller executes (a)-(f).

In still another exemplary embodiment of the present disclosure, a medical device for imaging at least a portion of an eye of a patient is provided. The medical device may comprise a patient support adapted to position the eye of the patient, a movable base moveable relative to the patient support, an illumination system, an observation system, a storage device, and a controller. The illumination system may include at least one source producing light to illuminate the eye. The illumination system may further include an illumination system support arm supporting the at least one source. The illumination system support arm may be supported by the moveable base and rotatable relative to the moveable base. The observation system may include a plurality of cameras each configured to receive imaging rays produced by reflection of light from the eye of the patient. The observation system may further include at least one observation system support arm supporting the plurality of cameras. The at least one observation system support arm may be supported by the moveable base and rotatable relative to the moveable base and rotatable relative to the illumination system support arm. The storage device may be operatively coupled to at least one of the plurality of cameras to receive and store a plurality of images of the eye imaged by the least one of the plurality of cameras. The controller may be operatively coupled to the storage device and configured to determine an alignment of the observation system relative to the eye of the patient.

In an example thereof, the plurality of cameras includes a first camera and a first optical assembly having a first input optical axis and positioned to provide a first image to the first camera and a second camera and a second optical assembly having a second input optical axis and positioned to provide a second image to the second camera.

In another example thereof, the plurality of cameras includes a first camera and a first optical assembly having a first input optical axis and positioned to provide a first image to the first camera, a second camera and a second optical assembly having a second input optical axis and positioned to provide a second image to the second camera, and a third camera and a third optical assembly having a third input optical axis and positioned to provide a third image to the third camera, the second camera and the third camera forming a stereo pair. In a variation thereof, each of the first optical assembly and the second optical assembly are positioned to receive imaging rays produced by reflection of light from the eye of the patient. In another variation thereof, the second input optical axis intersects the first input optical axis at a position within a focal range of the first optical assembly and within a focal range of the second optical assembly. In a further variation thereof, the first input optical axis and the second input optical axis are vertically aligned. In still another variation thereof, the illumination system is configured to provide a test pattern to illuminate the portion of the eye of the patient, the first image of the first optical assembly captured by the first camera includes a first portion of a reflection of the test pattern, the second image of the second optical assembly captured by the second camera includes a second portion of the reflection of the test pattern, and the controller is configured to determine the alignment of the observation system relative to the eye based the first portion of the reflection of the test pattern and the second portion of the reflection of the test pattern. In still another variation thereof, the controller is capable of determining the observation system is aligned with relative to the eye of the patient when the first portion of the reflection of the test pattern and the second portion of the reflection of the test pattern on a reflected test pattern exhibit a first characteristic. In yet another variation thereof, the controller is capable of determining the observation system is misaligned with relative to the eye of the patient by being too close to the eye when the first portion of the reflection of the test pattern and the second portion of the reflection of the test pattern on a reflected test pattern exhibit a second characteristic. In still a further variation thereof, the controller is capable of determining the observation system is misaligned with relative to the eye of the patient by being too far from the eye when the first portion of the reflection of the test pattern and the second portion of the reflection of the test pattern on a reflected test pattern exhibit a third characteristic. In still yet another variation thereof, the test pattern is a line. In a further still variation thereof, the first characteristic corresponds to the line in the first portion of the reflection of the test pattern being aligned with the line in the second portion of the reflection of the test pattern. In a further variation thereof, the second characteristic corresponds to the line in the first portion of the reflection of the test pattern being misaligned with the line in the second portion of the reflection of the test pattern. In yet another variation thereof, the line in the first portion of the reflection of the test pattern is in a non-overlapping relationship with the line in the second portion of the reflection of the test pattern for each of the first characteristic, the second characteristic, and the third characteristic.

In still another example thereof, the controller is configured to move the movable base relative to the patent support when the observation system is misaligned relative to the eye of the patient.

In yet still another example thereof, the medical device further comprises a display operatively coupled to the controller to display the first image of the first portion of the reflection of the test pattern and the second image of the second portion of the reflection of the test pattern.

In still a further example thereof, the illumination system includes a digital projector which produces the test pattern.

In another exemplary embodiment of the present disclosure, a method of aligning an imaging system to an eye of a patient is provided. The method may comprise the steps of projecting a test pattern on the eye of the patient with an illumination system; receiving a first portion of a reflection of the test pattern from the eye along a first direction with a first camera; receiving a second portion of the reflection of the test pattern from the eye along a second direction with a second camera, a first axis of the first direction intersecting with a second axis of the second direction at an intersection; and moving the first camera and the second camera relative to the eye of the patient until the first portion of the reflection of the test pattern and the second portion of the reflection of the test pattern have a first characteristic.

In an example thereof, the method further comprises the step of displaying the first portion of the reflection of the test pattern and the second portion of the reflection of the test pattern on a display.

In another example thereof, the method further comprises the steps of supporting the illumination system, the first camera, and the second camera on a movable base such that the illumination system, the first camera and the second camera move as a unit relative to the eye of the patient.

In yet another example thereof, the test pattern includes an elongated feature having a longitudinal axis in a third direction. The third direction may be normal to a plane defined by the first direction and the second direction and passing through the intersection of the first axis and the second axis. In a variation thereof, the first portion of the reflection of the test pattern includes a first portion of the elongated feature of the test pattern and the second portion of the reflection of the test pattern includes a second portion of the elongated feature of the test pattern. In another variation thereof, the first characteristic corresponds to the first portion of the elongated feature of the test pattern and the second portion of the elongated feature of the test pattern being aligned along a fourth direction normal to the third direction and in the plane. In a further variation thereof, the first portion of the elongated feature of the test pattern and the second portion of the elongated feature of the test pattern are aligned along a fourth direction normal to the third direction and in the plane indicating that the first camera and the second camera are aligned to a surface of a cornea of the eye of the patient. In yet another variation thereof, the first portion of the elongated feature of the test pattern and the second portion of the elongated feature of the test pattern are offset along the fourth direction in a second characteristic indicating that at least one of the first camera and the second camera are misaligned to the eye of the patient.

In a further example thereof, the step of moving the first camera and the second camera relative to the eye of the patient until the first portion of the reflection of the test pattern and the second portion of the reflection of the test pattern have the first characteristic includes receiving a manual input to a support of at least one of the first camera and the second camera to reposition the at least one of the first camera and the second camera relative to the eye of the patient.

In yet a further example thereof, the step of moving the first camera and the second camera relative to the eye of the patient until the first portion of the reflection of the test pattern and the second portion of the reflection of the test pattern have the first characteristic includes actuating a positioning system of the first camera and the second camera with a movement command from a controller based on the first portion of the reflection of the test pattern and the second portion of the reflection of the test pattern having a characteristic different from the first characteristic.

In still another example thereof, the step of projecting the test pattern on the eye of the patient with the illumination system includes programming a digital projector to display the test pattern.

In yet still another example thereof, the test pattern is a horizontal line.

In a further exemplary embodiment of the present disclosure, a medical device for imaging at least a portion of an eye of a patient is provided. The medical device may comprise an illumination system configured to project a test pattern on the eye of the patient; a first camera positioned configured to capture a first image of a first portion of a reflection of the test pattern from the eye along a first direction; a second camera positioned configured to capture a second image of a second portion of the reflection of the test pattern from the eye along a second direction; and a display to configured to display at the same time at least a first portion the test pattern based on the first image and a second portion of the test pattern based on the second image to provide an indication of an alignment state of the first camera and the second camera relative to the eye of the patient.

In an example thereof, if the first portion of the test pattern is aligned with the second portion of the test pattern on the display then the alignment state of the first camera and the second camera relative to the eye of the patient is aligned.

In another example thereof, if the first portion of the test pattern is offset relative to the second portion of the test pattern on the display then the alignment state of the first camera and the second camera relative to the eye of the patient is misaligned.

In a further example thereof, the test pattern includes an elongated feature having a longitudinal axis in a third direction. In a variation thereof, the third direction is normal to a plane defined by the first direction and the second direction. In another variation thereof, the first portion of the test pattern based on the first image includes a first portion of the elongated feature and the second portion of the test pattern based on the second image includes a second portion of the elongated feature. In yet another variation thereof, the first portion of the elongated feature and the second portion of the elongated feature of the test pattern are aligned along the third direction when the alignment state of the first camera and the second camera relative to the eye of the patient is aligned. In still a further variation thereof, the first portion of the elongated feature and the second portion of the elongated feature of the test pattern are offset in a fourth direction normal to the third direction when the alignment state of the first camera and the second camera relative to the eye of the patient is misaligned. In yet another variation thereof, when the second portion of the elongated feature of the test pattern is offset to a first side of the first portion of the elongated feature the first camera and the second camera are too close relative to the eye of the patient and when the second portion of the elongated feature of the test pattern is offset to a second side of the first portion of the elongated feature, the second side being opposite the first side, the first camera and the second camera are too far relative to the eye of the patient.

In yet a further example thereof, the medical device further comprising a movable base supporting the illumination system, the first camera, and the second camera.

In still another example thereof, the illumination system includes a digital projector programmed to display the test pattern which is projected by an optical system of the illumination system.

In yet still another example, the test pattern is a horizontal line.

In yet another exemplary embodiment of the present disclosure, a medical device for imaging at least a portion of an eye of a patient is provided. The medical device may comprise a patient support adapted to position the eye of the patient; a movable base moveable relative to the patient support; an illumination system including at least one source producing light to illuminate the eye and an illumination system support arm supporting the at least one source; and an observation system including a first camera configured to receive imaging rays produced by reflection of light from the eye of the patient and an observation system support arm supporting the first camera. The illumination system support arm may be supported by the moveable base and rotatable relative to the moveable base. The illumination system may include a first adjustable optical assembly. The observation system support arm may be supported by the moveable base and rotatable relative to the moveable base and rotatable relative to the illumination system support arm. The observation system may include a second adjustable optical assembly. The medical device may further comprise a controller. The controller may be operatively coupled to the first adjustable optical assembly of the illumination system and to the second adjustable optical system of the observation system. The controller may be configured to adjust the first adjustable optical assembly of the illumination system and the second adjustable optical system of the observation system to a plurality of focal depths relative to the patient support while the movable base remains stationary relative to the patient support.

In still yet another exemplary embodiment of the present disclosure, a medical device for imaging at least a portion of an eye of a patient is provided. The medical device may comprise a patient support adapted to position the eye of the patient; a movable base moveable relative to the patient support; an illumination system including a digital projector producing at least one image to illuminate the eye and an illumination system support arm supporting the at least one source; and an observation system including a first camera configured to receive imaging rays produced by reflection of light from the eye of the patient and an observation system support arm supporting the first camera. The illumination system support arm may be supported by the moveable base and rotatable relative to the moveable base. The illumination system may include a first adjustable optical assembly. The observation system support arm may be supported by the moveable base and rotatable relative to the moveable base and rotatable relative to the illumination system support arm. The observation system may include a second adjustable optical assembly. The medical device may further comprise a controller. The controller may be operatively coupled to the first adjustable optical assembly of the illumination system and to the second adjustable optical system of the observation system. The controller may be configured to adjust the first adjustable optical assembly of the illumination system and the second adjustable optical system of the observation system to a plurality of focal depths relative to the patient support while the movable base remains stationary relative to the patient support. A first subset of the plurality of focal depths may be part of a first contour and a second subset of the plurality of focal depths may be part of a second contour. The second contour being offset relative to the first contour. The digital projector may produce a first image having a first vertical slit for a first focal depth of the first subset of the plurality of focal depths and a first focal depth of second subset of the plurality of focal depths. The digital projector may produce a second image having a second vertical slit, offset relative to a location of the first vertical slit in the first image, for a second focal depth of the first subset of the plurality of focal depths and a second focal depth of second subset of the plurality of focal depths.

In an example thereof, the first contour has a first shape and the second contour has a second shape, the second shape being different than the first shape. In a variation thereof, the second shape is flatter than the first shape.

In another example thereof, the first adjustable optical assembly of the illumination system includes a first tunable lens.

In yet another example thereof, the second adjustable optical assembly of the observation system includes a second tunable lens.

In a further example thereof, the controller is further configured to determine a movement of the eye during an examination. In a variation thereof, the controller based on images captured by the observation system determines the movement of the eye during an examination. In another variation thereof, the controller is further configured to determine a direction and a magnitude of the movement of the eye and adjust the first adjustable optical assembly of the illumination system and the second adjustable optical system of the observation system.

In yet a further example thereof, the controller is further configured to determine a blink of the eye during an examination.

In still a further exemplary embodiment of the present disclosure, a medical device for imaging at least a portion of an eye of a patient is provided. The medical device may comprise a patient support adapted to position the eye of the patient; a movable base moveable relative to the patient support; an illumination system including at least one source producing light to illuminate the eye and an illumination system support arm supporting the at least one source; and an observation system including a first camera configured to receive imaging rays produced by reflection of light from the eye of the patient and an observation system support arm supporting the first camera. The illumination system support arm may be supported by the moveable base and rotatable relative to the moveable base. The illumination system may include a first adjustable optical assembly. The observation system support arm may be supported by the moveable base and rotatable relative to the moveable base and rotatable relative to the illumination system support arm. The observation system may include a second adjustable optical assembly. The medical device may further comprise a controller. The controller may be operatively coupled to the first adjustable optical assembly of the illumination system and to the second adjustable optical system of the observation system. The controller may be configured to adjust the first adjustable optical assembly of the illumination system and the second adjustable optical system of the observation system to a plurality of focal depths relative to the patient support; and adjust a rotational position of the illumination system support arm relative to the observation system support arm.

In yet still another exemplary embodiment of the present disclosure, a medical device for imaging at least a portion of an eye of a patient is provided. The medical device may comprise a patient support adapted to position the eye of the patient; a movable base moveable relative to the patient support; an illumination system including at least one source producing light to illuminate the eye and an illumination system support arm supporting the at least one source; and an observation system including a first camera configured to receive imaging rays produced by reflection of light from the eye of the patient and an observation system support arm supporting the first camera. The illumination system support arm may be supported by the moveable base and rotatable relative to the moveable base. The at least one source may produce one of a ring of light and a partial ring of light. The observation system support arm may be supported by the moveable base and rotatable relative to the moveable base and rotatable relative to the illumination system support arm.

In an example thereof, the medical device may further comprise a controller operatively coupled to the at least one source. The controller may be configured to align the one of the ring of light and the partial ring of light to the limbus.

In another example thereof, the illumination system including a first adjustable optical assembly.

In still another example thereof, the observation system including a second adjustable optical assembly.

In a further example thereof, the at least one source is a digital projector.

In still a further exemplary embodiment of the present disclosure, a medical device for imaging at least a portion of an eye of a patient is provided. The medical device may comprise an illumination system including a digital projector producing at least one image to illuminate the eye and a first adjustable optical assembly to project the at least one image towards the eye and an observation system including a second adjustable optical assembly positioned to receive imaging rays produced by reflection of light from the eye of the patient due to the projection of the at least one image towards the eye by the illumination system and a first camera configured receive the imaging rays from the second adjustable optical assembly. The illumination system and the observation system may be positioned in a first spatial configuration with an optical axis of the first adjustable optical assembly and an optical axis of the second optical assembly intersecting at an apex of a cornea of the eye. The medical device may further comprise a controller operatively coupled to the illumination system and to the observation system. The controller may be configured to adjust the first adjustable optical assembly of the illumination system and the second adjustable optical system of the observation system to a plurality of focal depths relative to the eye while the illumination system and observation system are in the first spatial configuration.

In an example thereof, the at least one image includes a test pattern. In a variation thereof, the test pattern includes a vertical slit and in a first image of the at least one image the vertical slit is in a first transverse position and in a second image of the at least one image the vertical slit is in a second transverse position, the second traverse position in second image of the at least one image being spaced apart from the first transverse position in the first image. In another variation thereof, the controller focuses the first adjustable optical assembly of the illumination system at a first focal depth of the plurality of focal depths when the first image of the at least one image is produced by the digital projector to focus the vertical slit in the first transverse position on the cornea at a first location offset from the apex of the cornea and focuses the first adjustable optical assembly of the illumination system at a second focal depth of the plurality of focal depths when the second image of the at least one image is produced by the digital projector to focus the vertical slit in the second transverse position on the cornea at a second location offset from the apex of the cornea, the second location on the cornea being offset from the first location on the cornea. In yet another variation thereof, the controller further focuses the second adjustable optical assembly of the observation system at the first focal depth of the plurality of focal depths when the first image of the at least one image is produced by the digital projector to focus the vertical slit in the first transverse position on the cornea at the first location offset from the apex of the cornea and focuses the second adjustable optical assembly of the observation system at the second focal depth of the plurality of focal depths when the second image of the at least one image is produced by the digital projector to focus the vertical slit in the second transverse position on the cornea at the second location offset from the apex of the cornea. In still another example thereof, the controller is configured to adjust the first adjustable optical assembly of the illumination system and the second adjustable optical system of the observation system to a plurality of focal depths relative to the apex of the cornea while the illumination system and observation system are in the first spatial configuration, wherein a first subset of the plurality of focal depths are part of a first contour and a second subset of the plurality of focal depths are part of a second contour, the second contour being offset relative to the first contour, and wherein the digital projector produces the first image having the vertical slit in the first transverse position for a first focal depth of the first subset of the plurality of focal depths of the first contour and a first focal depth of second subset of the plurality of focal depths of the second contour and the digital projector produces the second image having the vertical slit in the second transverse position for a second focal depth of the first subset of the plurality of focal depths and a second focal depth of second subset of the plurality of focal depths. In yet another variation thereof, the first contour has a first shape and the second contour has a second shape, the second shape being different than the first shape. In still another variation thereof, the second shape is flatter than the first shape.

In another example thereof, the first adjustable optical assembly of the illumination system includes a first tunable lens.

In a further example thereof, the second adjustable optical assembly of the observation system includes a second tunable lens.

In yet another example thereof, the test pattern has a first color value in a first image and a second color value in a second image, the second color value being different from the first color value.

In still another example thereof, the test pattern further includes one or more of a time stamp, a patient name, an indication of nasal and temporal sides of a projected image.

In still yet another example thereof, the test pattern further includes a watermark.

In a further example thereof, the test pattern includes multiple slits including a first slit and a second slit spaced apart from the first slit.

In still a further example thereof, the controller is further configured to determine a movement of the eye during an examination. In a variation thereof, the controller based on images captured by the observation system determines the movement of the eye during an examination. In another variation thereof, the controller is further configured to determine a direction and a magnitude of the movement of the eye and adjust the first adjustable optical assembly of the illumination system and the second adjustable optical system of the observation system.

In a further still example thereof, the controller is further configured to determine a blink of the eye during an examination.

In a further yet example thereof, the medical device further comprises a base. The illumination system being coupled to the base and the observation system being coupled to the base. In a variation thereof, the illumination system is movable relative to the base. In another variation thereof, the illumination system is movable relative to the observation system. In a further variation thereof, the illumination system is rotatable relative to the base about a first rotation axis. In yet another variation thereof, the illumination system includes an illumination system support arm supporting the at least one source. In still another variation thereof, the observation system is rotatable relative to the base about the first rotation axis. In yet another variation thereof, the observation system includes an observation system support arm supporting the first camera.

In still a further example thereof, the medical device may further comprise a patient support adapted to position the eye of the patient. The base may be a movable base moveable relative to the patient support. The illumination system may further include an illumination system support arm supporting the at least one source. The illumination system support arm may be supported by the moveable base and rotatable relative to the moveable base. The observation system may further include an observation system support arm supporting the first camera. The observation system support arm may be supported by the moveable base and rotatable relative to the moveable base and rotatable relative to the illumination system support arm.

In a further example thereof, the medical device may further comprise a patient support adapted to position the eye of the patient, and wherein the base is a movable base movable relative to the patient support.

In a further still exemplary embodiment of the present disclosure, a method of examining an eye of a patient is provided. The method may comprise the steps of: positioning an illumination system and an observation system in a first spatial configuration relative to the eye, the first spatial configuration having an optical axis of a first adjustable optical assembly of the illumination system and an optical axis of a second optical assembly of the observation system intersecting at an apex of a cornea of the eye; and while maintaining the illumination system and the observation system in the first spatial configuration performing the following steps: (a) projecting with the first adjustable optical assembly a first image from a digital projector towards the eye at a first focal depth relative to the apex of the cornea of the eye, the first image including a vertical slit in a first transverse position, (b) receiving light reflected by the eye from the projecting step (a) with a first camera through the second adjustable optical assembly with the second adjustable optical assembly focused at the first focal depth relative to the apex of the cornea of the eye, (c) projecting with the first adjustable optical assembly the first image from the digital projector towards the eye at a second focal depth relative to the apex of the cornea of the eye, the second focal depth being different than the first focal depth, the first image including the vertical slit in the first transverse position, and (d) receiving light reflected by the eye from the projecting step (c) with the first camera through the second adjustable optical assembly with the second adjustable optical assembly focused at the second focal depth relative to the apex of the cornea of the eye.

In yet a further still exemplary embodiment of the present disclosure, a method of examining an eye of a patient is provided. The method may comprise the steps of: positioning an illumination system and an observation system in a first spatial configuration relative to the eye, the first spatial configuration having an optical axis of a first adjustable optical assembly of the illumination system and an optical axis of a second optical assembly of the observation system intersecting at an apex of a cornea of the eye; and while maintaining the illumination system and the observation system in the first spatial configuration performing the following steps: (a) projecting with the first adjustable optical assembly a first image from a digital projector towards the eye at a first focal depth relative to the apex of the cornea of the eye, the first image including a vertical slit in a first transverse position, (b) receiving light reflected by the eye from the projecting step (a) with a first camera through the second adjustable optical assembly with the second adjustable optical assembly focused at the first focal depth relative to the apex of the cornea of the eye, (c) projecting with the first adjustable optical assembly a second image from the digital projector towards the eye at a second focal depth relative to the apex of the cornea of the eye, the second focal depth being different than the first focal depth, the second image including the vertical slit in the second transverse position, the second transverse position being offset from the first transverse position, and (d) receiving light reflected by the eye from the projecting step (c) with the first camera through the second adjustable optical assembly with the second adjustable optical assembly focused at the second focal depth relative to the apex of the cornea of the eye.

While multiple embodiments are disclosed, still other embodiments of the present disclosure will become apparent to those skilled in the art from the following detailed description, which shows and describes illustrative embodiments. Accordingly, the drawings and detailed description are to be regarded as illustrative in nature and not restrictive. Other aspects and optional and/or preferred embodiments will become apparent from the following description provided below with reference to the accompanying drawings.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein:

FIG. 18A illustrates an exemplary image for projection by a projector of an embodiment of the examination system of FIG. 6 of a third position of a single vertical slit;

FIG. 18B illustrates the image of FIG. 18A projected onto an eye under examination and imaged by a camera of the FIG. 7;

Corresponding reference characters indicate corresponding parts throughout the several views.

Figure 1:
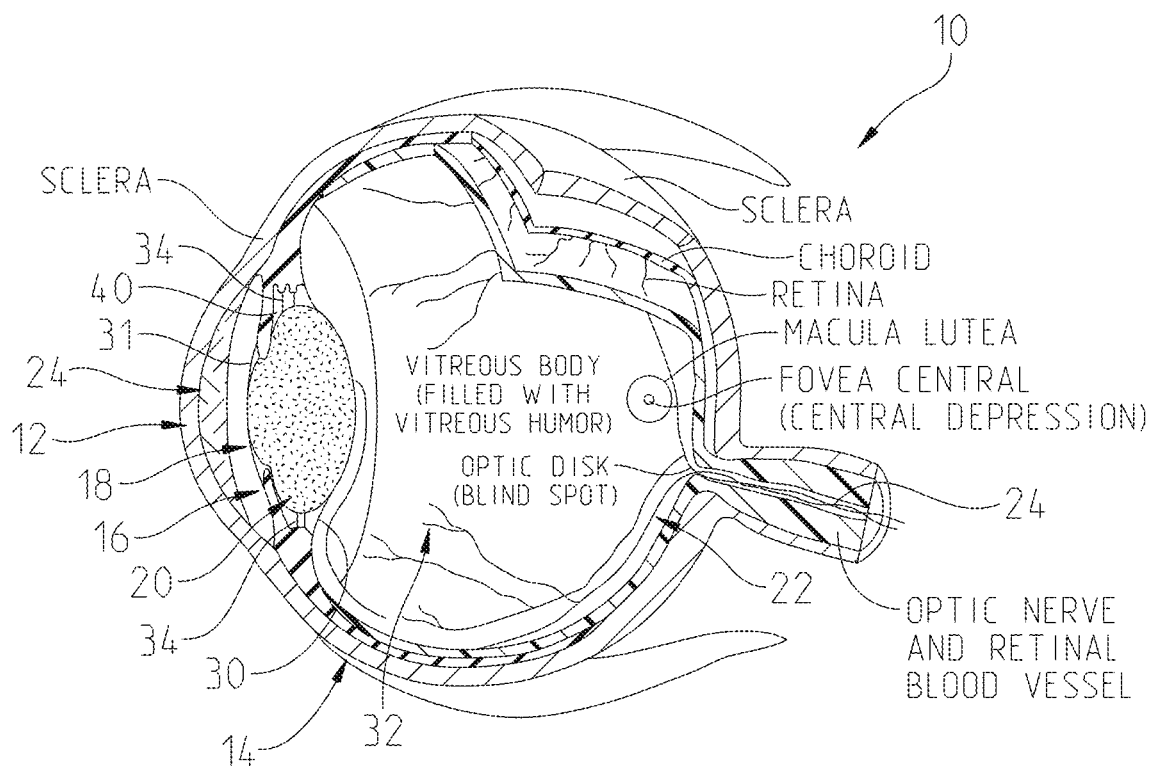
FIG. 1 illustrates a schematic view showing the basic components of the human eye.
Figure 1A:
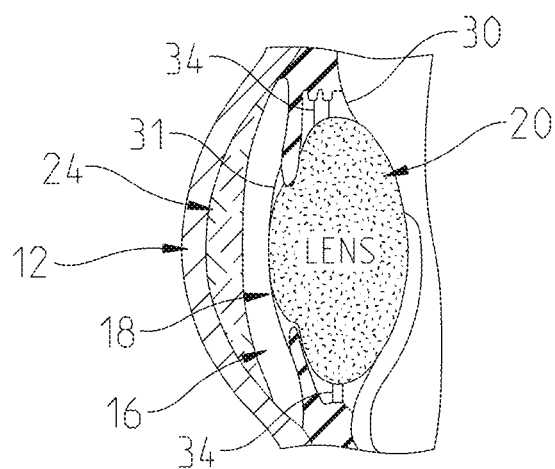
FIG. 1A illustrates an enlarged view of a portion of FIG. 1.

While the present disclosure is amenable to various modifications and alternative forms, specific embodiments have been shown by way of example in the drawings and are described in detail below. The intention, however, is not to limit the disclosure to the particular embodiments described.

DETAILED DESCRIPTION OF THE DRAWINGS

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. The term "a" or "an" entity refers to one or more of that entity. As such, the terms "a" (or "an"), "one or more" and "at least one" may be used interchangeably herein. It is also to be noted that the terms "comprising", "including", and "having" may be used interchangeably.

The terms "about", "substantially", "approximately" and other terms of approximation include the stated value plus/minus ten percent of the stated value. For example, "about 10 centimeters" should be interpreted to be 9-11 centimeters.

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 2:
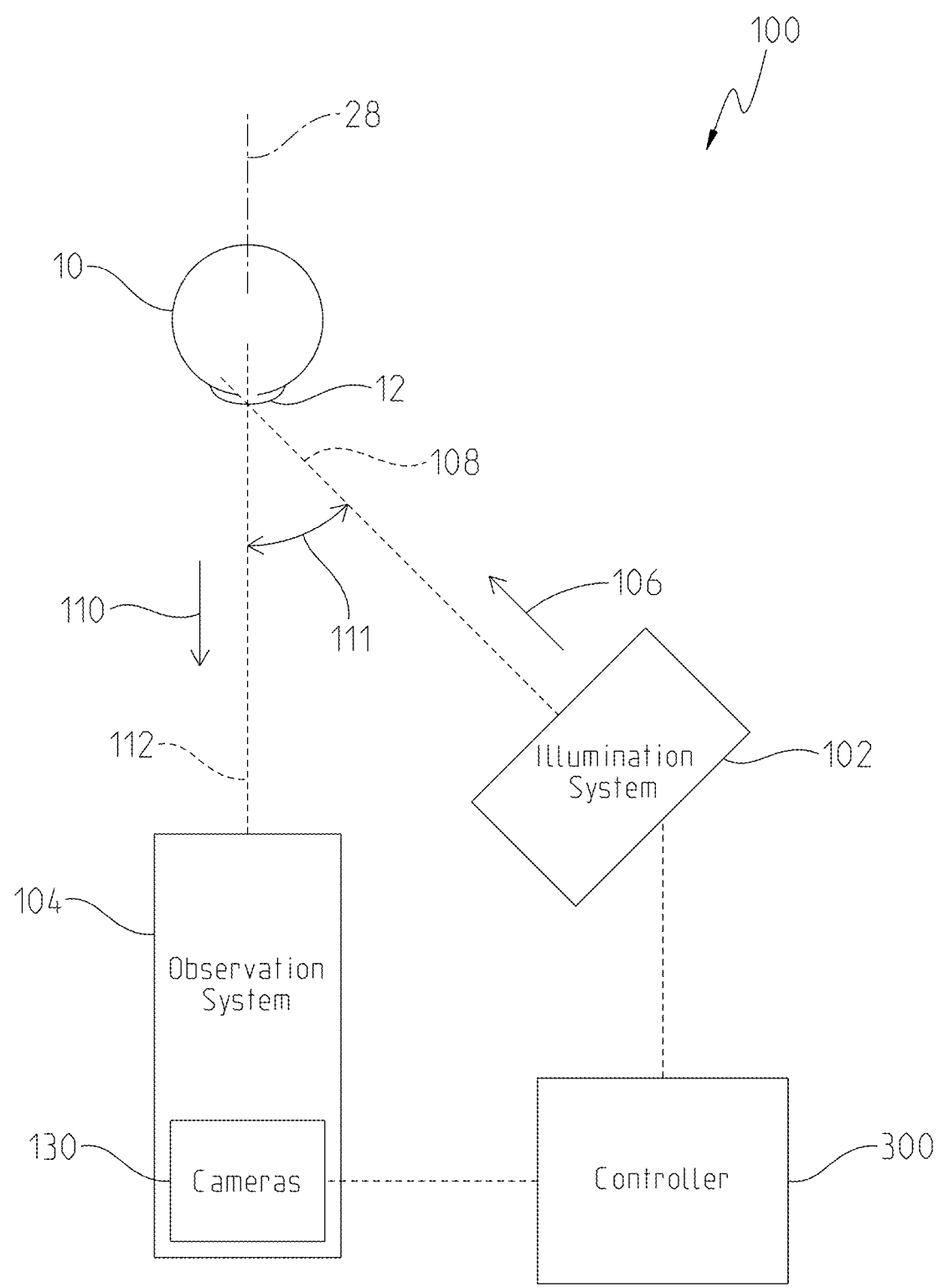
FIG. 2 illustrates an exemplary examination system of the present disclosure with an optical axis of an illumination system being angled relative to an optical axis of an observation system.

Referring to FIG. 2, an examination system 100 is shown. Examination system 100 includes an illumination system 102 and an observation system 104. Illumination system 102 illuminates eye 10 with light generally in direction 106 along an optical axis 108. Observation system 104 receives reflected light from eye 10 generally in direction 110 along an optical axis 112. The reflected light includes diffuse reflections and may include specular reflections. Unless stated otherwise the terms "reflected", "reflection", "reflects", and related terms are defined as diffuse reflection or back-scattering. As shown in FIG. 2, optical axis 112 is generally aligned with an optical axis 28 of eye 10 and optical axis 108 is angled relative to optical axis 112 by an angle 111. In embodiments, optical axis 108 and optical axis 112 are generally coplanar. Although illumination system 102 and observation system 104 are shown with observation system 104 being positioned directly in front of eye 10 and aligned with axis 28 of the eye 10 and illumination system 102 being angled relative to eye 10, illumination system 102 and observation system 104 may be positioned in any relationship to eye 10. In embodiments, illumination system 102 and observation system 104 are both angled relative to the optical axis 28 of the eye 10. In embodiments, illumination system 102 is positioned directly in front of eye 10 with optical axis 108 aligned with optical axis 28 of eye 10 and observation system 104 is positioned with optical axis 112 angled relative to optical axis 28 of the eye 10.

In embodiments, examination system 100 includes a secondary illumination source (not shown) which illuminates at least portions of the eye. The secondary illumination source may be any light source which provides a generally constant light intensity across a large portion of the eye 10 or bright region at a portion of the eye 10. In embodiments, secondary illumination source may be at a different wavelength than the primary light source of illumination system 102. In one example, the secondary illumination source may be supported by illumination system 102. In one example, the secondary illumination source 114 is separate from illumination system 102.

Observation system 104 includes a plurality of cameras 130. The plurality of cameras 130 each record images of the eye 10 under examination. At least one of the plurality of cameras may record light field data associated with the light reflected from eye 10. The light field data permits refocusing of an image recorded by the at least one camera.

Each of illumination system 102 and observation system 104 may be coupled to a controller 300. In embodiments, controller 300 includes at least one processor 310 and associated memory 312 (see FIG. 4). Memory 312 includes exam logic 320, which monitors the output of cameras 130 and other inputs and sensors disclosed herein to perform one or more operations with examination system 100. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which controller 300 is not microprocessor-based, but rather is configured to control operation of examination system 100 based on one or more sets of hardwired instructions. Further, controller 300 may be contained within a single device or be a plurality of devices networked together, wired or wirelessly, or otherwise electrically connected to provide the functionality described herein.

Figure 4:
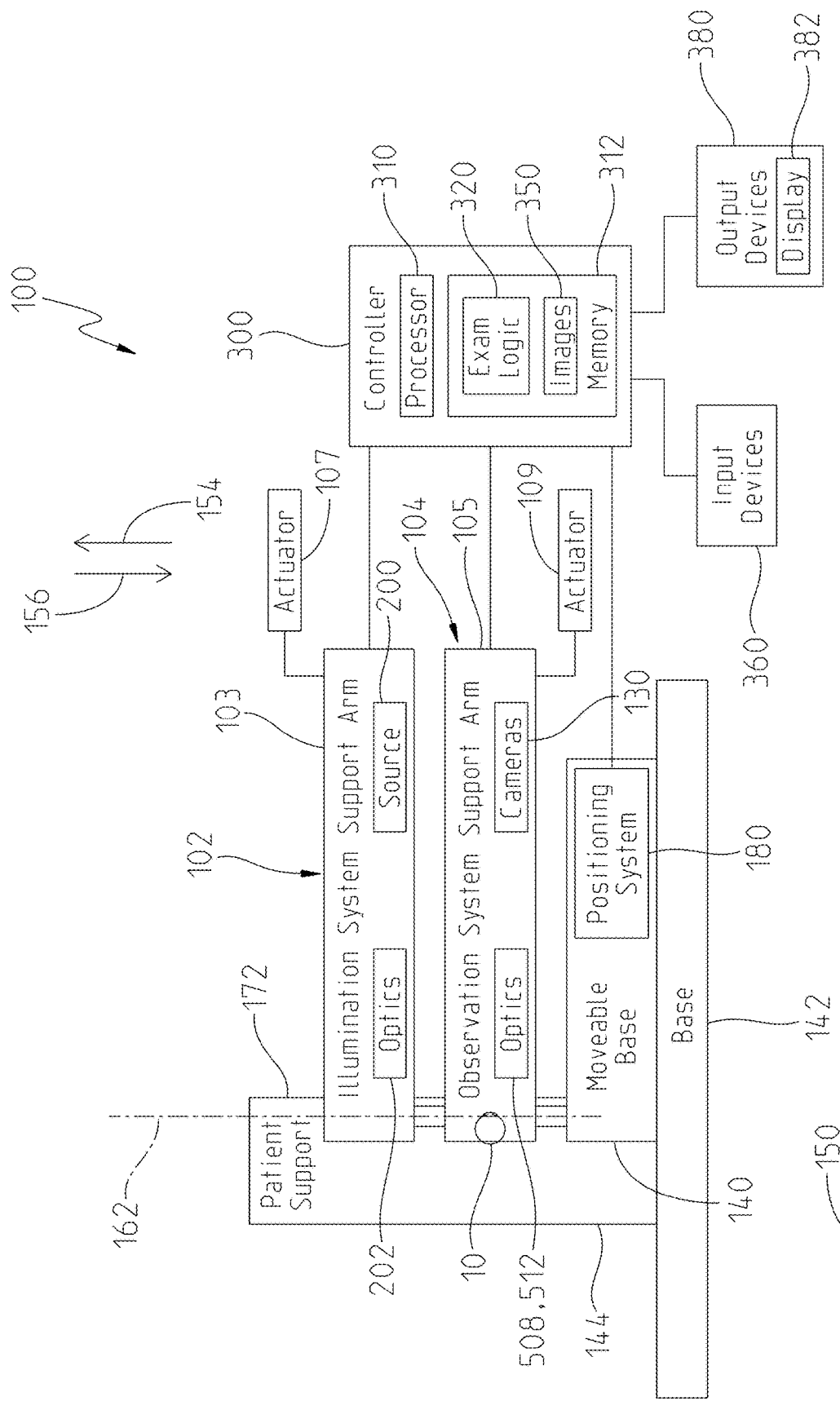
FIG. 4 illustrates a side view of an exemplary embodiment of the examination system of FIG. 2.

Electronic controller 300 may further receive input through one or more input devices 360 (see FIG. 4). Exemplary input devices include operator actuatable inputs, such as buttons, switches, levers, joysticks, dials, touch displays, and soft keys; sensors; a communication module for connection to a wired or wireless network; and other suitable input devices. Electronic controller 300 may further provide output through one or more output devices 380. Exemplary output devices include visual indicators, audio indicators, a communication module for connection to a wired or wireless network, and other suitable output devices. Exemplary visual indicators include displays, lights, and other visual systems. Exemplary audio indicators include speakers and other suitable audio systems.

Returning to FIG. 4, controller 300 controls one or more settings of illumination system 102 and/or observation system 104 and stores one or more images 350 captured by the plurality of cameras 130. Further, controller 300, in embodiments, controls an operation of one or more of illumination system 102 and observation system 104 with exam logic 320. In embodiments, the positioning of illumination system 102 and observation system 104 relative to the eye 10 is a manual operation. In embodiments, the positioning of illumination system 102 and observation system 104 relative to the eye 10 is controlled by controller 300 either through manual input, such as with an input device 360 which causes controller 300 to reposition actuators to maneuver one or both of illumination system 102 and observation system 104 or through an automated operation of exam logic 320 based on images captured by cameras 130, or a combination of both a manual operation and an automated operation.

Figure 3:
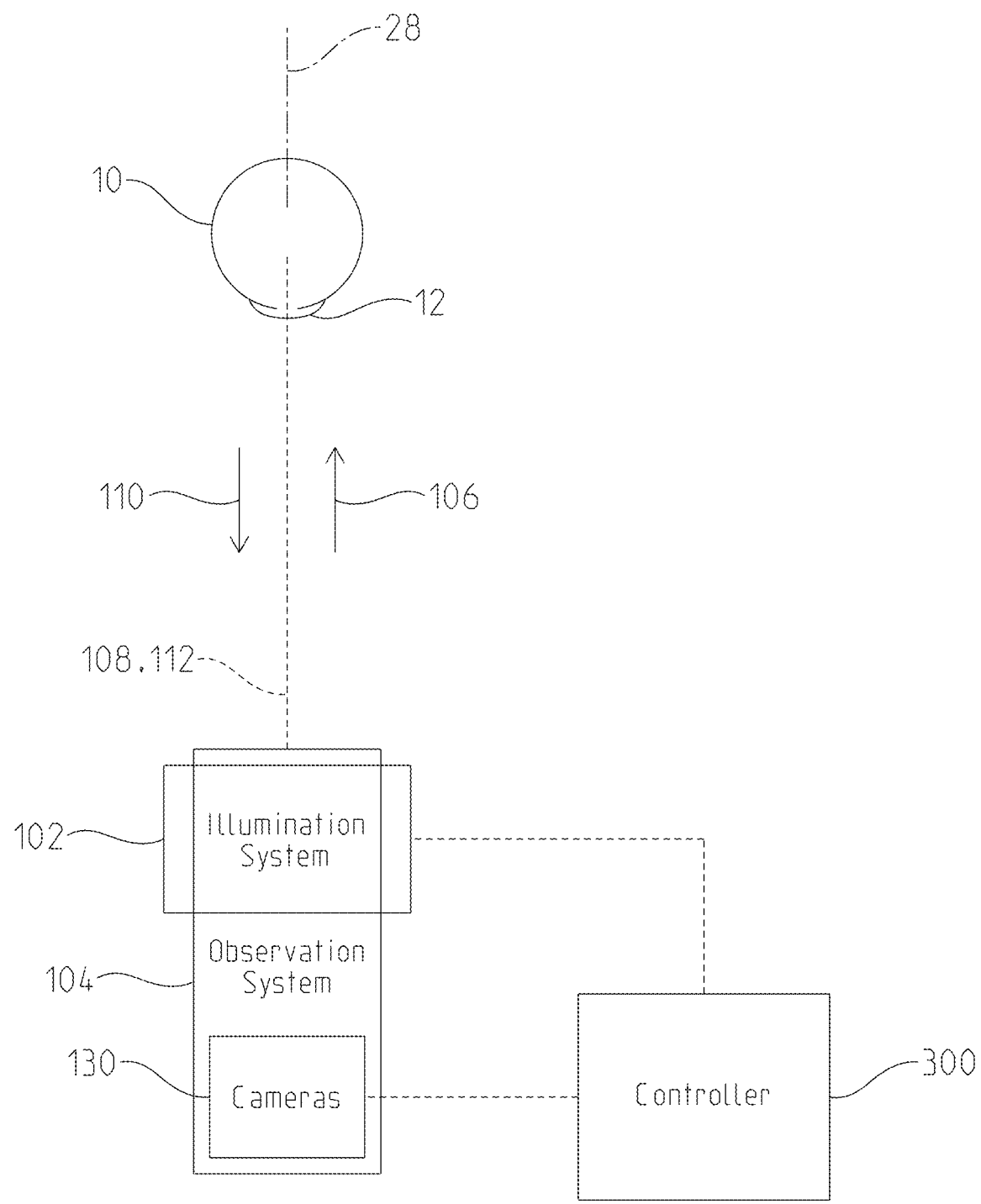
FIG. 3 illustrates the examination system of FIG. 2 with the optical axis of the illumination system being generally aligned with the optical axis of the observation system.

Referring to FIG. 3, examination system 100 is shown wherein optical axis 108 is generally coaxial with optical axis 112 and with optical axis 28 of the eye 10. Thus, observation system 104 is generally in line with illumination system 102. Although illumination system 102 and observation system 104 are shown being positioned directly in front of eye 10 and aligned with optical axis 28, illumination system 102 and observation system 104 may be angled relative to optical axis 28 of the eye 10, such as the position of illumination system 102 in FIG. 2. Further, the optical axis 108 of illumination system 102 and the optical axis 112 of observation system 104 may be parallel with optical axis 28 of the eye, but offset from the optical axis 28 of the eye 10.

Figure 5:
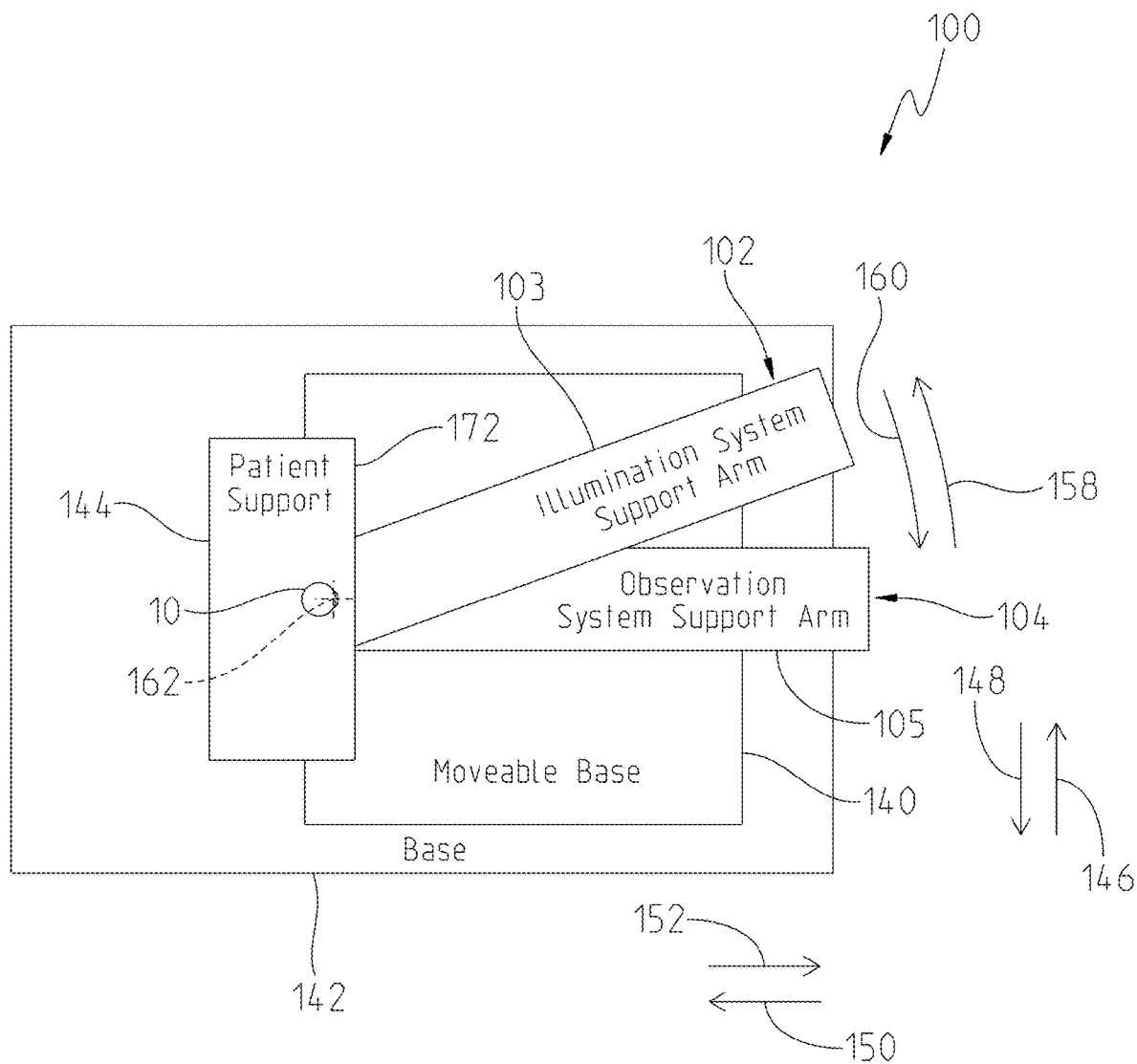
FIG. 5 illustrates a top view of the examination system of FIG. 4.

Referring to FIGS. 4 and 5, an exemplary embodiment of examination system 100 is shown. Illumination system 102 and observation system 104 are shown supported by a moveable base 140 which is supported on top of a base 142. In embodiments, base 142 is the floor, a table-top, or an intermediate base which is supported by the floor or tabletop or other structure in an examination room. A patient support 144 is also supported by base 142. Patient support 144 positions an eye 10 of a patient relative to illumination system 102 and observation system 104.

Referring to FIG. 5, moveable base 140 is generally moveable in an x-axis in direction 146 and direction 148 relative to base 142 and in a z-axis in direction 150 and direction 152 relative to base 142. The movement of moveable base 140 relative to base 142 results in the movement of both illumination system 102 and observation system 104. In embodiments, one of illumination system 102 and observation system 104 is not supported by moveable base 140 and thus does not move in concert with moveable base 140 when moveable base 140 is moved relative to base 142.

In embodiments, examination system 100 does not include a base 142 and patient support 144 is a head worn apparatus, similar to goggles. A movable base 140 may be movable mounted to patient support 144 to move illumination system 102 and/or observation system 104 relative to patient support 144. In embodiments, a patient is not supported by patient support 144 and illumination system 102 and observation system 104 are positionable relative to eye 10, such as by an articulating arm supporting both illumination system 102 and observation system 104 or a pair of articulating arms, one supporting illumination system 102 and one supporting observation system 104. The articulating arms may be robotic arms which are controlled by controller 300 to position illumination system 102 and observation system 104 relative to eye 10 of the patient for examination. An advantage, among others, of this arrangement is for patients that are bedridden. In examples, the illumination system 102 and observation system 104 are aligned to the apex of the cornea 12 of the eye 10 of the patient.

Returning to FIG. 4, in embodiments, illumination system 102 and observation system 104 are both moveable relative to moveable base 140 in a y-axis in direction 154 and direction 156 as illustrated in FIG. 4. In embodiments, illumination system 102 and observation system 104 are fixed relative to moveable base 140 in the y-axis and patient support 144 is movable relative to illumination system 102, observation system 104, and moveable base 140 in the y-axis. In embodiments, patient support 144 is supported on base 142 independent of moveable base 140 and may include a head support that is moveable in the y-axis in directions 154, 156.

Further, each of illumination system 102 and observation system 104 are rotatable relative to moveable base 140 in direction 158 and direction 160 as illustrated in FIG. 5. In the illustrated embodiment, each of illumination system 102 and observation system 104 are rotatable about an axis 162. As shown in FIG. 4, axis 162 may be positioned within an envelope 170 of patient support 144 and, in particular, rearward of a leading edge 172 of patient support 144. Illumination system 102 and observation system 104 are individually rotatable relative to moveable base 140. As such, illumination system 102 may be rotated relative to moveable base 140 without a corresponding rotation of observation system 104 relative to moveable base 140 or vice versa.

Although illumination system 102 and observation system 104 are shown being rotatable about a vertical axis, axis 162, one or both of illumination system 102 and observation system 104 may be rotatable about a horizontal axis parallel to the x-axis or another axis in a plane defined by the x-axis and the y-axis. In embodiments, each of illumination system 102 and observation system 104 is rotatable about a separate axis relative to moveable base 140.

Returning to FIG. 4, illumination system 102 is illustrated as including a source 200 and an optics assembly 202 supported by illumination system support arm 103. Similarly, the plurality of cameras 130 and associated optics, such as optics 508, 512, of observation system 104 are supported by an observation system support arm 105. Returning to illumination system 102, in embodiments, source 200 is a mechanical slit forming device having an illumination source and an adjustable width aperture which provides a generally rectilinear slit of light from the illumination source to optical assembly 202. In embodiments, source 200 is a projector. An exemplary projector is a digital light projector (DLP). A digital light projector electronically generates an image that is projected from a plurality of light sources, such as the pixels of a display screen. As described herein, the digital light projector may be used to simulate a slit for a slit lamp examination of eye 10 and the slit may be moved across the eye 10 by altering the image that is projected. Further, portions of an image projected by the digital light projector may be used to track eye movement. Additionally, portions of an image projected by the digital light projector may be used to align the eye 10 to observation system 104.

Figure 6:
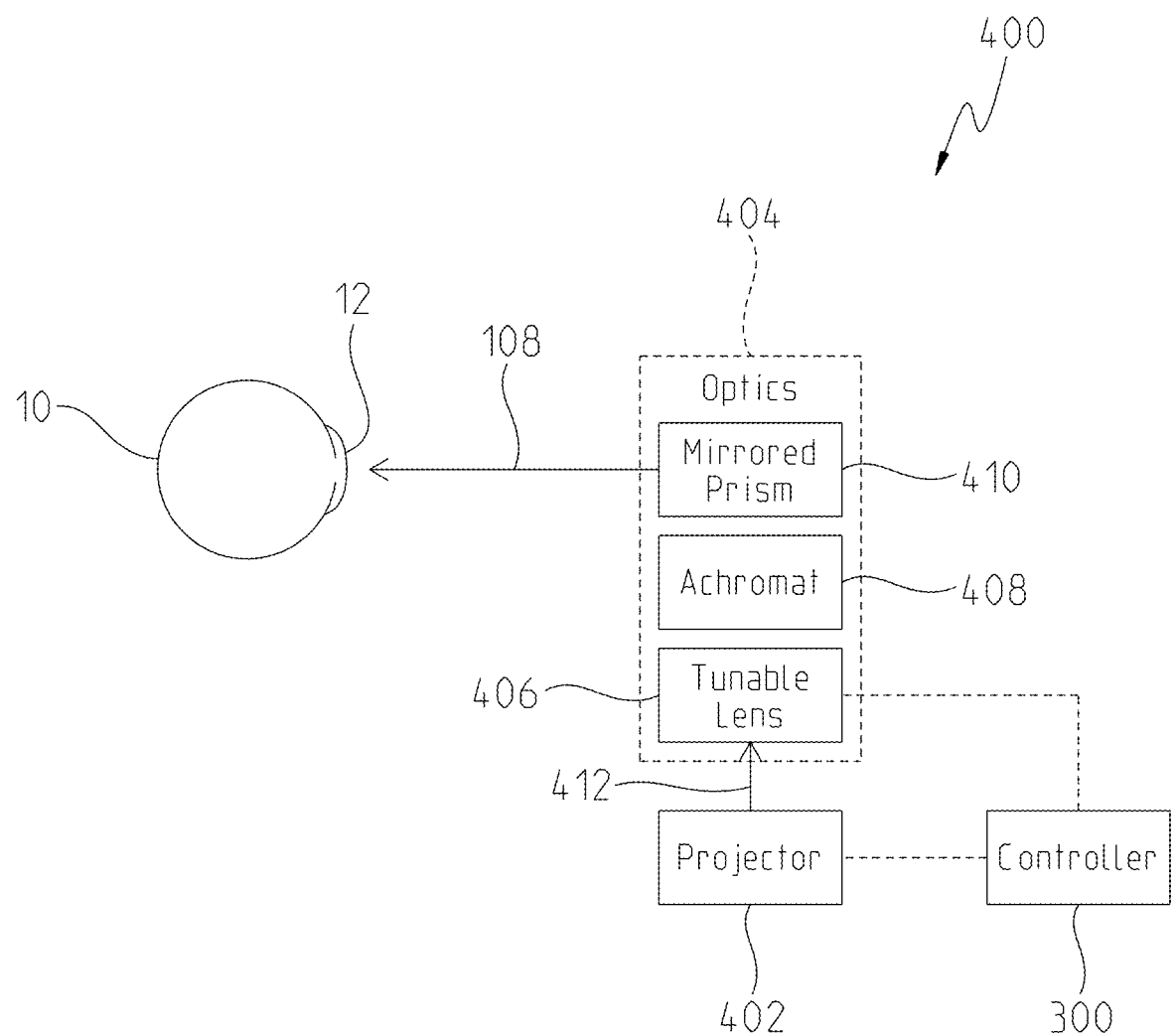
FIG. 6 illustrates an exemplary illumination system of FIG. 2.

Referring to FIG. 6, an exemplary illumination system 400, as an example of illumination system 102, is shown. Illumination system 400 includes a projector 402 and an optical assembly 404. In embodiments, projector 402 is a digital light projector. An exemplary digital light projector is Model No. DLPDLCR3310EVM LightCrafter digital micromirror device (DMD) available from Texas Instruments located at 12500 TI Blvd. in Dallas, Texas 75243 United States. Projector 402 is operatively coupled to controller 300 which controls the image to be displayed by projector 402. In embodiments, controller 300 is internal to projector 402. In embodiments, projector 402 communicates with controller 300 over a wired or wireless network or connection. As used herein, controller 300 encompasses the functionality of projector 402 and other controllable components of cameras 130, illumination system 102, observation system 104, optical assembly 404, optical assembly 508, and/or optical assembly 512 and controller 300 may be a single controller 300 or a collection of individual controllers that together perform the functionality of controller 300. In embodiments, illumination system support arm 103 and/or observation system support arm 105 include respective actuator systems 107, 109 (see FIG. 4), such as a motor and gearset, which are controlled by controller 300 to control an angular position of illumination system support arm 103 and/or observation system support arm 105 relative to moveable base 140 and/or each other. Exam logic 320 of controller 300, along with controlling other parameters, such as depth of focus described herein, controls the position of illumination system support arm 103 and/or observation system support arm 105 along with shapes of the slit projected at eye 10 during an examination. For example, exam logic 320 of controller 300 may simulate a conventional slit lamp exam. The positions of illumination system support arm 103 and/or observation system support arm 105 are recorded by controller 300 and associated with captured images 350 of observation system 104 for retrieval by controller 300. Additional details of systems, sensors, and characteristics to be captured with images are disclosed in U.S. Pat. No. 10,092,183, the entire disclosure of which is expressly incorporated by reference herein.

Optical assembly 404 projects the image produced by projector 402 onto eye 10. In embodiments, optical assembly 404 is adjustable to alter a focus plane of optical assembly 404 and thus focus the image produced by projector 402 at different depths of eye 10. In embodiments, the focal length of optical assembly 404 is adjustable due to the inclusion of at least one tunable lens 406 whose focal length may be altered without altering an overall position of the lens 406 relative to other components of optical assembly 404. Exemplary tunable lens 406 include electrically tunable lens available from Optotune Switzerland AG located at Bernstrasse 388, 8953 Dietikon, Switzerland. Electrically tunable lens may have their curvatures adjusted and hence their focal length by applying an electrical current to the lens. By controlling the electrical current, a controller, such as controller 300 may control the focal length of tunable lens 406 and hence the focal length of optical assembly 404. In embodiments, optical assembly 404 includes multiple tunable lens.

In embodiments, the focal length of optical assembly 404 is adjustable due to the inclusion of one or more movable lenses whose overall positions relative to other lenses may altered. In examples, the one or more movable lenses are carried by stages or other movable supports whose position may be controlled with a controller, such as controller 300, to alter the focal length of optical assembly 404. In embodiments, optical assembly 404 includes a combination of one or more movable lenses and one or more tunable lenses which optionally may be movable to alter a focal length of optical assembly 404.

In the illustrated embodiment, optical assembly 404 includes an achromat 408. Achromat 408 controls chromatic aberrations when the image projected by projector 402 includes multiple wavelengths, such as to simulate a white light slit for a slit lamp examination of eye 10. In embodiments, wherein projector 402 projects a monochromatic image achromat 408 may be omitted. In other embodiments a multi-element lens such as a camera lens with its chromatic and monochromatic aberrations as well as field curvature and distortion may be used for optical assembly 404. Exemplary lens include the model NMV-50 available from NAVITAR.

In the illustrated embodiment, optical assembly 404 includes a mirrored prism 410 which alters the optical axis that the image produced by projector 402 is projected. As shown in FIG. 6, the direction the image is projected is altered from axis 412 to optical axis 108. In embodiments wherein axis 412 is aligned with optical axis 108, mirrored prism 410 may be omitted. Further, although a mirrored prism 410 is shown, optical assembly 404 may use front surfaced mirrors or other reflective optics to alter the direction of the image projected by projector 402.

Figure 7:
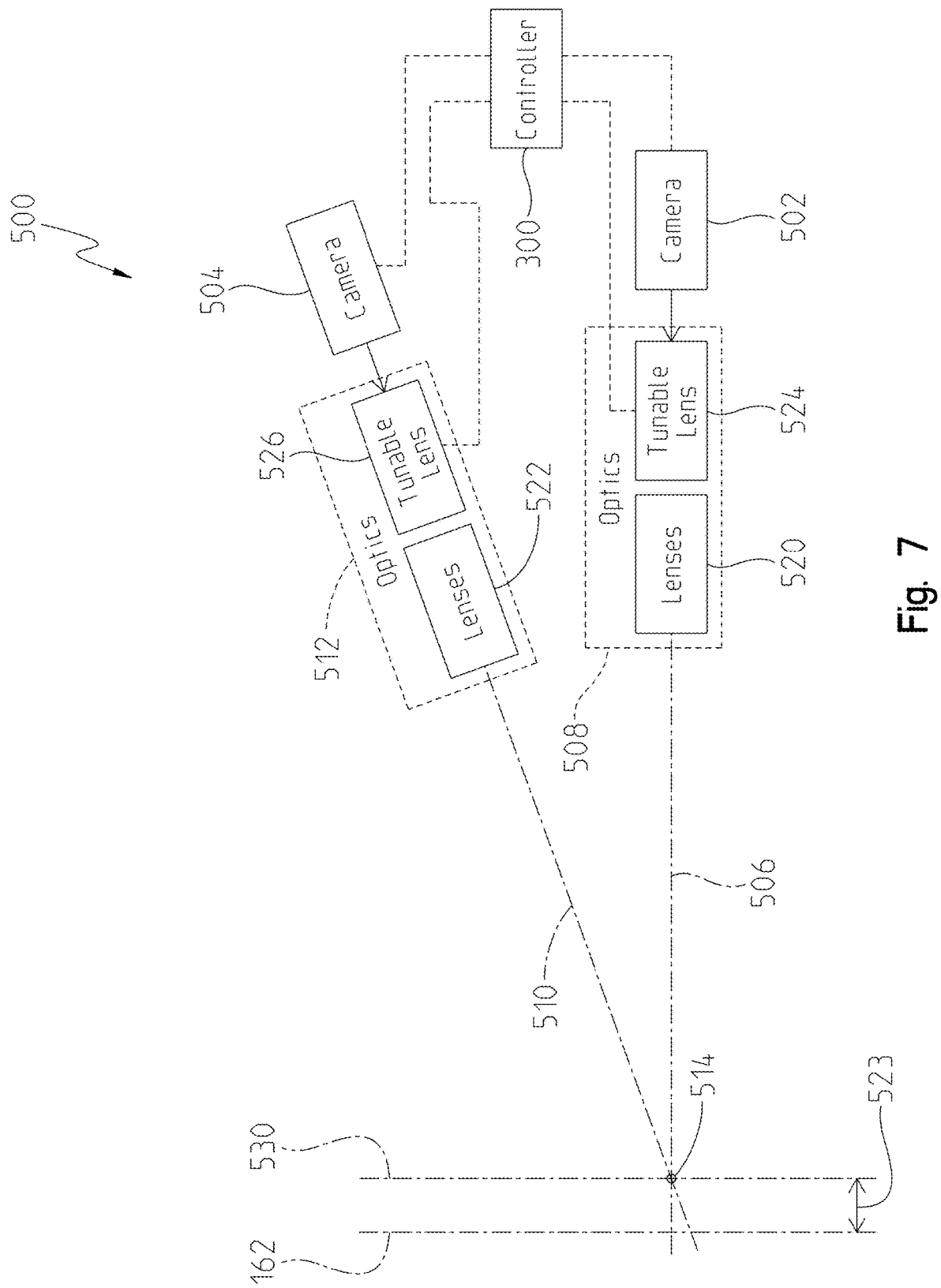
FIG. 7 illustrates an exemplary observation system of FIG. 2 including a first camera and a second camera.

Referring to FIG. 7, an exemplary observation system 500, as an example of observation system 104, is shown. Observation system 500 includes a plurality of cameras, illustratively two cameras, which are directed toward a position of eye 10. A first camera 502 is directed along axis 506, which may be aligned with optical axis 112 (see FIG. 2), and includes an associated optical assembly 508. A second camera 504 is directed along axis 510 and includes an associated optical assembly 512. Axis 510 is angled relative to axis 506 and intersects axis 506 at location 514. In embodiments, location 514 is within a focal range of the first camera 502 and associated optics 508 and the second camera 504 and associated optics 512. In embodiments, axis 510 is coaligned with axis 506. In embodiments, axis 510 does not intersect axis 506, but rather axis 510 and axis 506 are skew. Although a single camera 504 is illustrated, in embodiments, multiple cameras 504 are provided. For example, a plurality of cameras 540 may be used to capture images to provide a stereo view of eye 10 on display 382 or stored in memory 312 for later retrieval.

In the illustrated embodiment, axis 510 is angled downwards towards axis 506 and axis 506 is horizontal. In embodiments, axis 510 is angled upward towards axis 506 and axis 506 is horizontal. In embodiments, axis 510 is horizontal and axis 506 is angled upwards or downwards towards axis 510 depending on the positioning of camera 502 and optical assembly 508. In embodiments, both axis 506 and axis 510 are angled relative to horizontal. Although shown being vertically aligned, axis 510 may be rotated about axis 506 so that axis 510 and axis 506 are horizontally aligned or aligned along a plane passing through axis 506 and angled relative to vertical.

Each of optical assembly 508 and optical assembly 512 focus light reflected by eye 10, diffuse light, into the respective one of first camera 502 and second camera 504. In the illustrated embodiment, each of optical assembly 508 and optical assembly 512 includes one or more lenses 520, 522 and one or more tunable lenses 524, 526. In embodiments, one or both of optical assembly 508 and optical assembly 512 may also include reflective optics, which optionally may introduce power into the respective optical assembly 508, 512. Further, in embodiments, one or both of optical assembly 508 and optical assembly 512 may omit one of lenses 520, 522 or tunable lenses 524, 526. Regardless of the make-up of the respective optical assembly 508 and optical assembly 512, each of optical assembly 508 and optical assembly 512 is adjustable to alter a focal plane of the respective first camera 502 and second camera 504. In embodiments, at least one plane 507 (see FIG. 22) to be imaged by observation system 500 is normal to the optical axis 506 of the observation system 500. Observation system 500 is focused to image the plane including point 682. As discussed herein, lenses, such as lenses 520, 522, may be provided on movable supports whose positions may be adjusted to alter a focal length of the respective optical assembly 508 and optical assembly 512 and tunable lenses, such as tunable lenses 524 and 526, may have a focal length of the lens altered by altering an electrical current applied to the respective tunable lenses 524 and tunable lenses 526.

In embodiments, first camera 502 and second camera 504 are each digital cameras having detector arrays comprised of pixels which record the light reflected from eye 10 and focused by the respective optical assembly 508 and optical assembly 512 on the detector array of the respective first camera 502 and second camera 504. The detector arrays may include multiple pixel types, such as a red wavelength sensitive detection pixel, a green wavelength sensitive detection pixel, and a blue wavelength sensitive detection pixel. In embodiments, one or both of first camera 502 and second camera 504 are light field cameras which record light field data to allow through digital processing to further alter a focus of an image. Exemplary light field cameras include plenoptic cameras.

As shown in FIG. 7, a vertical axis 530 passing through location 514 is offset from axis 162 by a first distance 523. In embodiments, first distance 523 is about 7.7 millimeters (mm). In embodiments, first distance 523 is between about 5 mm to about 10 mm. In embodiments, vertical axis 530 is coaligned with axis 162 and first distance 522 is zero. In embodiments, vertical axis 530 is set to equal a radius of curvature of cornea 12 of eye 10. By having axis 162 behind vertical axis 530, axis 162 may be placed approximately at the center of curvature for cornea 12 of eye 10 and location 514 on the surface of cornea 12 of eye 10. Thus, as observation system 104 is rotated about axis 162, each of first camera 502 and second camera 504 may remain focused on cornea 12 of eye 10 assuming a spherical model for cornea 12 of eye 10. Similarly, as illumination system 102 is rotated about axis 162, the image projected by illumination system 102 may remain focused on cornea 12 of eye 10 assuming a spherical model for cornea 12 of eye 10. In embodiments, adjustments to the focal position of illumination system 102 and observation system 104 may be made by controller 300 to move location 514 at different depths within eye 10 or to follow an aspheric model of cornea 12 of eye 10, as described herein.

Figure 8:
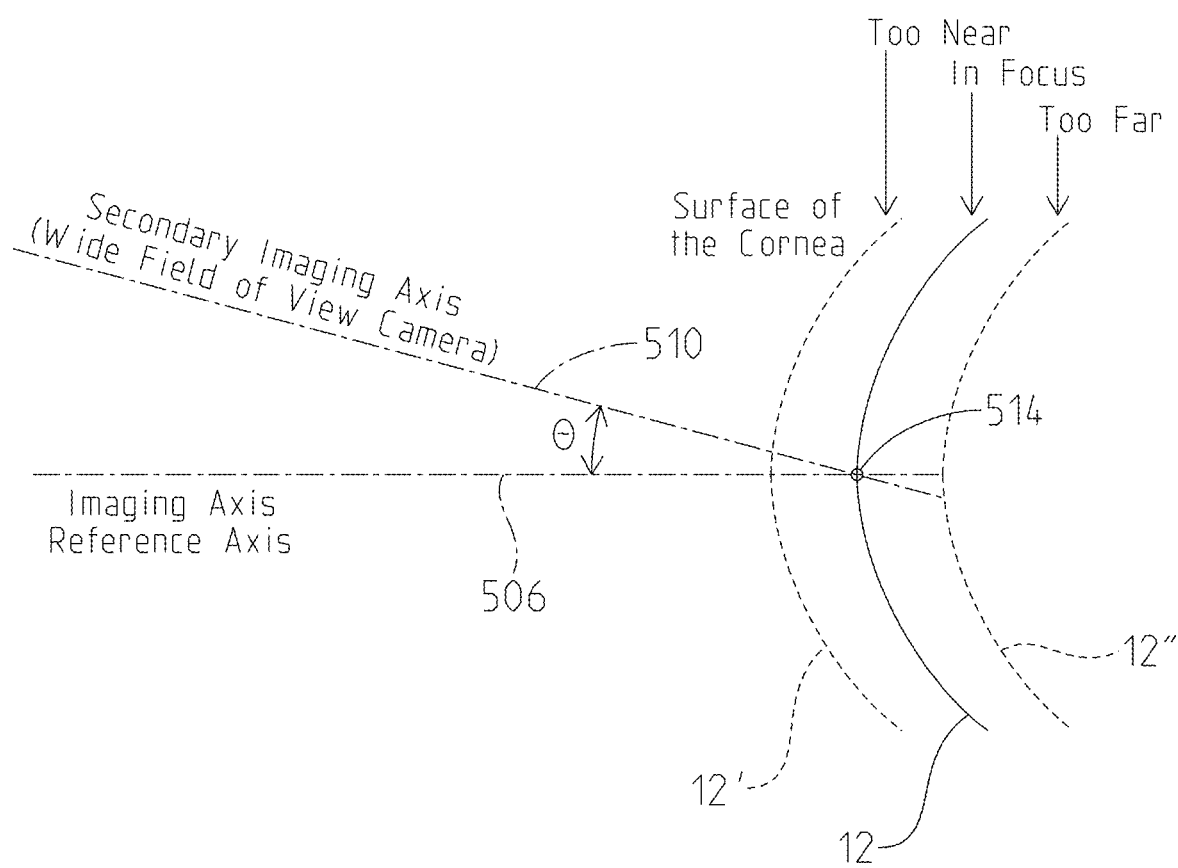
FIG. 8 illustrates a representation of the imaging axes of the first camera and the second camera of FIG. 7.

Turning to FIG. 8, location 514 is shown positioned on the surface of cornea 12 of eye 10. Cornea 12 is also shown at a position too near to first camera 502 and second camera 504, as represented by cornea 12', and at a position too far from first camera 502 and second camera 504, as represented by cornea 12". If the cornea 12 is either too near or too far moveable base 140 may be adjusted to move location 514 to the surface of cornea 12. In embodiments, moveable base 140 may be moved manually. In embodiments, moveable base 140 is moved by controller 300 automatically. Alternatively to moving the movable base 140, one or both of optics 508 and optics 512 may be adjusted by controller 300 to move the location 514. In embodiments, both moveable base 140 and at least one of optics 508 and optics 512 are adjusted to move the location 514, such as by controller 300. Controller 300 may also adjust the focus of illumination system 102 and the lateral position of the light projected by illumination system 102. The lateral position of the light projected by illumination system 102 may be adjusted by changing the image projected by projector 402, such as changing which pixels correspond to the slit portion of the image instead of the background portion of the image (see FIG. 26).

Figure 9B:
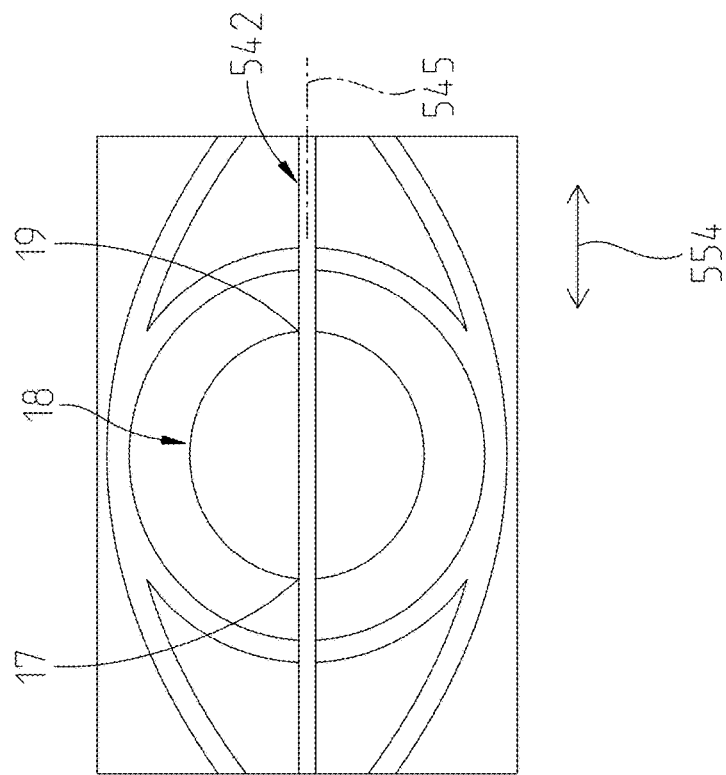
FIG. 9B illustrates the image of FIG. 9A projected onto an eye under examination.
Figure 9A:
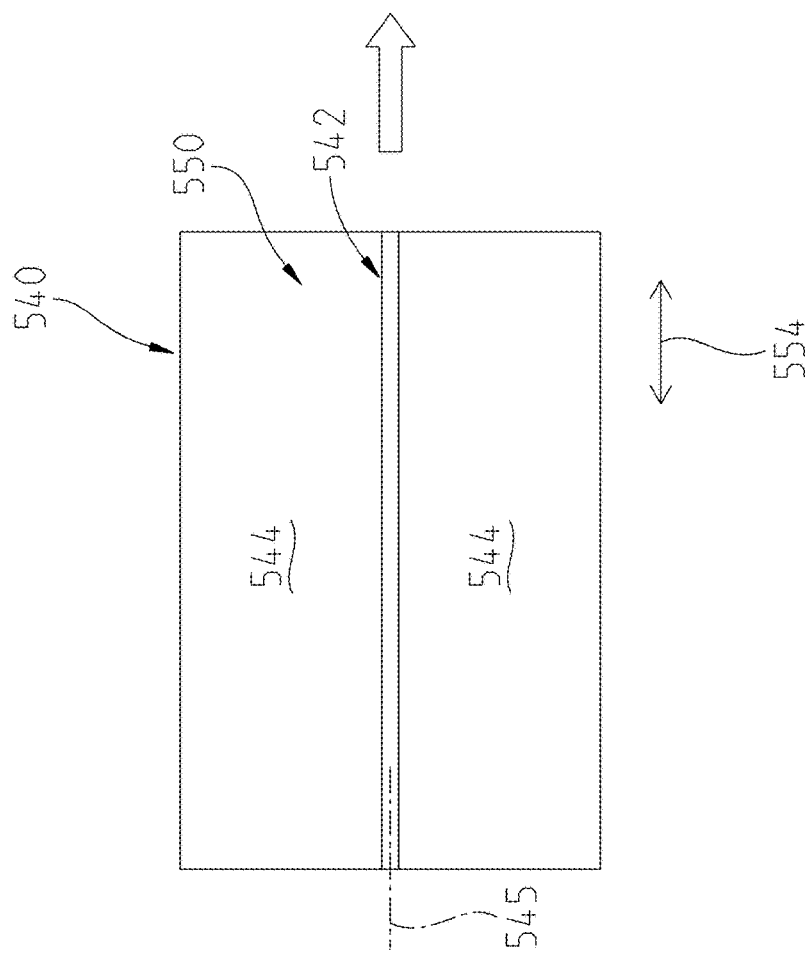
FIG. 9A illustrates an exemplary image for projection by a projector of an embodiment of the examination system of FIG. 6.

In embodiments, source 200 of illumination system 102 may be used to assist in positioning location 514 at the surface of cornea 12. For example, illumination system 102 may project a test pattern 550 (see FIG. 9A) on eye 10 (see FIG. 9B). Referring to FIG. 9A, an image 540 of an exemplary test pattern is shown having a bright central horizontal slit 542 and diffuse lower light regions 544. In embodiments, image 540 is produced by projector 402 and projected onto eye 10 as shown in FIG. 9B (image observed by camera 502). As shown in FIGS. 9A and 9B, the orientation of slit 542 is the same. In embodiments, optical assembly 404 flips or otherwise alters the orientation of an image produced by projector 402 as it passes through optical assembly 404 and is projected onto eye 10. For simplicity, the images produced by projector 402 provided herein are shown to have the intended orientation as projected on eye 10.

As shown in FIG. 9B, horizontal slit 542 is vertically aligned with the center of pupil 18 of eye 10. If horizontal slit 542 is not vertically aligned with the center of pupil 18 of eye 10, patient support 144 may be adjusted up in direction 154 or down in direction 156 to center horizontal slit 542 on pupil 18 of eye 10. In embodiments, controller 300 automatically adjusts a height of patient support 144 to vertically align horizontal slit 542 with the center of pupil 18 of eye 10. For example, controller 300 may analyze the intensity values of the pixels recorded by first camera 502 to determine a left edge 17 and a right edge 19 of pupil 18 and move patient support 144 up and down to determine a height position whereat a separation between left edge 17 and right edge 19 is at a maximum. The determined height position corresponds to horizontal slit 542 being vertically aligned with the center of pupil 18 of eye 10. In embodiments, the height of patient support 144 is manually adjusted by the person performing the test on the patient to vertically align horizontal slit 542 with the center of pupil 18 of eye 10.

Once horizontal slit 542 is vertically aligned with the center of pupil 18 of eye 10 (as shown in FIG. 9B), controller 300 may execute logic to align examination system 100 relative to eye 10 in directions 150, 152. In the illustrated embodiment, controller 300 executes logic to position location 514 on the surface of cornea 12 of eye 10 at the apex of the cornea 12 of the eye 10. In other embodiments, examination system 100 may be aligned relative to eye 10 in directions 150, 152 by focusing on other structures of eye 10, such as the iris structure, the location of the limbus, and/or the pupillary margin and using population averages of the anterior chamber depth from ocular tomography or laser interferometry approximate the location of the corneal apex and position direction 154 at this approximated location. Additionally, other techniques may be used to align examination system 100 relative to eye 10 including range distance finders, LiDAR, a calculated depth map from a Lightfield camera or stereo cameras. In embodiments, contrast detection autofocus, phase detection autofocus or dual pixel autofocus are used to maintain focus on the cornea, iris, lens, and/or other eye structures.

Figure 7A:
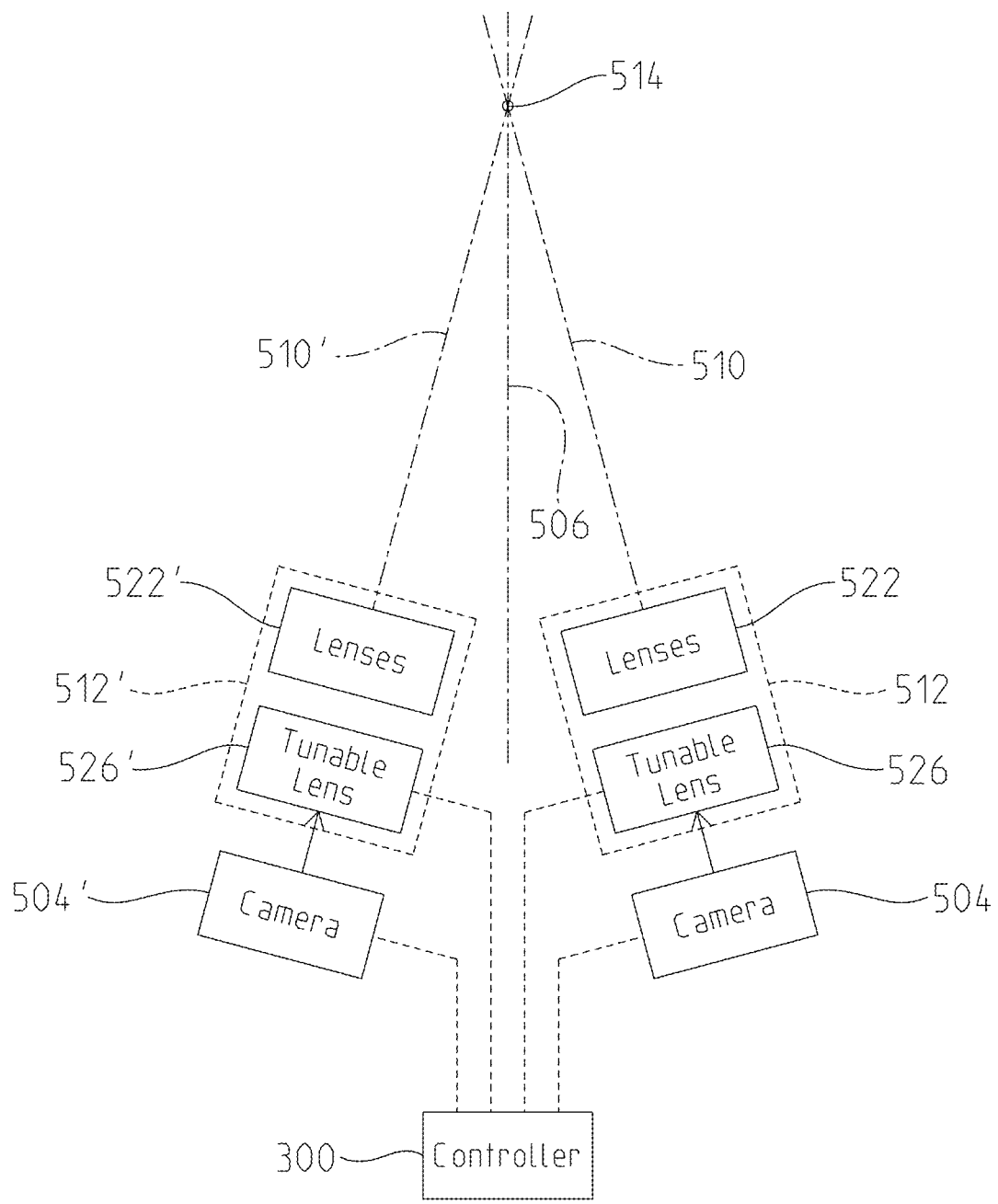
FIG. 7A illustrates another exemplary observation system of FIG. 2 including a first camera, a second camera, and a third camera.

Referring to FIG. 7A, a third camera 504' and associated optics 512' are shown positioned symmetrically to second camera 504 with respect to the axis 506 of the first camera 502. Second camera 504 and third camera 504' are both positioned in the same plane and are angled relative to first camera 502 in the same manner as second camera 504 in FIG. 7. Second camera 504 and third camera 504' form a stereo pair. In embodiments, second camera 504 and third camera 504' are used to adjust the position of location 514 relative to cornea 12. In embodiments controller 300 maintains actively the position of 514 on the surface of the cornea 12 based on second camera 504 and third camera 504' by moving movable base 140 while leaving the first camera 502 available for high resolution imaging. Additionally, other techniques may be used to align examination system 100 relative to eye 10 including range distance finders, LiDAR, a calculated depth map from a Lightfield camera or stereo cameras. In embodiments, contrast detection autofocus, phase detection autofocus or dual pixel autofocus are used to maintain focus on the cornea, iris, lens, and/or other eye structures.

Figure 10:
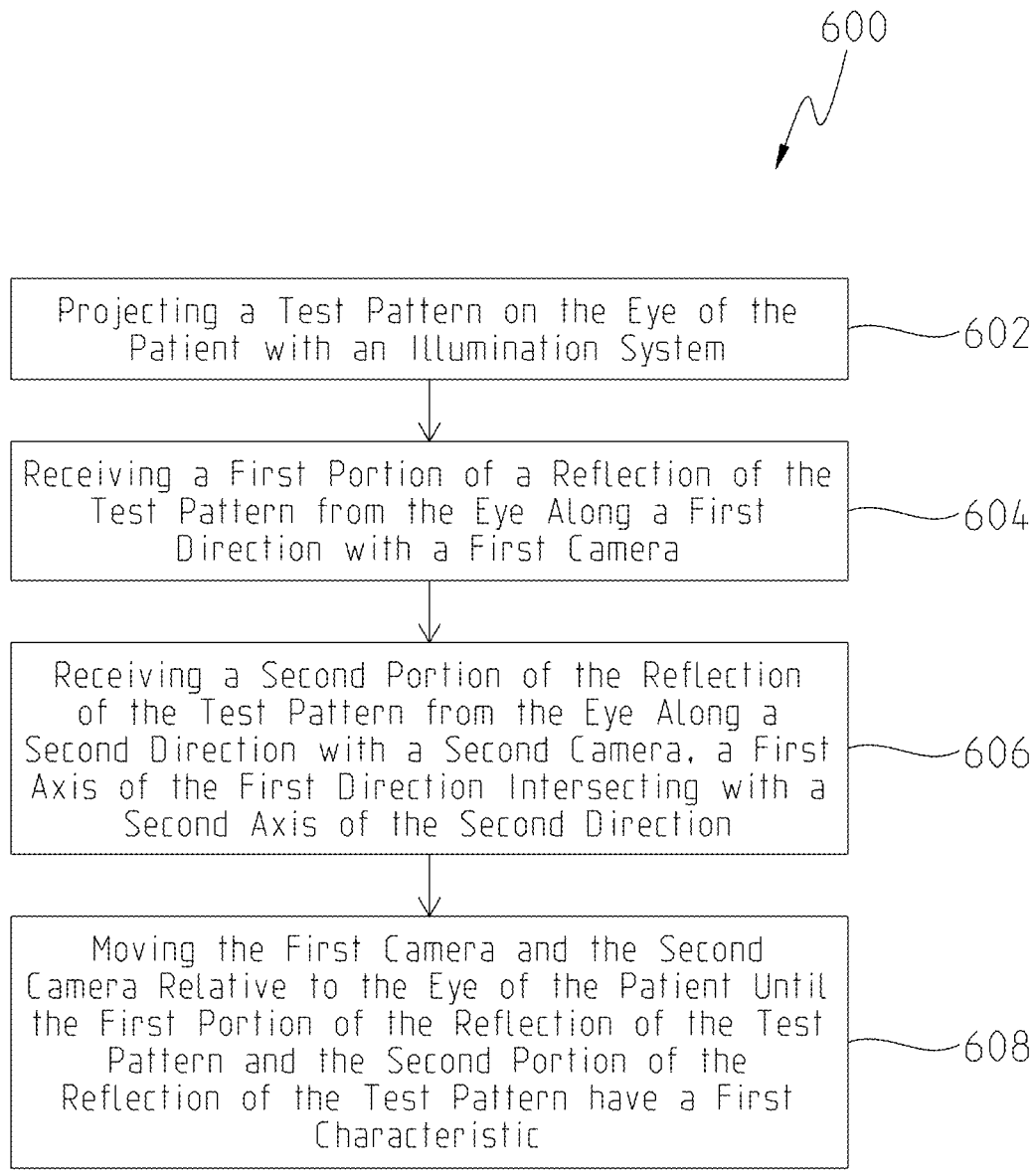
FIG. 10 illustrates an exemplary method or processing sequence of the present disclosure.
Figure 11B:
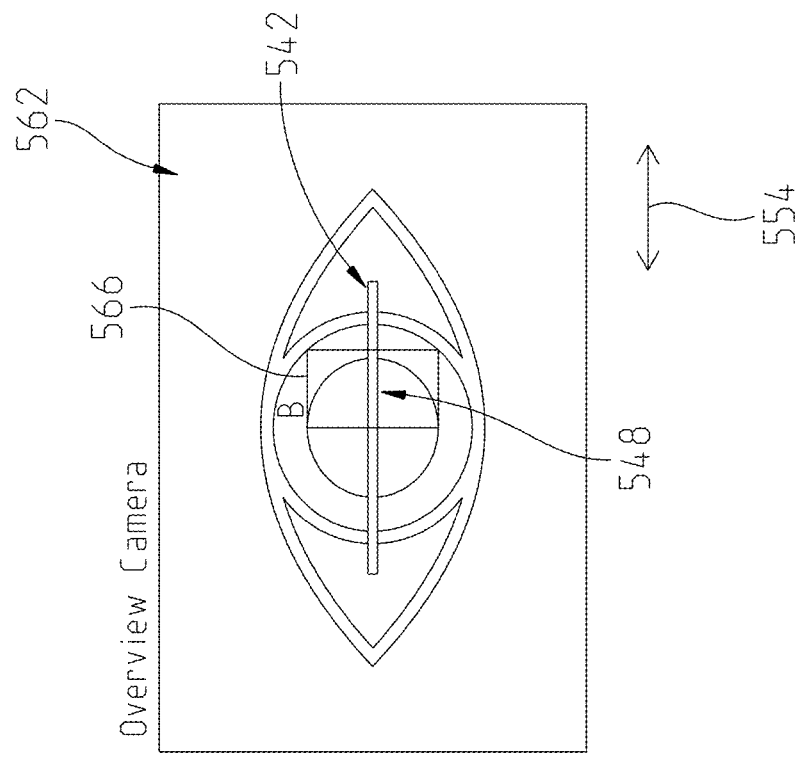
FIG. 11B illustrates an image of the second camera of FIG. 7 of the image of FIG. 9A projected onto the eye under examination as shown FIG. 9B.
Figure 11A:
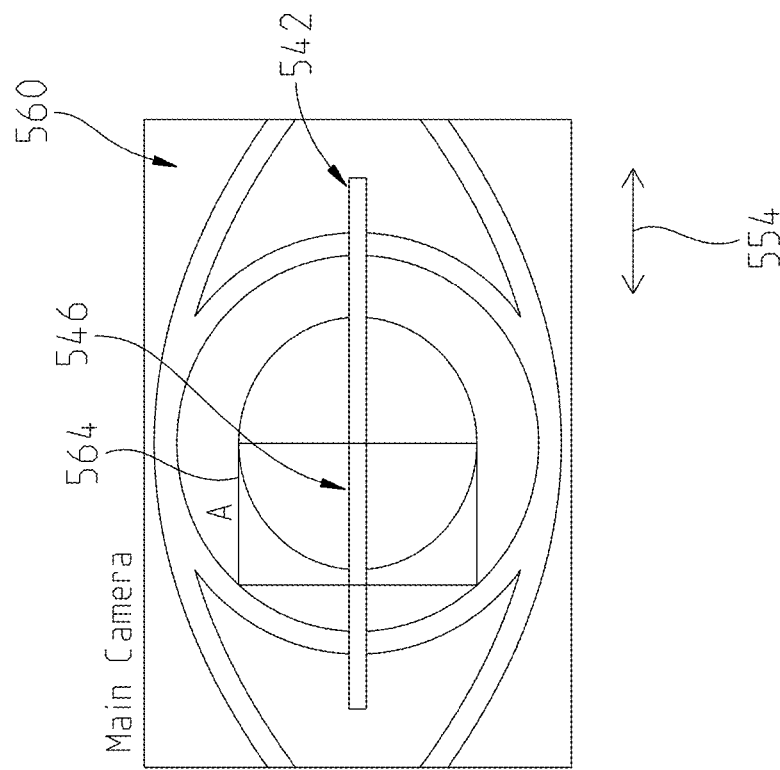
FIG. 11A illustrates an image of the first camera of FIG. 7 of the image of FIG. 9A projected onto the eye under examination as shown FIG. 9B.

Turning to FIG. 10, an exemplary processing sequence 600 of exam logic 320 of controller 300 is shown for aligning the cameras 130 of examination system 100 to the cornea 12 of eye 10. In embodiments, a technician may use examination system 100 to carry out the steps of processing sequence 600 in a manual operation.

Referring to FIG. 10, a test pattern is projected onto eye 10 of the patient with an illumination system, such as illumination system 102, as represented by block 602. In embodiments, the test pattern projected onto the eye 10 of the patient with the illumination system 102 is programmed into a digital light projector, such as projector 402, to display the test pattern and project it onto eye 10. In an example, the test pattern is a horizontal line.

Returning to FIG. 10, a first portion of a reflection of the test pattern from the eye is received along a first direction with a first camera, such as first camera 502, as represented by block 604. A second portion of the reflection of the test pattern from the eye is received along a second direction with a second camera, such as second camera 504, as represented by block 606. A first axis 506 of the first direction intersecting with a second axis 510 of the second direction. The first camera 502 and the second camera 504 are moved relative to the eye 10 of the patient until the first portion of the reflection of the test pattern and the second portion of the reflection of the test pattern have a first characteristic, as represented by block 608.

In embodiments, the first camera 502 and the second camera 504 are moved relative to the eye 10 of the patient by actuating a positioning system of the imaging system with a movement command from controller 300 based on the first portion of the reflection of the test pattern and the second portion of the reflection of the test pattern having a characteristic different from the first characteristic. Alternatively, the first camera 502 and the second camera 504 are moved relative to the eye 10 of the patient by receiving a manual input to a support, such as moveable base 140, of at least one of the first camera 502 and the second camera 504 to reposition the at least one of the first camera 502 and the second camera 504 relative to the eye 10 of the patient. Alternatively, as mentioned herein, the characteristics of one or more of optics 508 and optics 512 may be adjusted instead of moving moveable base 140 or in addition to moving moveable base 140.

In embodiments, processing sequence 600 further includes displaying the first portion of the reflection of the test pattern and the second portion of the reflection of the test pattern on a display. This provides a visual cue to the operator of examination system 100 of the alignment of examination system 100 to cornea 12 of the patient. In embodiments, each of illumination system 102, first camera 502, and second camera 504 are supported on a movable base 140 such that illumination system 102, first camera 502, and second camera 504 move as a unit relative to the eye 10 of the patient.

In embodiments, the test pattern includes a first elongated feature having a longitudinal axis in a third direction, the third direction being normal to a plane defined by the first direction along which the first portion of a reflection of the test pattern from the eye is received with first camera 502 and the second direction along which the second portion of a reflection of the test pattern from the eye is received with second camera 504. The first portion of the reflection of the test pattern may include a first portion of the elongated feature of the test pattern and the second portion of the reflection of the test pattern may include a second portion of the elongated feature of the test pattern. In embodiments, the first portion of the elongated feature of the test pattern and the second portion of the elongated feature of the test pattern are aligned along the third direction in the first characteristic indicating that the first camera 502 and the second camera 504 are aligned to the eye 10 of the patient by having location 514 aligned with the surface of cornea 12. When location 514 is not aligned with the surface of cornea 12, the first portion of the elongated feature of the test pattern and the second portion of the elongated feature of the test pattern are offset along the third direction, such as vertically offset when the third direction is horizontal, in a second characteristic indicating that at least one of the first camera 502 and the second camera 504 are misaligned to the eye 10 of the patient.

Referring to FIGS. 9A, 9B, 11A, 11B, and 12-14, an exemplary test pattern 550 (see FIG. 9A) is projected on eye 10 (see FIG. 9B). Referring to FIG. 9A, an image 540 of an exemplary test pattern 550 is shown having a bright central horizontal slit 542 and diffuse lower light regions 544. In embodiments, image 540 is produced by projector 402 and projected onto eye 10 as shown in FIG. 9B (image observed by camera 502). As shown in FIGS. 9A and 9B, the orientation of slit 542 is the same. In embodiments, optical assembly 404 flips or otherwise alters the orientation of an image produced by projector 402 as it passes through optical assembly 404 and is projected onto eye 10. For simplicity, the images produced by projector 402 provided herein are shown to have the intended orientation as projected on eye 10.

Horizontal slit 542 is an example elongated feature of test pattern 550. In embodiments, test pattern 550 includes multiple elongated features and/or additional feature shapes. The elongated features may be oriented in a horizontal direction, a vertical direction, a direction angled relative to horizontal, or combinations thereof. Test pattern 550 may include an elongated feature, such as horizontal slit 542, having a longitudinal axis 545 in a third direction 554. Third direction 554 is normal to a plane defined by the first direction of axis 506 and the second direction of axis 510. Stated another way third direction 530 is contained in a plane normal to the view of FIG. 7.

Main camera 502 receives a first portion of the reflection of the test pattern 550 (image 560 in FIG. 11A) which includes a first portion 546 of the elongated feature, horizontal slit 542, of the test pattern 550. Overview camera 504 receives a second portion of the reflection of the test pattern 550 (image 562 in FIG. 11B) which includes a second portion 548 of the elongated feature, horizontal slit 542, of the test pattern 550. First portion 546 of the elongated feature, horizontal slit 542, of the test pattern 550 and second portion 548 of the elongated feature, horizontal slit 542, of the test pattern 550 are included in sub-image 564 (box bounded by A) in image 560 and in sub-image 566 (box bounded by B) in image 562, respectively. Controller 300 based on the magnification of first camera 502 and second camera 504 scales sub-image 566 of image 562 to be the same vertical height as sub-image 564 of image 560.

Figure 12:
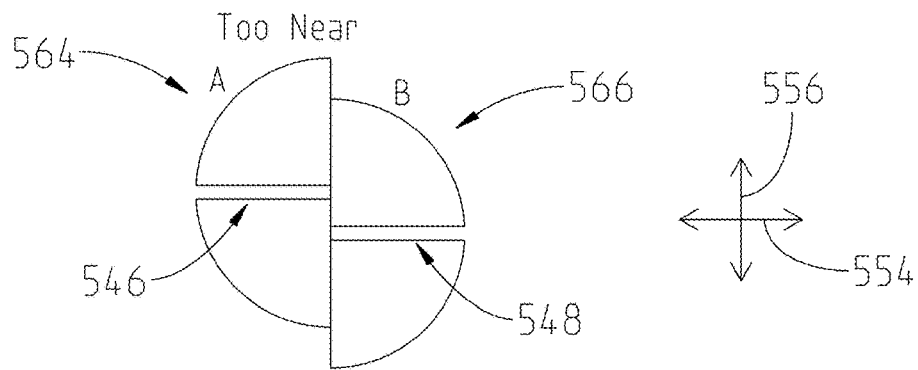
FIG. 12 illustrates a first portion of the image of FIG. 11A and a second portion of the image of FIG. 11B when the optical axis of the first camera of FIG. 7 and the second camera of FIG. 7 intersect in front of a surface of a cornea of the eye under examination.
Figure 13:
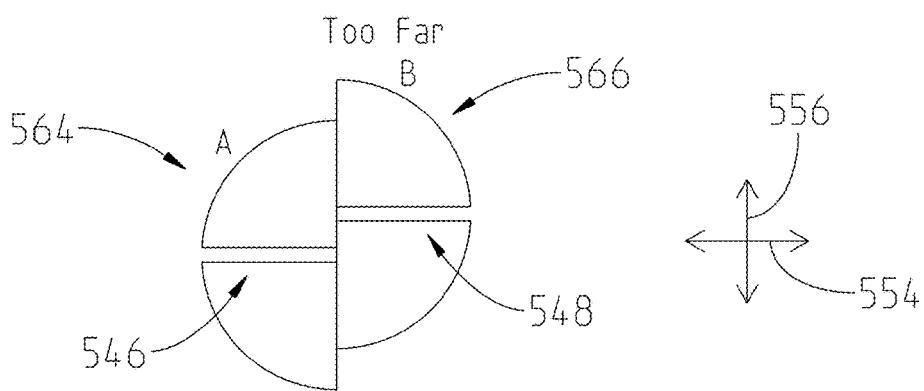
FIG. 13 illustrates the first portion of the image of FIG. 11A and the second portion of the image of FIG. 11B when the optical axis of the first camera of FIG. 7 and the second camera of FIG. 7 intersect behind the surface of the cornea of the eye under examination.
Figure 14:
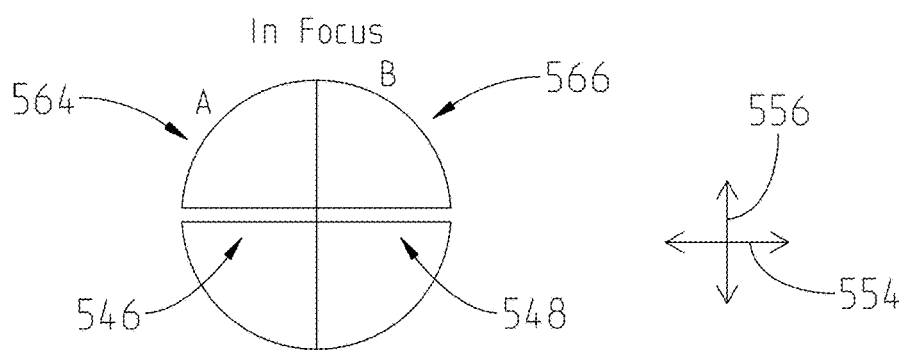
FIG. 14 illustrates the first portion of the image of FIG. 11A and the second portion of the image of FIG. 11B when the optical axis of the first camera of FIG. 7 and the second camera of FIG. 7 intersect at the surface of the cornea of the eye under examination.

By comparing first portion 564 of the elongated feature, horizontal slit 542, of the test pattern 550 and the second portion 566 and the elongated feature, horizontal slit 542, of the test pattern 550 a determination of an alignment of first camera 502 and second camera 504 to eye 10 may be made. Referring to FIG. 14, first portion 546 and second portion 548 are vertically aligned in a direction 556 which is normal to direction 554 which is a first characteristic that indicates that location 514 (see FIG. 8) is positioned on the surface of cornea 12 of eye 10. Referring to FIG. 12, first portion 546 and second portion 548 are vertically offset in direction 556 with first portion 546 higher than second portion 548 indicating location 514 is behind the surface of the cornea (cornea in position 12' relative to location 514 in FIG. 8). Referring to FIG. 13, first portion 546 and second portion 548 are vertically offset in direction 556 with second portion 548 higher than first portion 546 indicating location 514 is in front of the surface of the cornea (cornea in position 12" relative to location 514 in FIG. 8).

In embodiments, sub-image 564 and sub-image 566 are displayed on a display 382 of examination system 100. Display 382 may be part of first camera 502 or second camera 504 or a separate display. An operator of examination system 100 may manually move moveable base 140 in one of direction 150 or direction 152 to adjust the position of location 514 relative to cornea 12. For example, by moving moveable base 140 in direction 152, second portion 548 in FIG. 12 may be raised to align with first portion 546 resulting in the image of FIG. 14 when location 514 is located on the surface of cornea 12. In another example, by moving moveable base 140 in direction 150, second portion 548 in FIG. 12 may be lowered to align with first portion 546 resulting in the image of FIG. 14 when location 514 is located on the surface of cornea 12.

Figure 15:
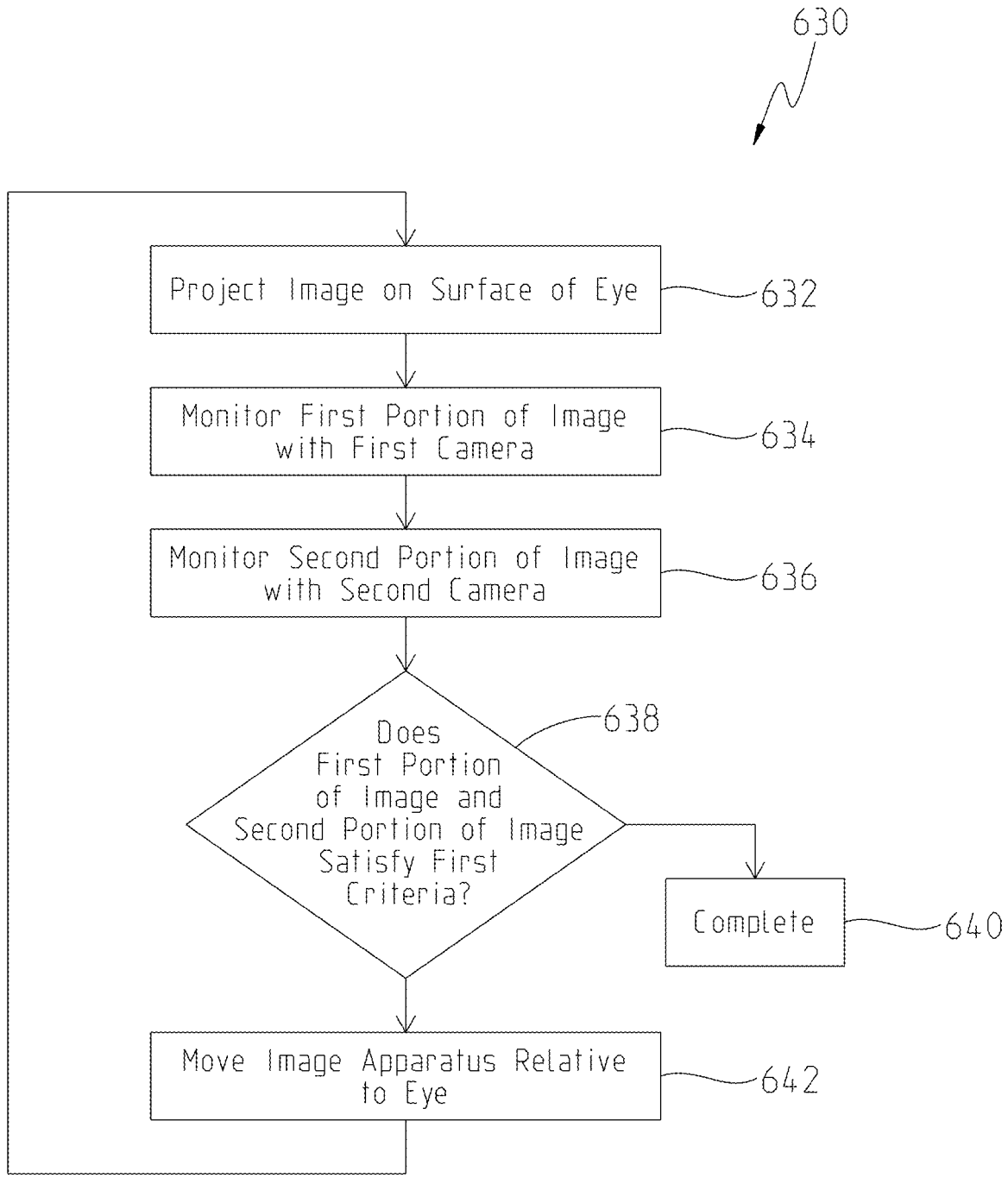
FIG. 15 illustrates an exemplary processing sequence of the present disclosure.

In embodiments, moveable base 140 includes a positioning system 180 which includes one or more powered actuators to move moveable base 140 relative to patient support 144. Controller 300 is operatively coupled to positioning system 180 to move moveable base 140 relative to patient support 144 based on a detected position of first portion 546 and second portion 548 by controller 300. In embodiments, controller 300 executes a processing sequence 630 of exam logic 320 to align examination system 100 to eye 10. In embodiments, controller 300 aligns examination system 100 to an apex (see point 514 in FIG. 8) of cornea 12 of the eye 10. Turning to FIG. 15, an image, such as image 540 of FIG. 9A, is projected on surface of eye 10, as represented by block 632. A first portion of the image is monitored with a first camera, such as sub-image 564 captured by first camera 502 in FIG. 11A, as represented by block 634. A second portion of the image is monitored with a second camera, such as sub-image 566 captured by second camera 504 in FIG. 11B, as represented by block 636. Controller 300 determines if the portions of the image satisfy a first criteria, as represented by block 638. In the embodiment of FIGS. 11-14 the first criteria is whether first portion 546 and second portion 548 are vertically aligned. In other embodiments, other criteria may be used such as whether features of the two images overlap or have a predetermined positional relationship to each other. If the first criteria is satisfied, processing sequence 630 exits as represented by block 640. In embodiments, controller 300 provides an indication of alignment to an operator of examination system 100 with one or more of output devices 380. If the first criteria is not satisfied, controller 300 moves moveable base 140 relative to patient support 144 with positioning system 180, as represented by block 642. In the embodiment of FIGS. 11-14, when second portion 548 is lower than first portion 546, controller 300 provides a movement command to positioning system 180 to move moveable base 140 in direction 152 until second portion 548 is aligned with first portion 546. When second portion 548 is higher than first portion 546, controller 300 provides a movement command to positioning system 180 to move moveable base 140 in direction 150 until second portion 548 is aligned with first portion 546. When second portion 548 is aligned with first portion 546, examination system 100 is aligned with an apex (see point 514 in FIG. 8) of cornea 12 of the eye 10.

Figure 16B:
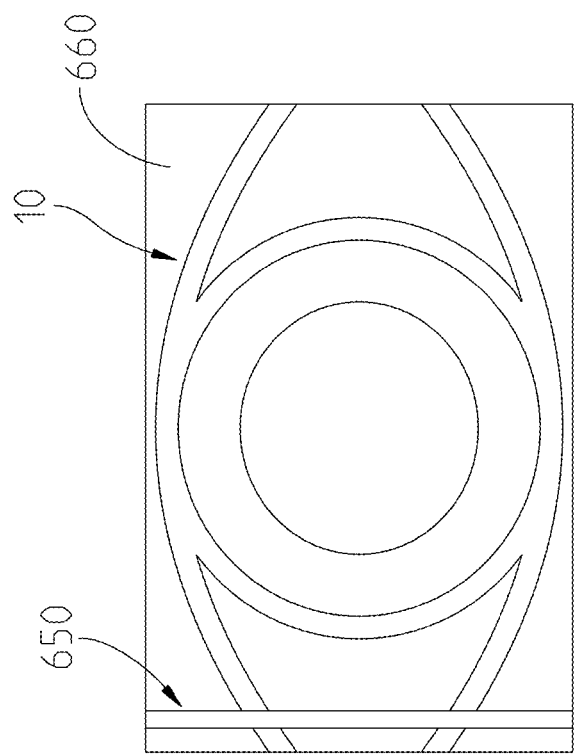
FIG. 16B illustrates the image of FIG. 16A projected onto an eye under examination and imaged by a camera of the FIG. 7.
Figure 16A:
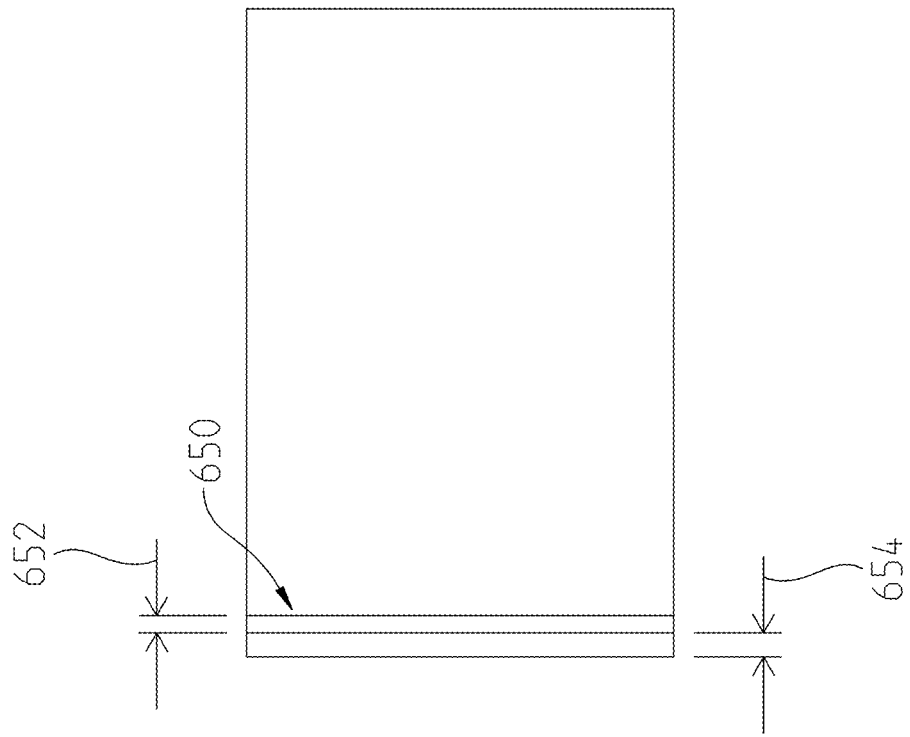
FIG. 16A illustrates an exemplary image for projection by a projector of an embodiment of the examination system of FIG. 6 of a first position of a single vertical slit.
Figure 17B:
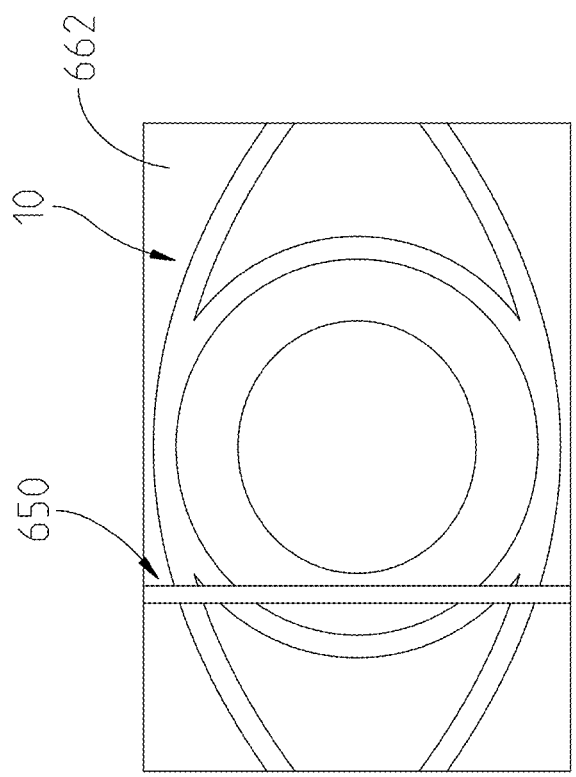
FIG. 17B illustrates the image of FIG. 17A projected onto an eye under examination and imaged by a camera of the FIG. 7.
Figure 17A:
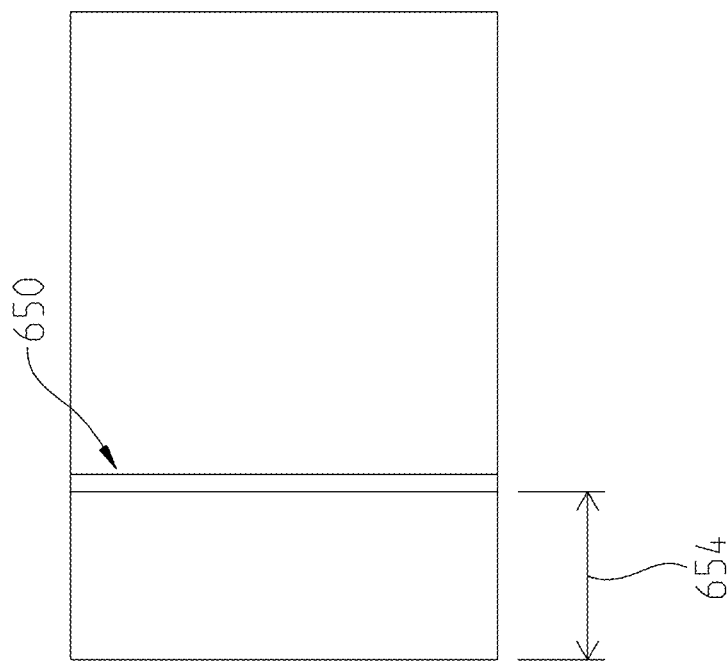
FIG. 17A illustrates an exemplary image for projection by a projector of an embodiment of the examination system of FIG. 6 of a second position of a single vertical slit.

Illumination system 102 with projector 402 is able to generate a test pattern which is projected by optical assembly 404 onto the eye. Exemplary test patterns, include a virtual vertical slit 650 (see FIG. 16A with vertical slit 650 at a first transverse position) which is projected by optical assembly 404 onto cornea 12 of eye 10 and stored as an image 660 by camera 502 (see FIG. 16B) and camera 504 and viewable on display 382. Slit 650 may have a width 652 which may be widened or narrowed by controller 300 through the software of projector 402. In embodiments, slit 650 has a width in the range of about 0.1 millimeters to about 15 millimeters. In embodiments, slit 650 has a width in the range of about 0.25 millimeters to about 8 millimeters. Additionally, a horizontal offset 654 of vertical slit 650 from a left edge of the image projected by projector 402 may be altered by controller 300 through the software of projector 402. Referring to FIG. 17A, vertical slit 650 has moved further to the right in the projected image to a second transverse position offset from the first transverse position of FIG. 16A and is stored as image 662 (see FIG. 17B) by first camera 502. Referring to FIG. 18A, vertical slit 650 has moved further to the right than in FIG. 17A in the projected image to a third transverse position offset from the first transverse position of FIG. 16A and the second transverse position of FIG. 17A and is stored as image 664 (see FIG. 18B) by first camera 502. The width 652 and horizontal offset 654 of vertical slit 650 may be controlled by controller 300 in embodiments or by an operator of examination system 100 through one or more input devices 360 of examination system 100.

The projected test pattern, such as vertical slit 650, may have different color values in different images. For example, projector 402 may project a vertical slit 650 with a first color value in a first image and with a second color value in a second image, the second color value being different from the first color value. Exemplary color values include a red color, a blue color, a white color, a red-free color, and other suitable colors. Also, the projected test pattern, such as vertical slit 650, may have different color values in different test scenarios. For example, projector 402 may project a vertical slit 650 with a first color value in a plurality of transverse positions during one type of examination and with a second color value in a plurality of positions for a different examination. Exemplary color values include a red color, a blue color, a white color, a red-free color, and other suitable colors. A blue color may be used for fluorescein mapping. A white color or red-free color for corneal imaging. A red color may be used for retro-illumination images.

Figure 19B:
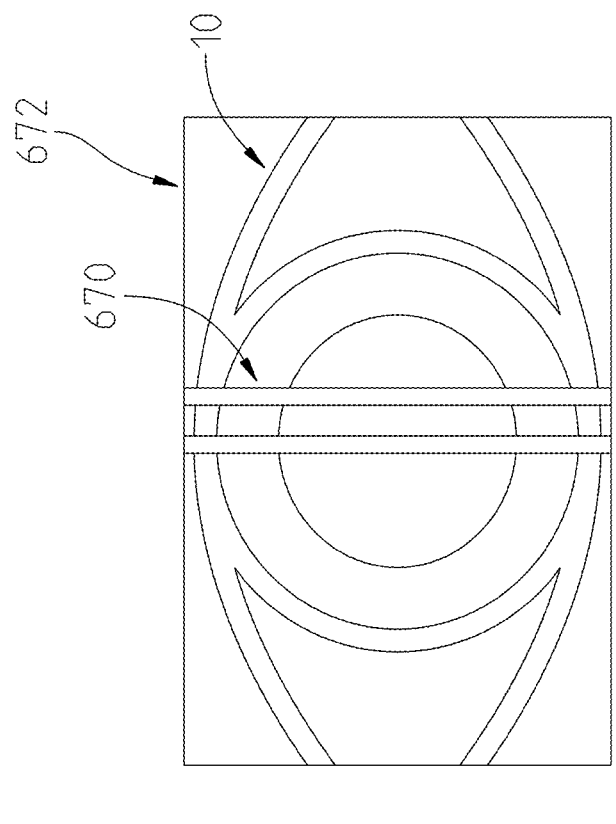
FIG. 19B illustrates the image of FIG. 19A projected onto an eye under examination and imaged by a camera of the FIG. 7.
Figure 19A:
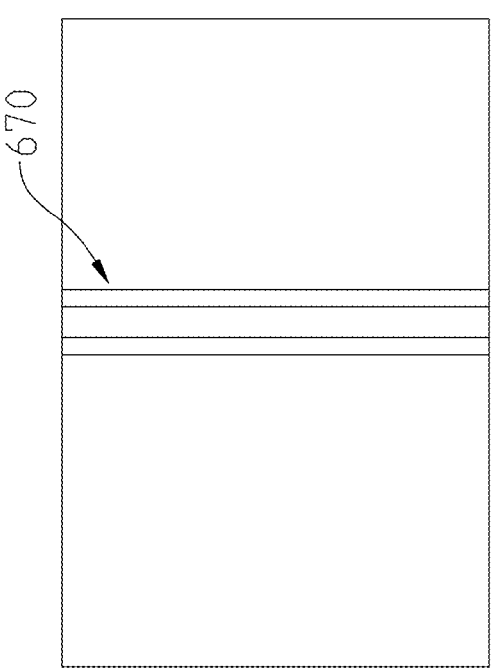
FIG. 19A illustrates an exemplary image for projection by a projector of an embodiment of the examination system of FIG. 6 of a first position of a double vertical slit.
Figure 20B:
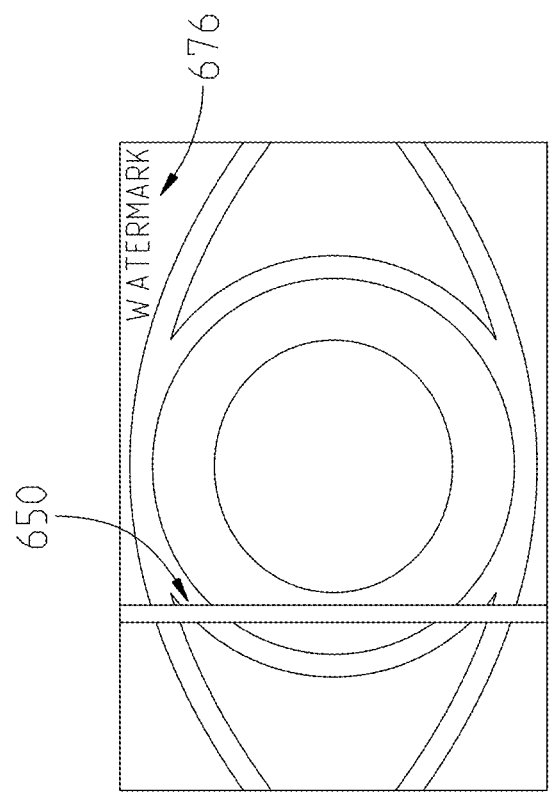
FIG. 20B illustrates the image of FIG. 20A projected onto an eye under examination and imaged by a camera of the FIG. 7.
Figure 20A:
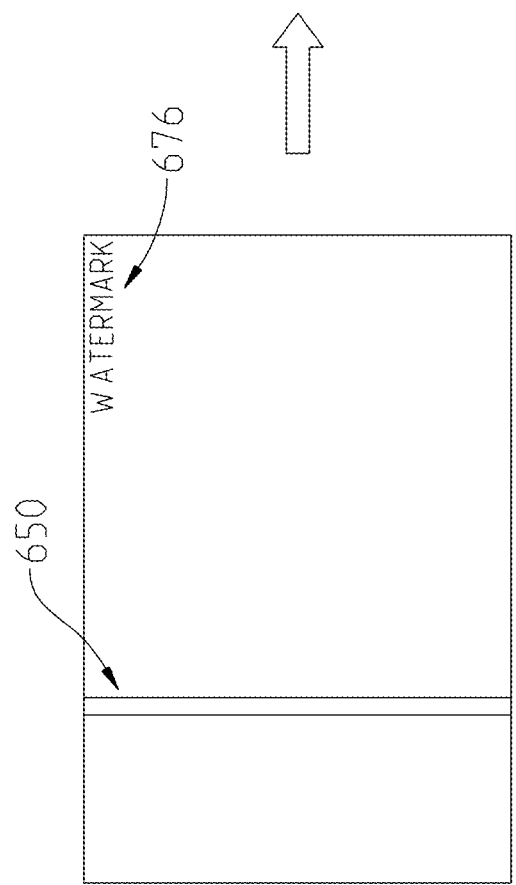
FIG. 20A illustrates an exemplary image for projection by a projector of an embodiment of the examination system of FIG. 6 of a first position of a single vertical slit and additional indicia.

Along with altering width 652 and/or horizontal offset 654 of vertical slit 650, different features may be projected by projector 402 onto eye 10. In FIG. 19A a double slit 670 is projected by projector 402 and stored as an image 672 by first camera 502 (see FIG. 19B). Additionally, a watermark 676 may be included in the image projected by projector 402 onto eye 10 and imaged by first camera 502. Further, textual data may be included, such as a time stamp, patient name, indications of nasal and temporal sides of image, and other suitable information. Although a double slit 670 is shown in FIG. 19A, in embodiments, three or more slits may be shown simultaneously.

Figure 21:
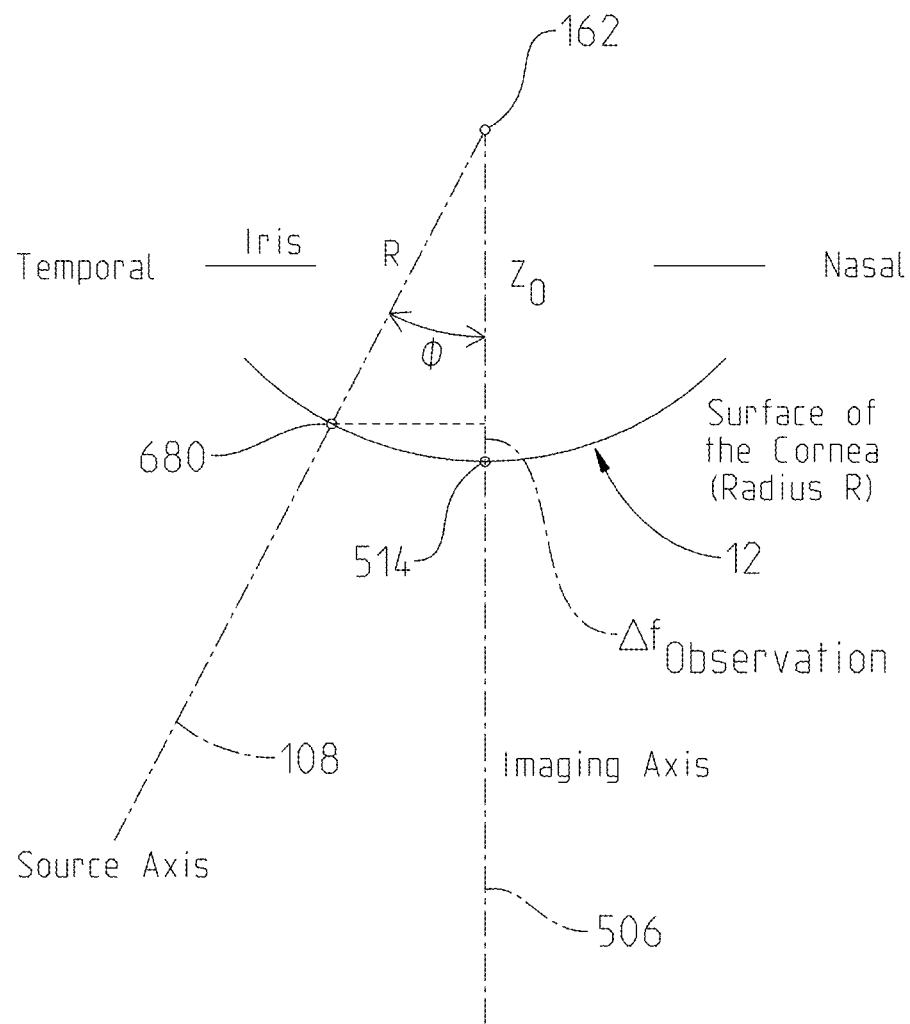
FIGS. 21 and 22 illustrate the focus depths of the illumination system and observation systems for various positions of a vertical slit.

Referring to FIG. 21, an outer surface of cornea 12 of eye 10 is represented as a sphere of radius (R) equal to the difference between axis 162 and location 514. Axis 162 is the common rotation axis of illumination system 102 and observation system 104. Location 514 is the intersection of axis 506 of first camera 502 and optical assembly 508 and axis 510 of second camera 504 and optical assembly 512. Both illumination system 102 (axis 108 shown) and observation system 104 should be focused at the same depth to properly form (for illumination system 102) and image (for observation system 104) a slit 650 (see FIG. 16A) projected onto 12.

In FIG. 21, virtual vertical slit 650 is positioned along optical axis 108 of illumination system 102 and focused on cornea 12 as represented by position 680. In embodiments, controller 300 has a stored default focal length for illumination system 102 to focus virtual vertical slit 650 on cornea 12 when illumination system 102 is rotated by an angle φ relative to axis 506 of observation system 104. Since illumination system 102 is focused at position 680, camera 502 and camera 504 should also be focused at a depth corresponding to position 680. As shown in FIG. 21, angle φ and the estimated value for R are known by controller 300. Therefore, controller 300 may determine the change in focus ($\Delta f_{OBSERVATION}$) needed to focus observation system 104 at a depth corresponding to position 680 according to equation 1.

$$\Delta f_{OBSERVATION} = R(1 - \cos \varphi) \quad (1)$$

Figure 22:
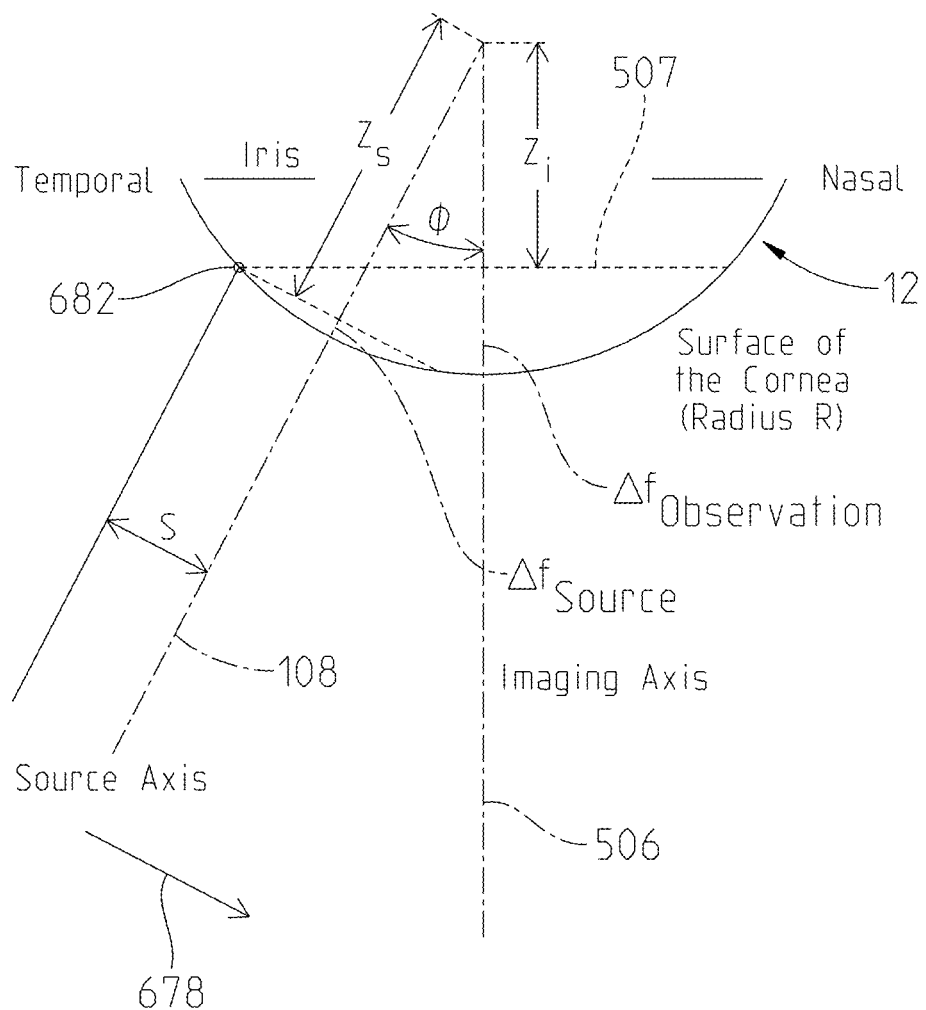

Referring to FIG. 22, same arrangement as FIG. 21, except that virtual vertical slit 650 is now offset from optical axis 108 by a distance S, as represented by position 682. Both the focus of the illumination system 102 and the observation system 104 need to be altered to focus at position 682. As shown in FIG. 22, angle φ, the offset distance S, and the estimated value for R are known by controller 300. Therefore, controller 300 may determine the change in focus ($\Delta f_{SOURCE}$) needed to focus illumination system 102 at a depth corresponding to position 682 according to equation 2.

$$\Delta f_{SOURCE} = R - z_s \text{ wherein } z_s = \sqrt{R^2 - S^2} \quad (2)$$

Controller 300 may also determine the change in focus ($\Delta f_{OBSERVATION}$) needed to focus observation system 104 at a depth corresponding to position 682 according to equation 3.

$$\Delta f_{OBSERVATION} = R - z_i \text{ wherein } z_i = \sqrt{R^2 - p^2} \quad (3)$$
$$\text{and } p = S \cos(\varphi) + z_s \sin(\varphi)$$

Controller 300 may make adjustments to the focal lengths of illumination system 102 and observation system 104 as virtual vertical slit 650 is moved across cornea 12 to maintain both virtual vertical slit 650 and the image of virtual vertical slit 650 observed by observation system 104 in focus. In embodiments, virtual vertical slit 650 is moved across cornea 12 in transverse direction 678 to obtain multiple images with observation system 104 of virtual vertical slit 650 focused on cornea 12 at spaced apart locations. The changes in focus of illumination system 102 and observation system 104 may be made by controller 300 adjusting one or more characteristics of optical assembly 404 of illumination system 102 for ($\Delta f_{SOURCE}$) and one or more characteristics of optical assembly 508 and/or optical assembly 512 of observation system 104 for ($\Delta f_{OBSERVATION}$). In embodiments, since each of adjustments to illumination system 102 and observation system 104 may be made by adjusting components internal to each of illumination system 102 and observation system 104, the relative position of illumination system 102 and observation system 104 to cornea 12 does not need to change. Stated another way, each of illumination system 102 and observation system 104 may remain stationary relative to cornea 12 as virtual vertical slit 650 is moved across cornea 12.

Although in each of FIGS. 21 and 22, the surface of cornea 12 is represented by a sphere of radius R, controller 300 may use other shapes to correspond to the shape of cornea 12, such as aspheric curves, polynomial curves, and other shapes. The example provided in FIGS. 21 and 22 is a non-limiting example. In other embodiments, a shape of cornea 12 is determined by controller 300 by projecting a test pattern, such as concentric rings similar to those produced by a keratoscope, onto cornea 12 and measuring changes in the test pattern imaged by examination system 100. In other embodiments, corneal curvature measurements obtained using scanning slit technology, Scheimpflug-based imaging or anterior segment ocular coherence tomography may be used to provide an input to controller 300 for determining the shape of cornea 12.

Figure 22A:
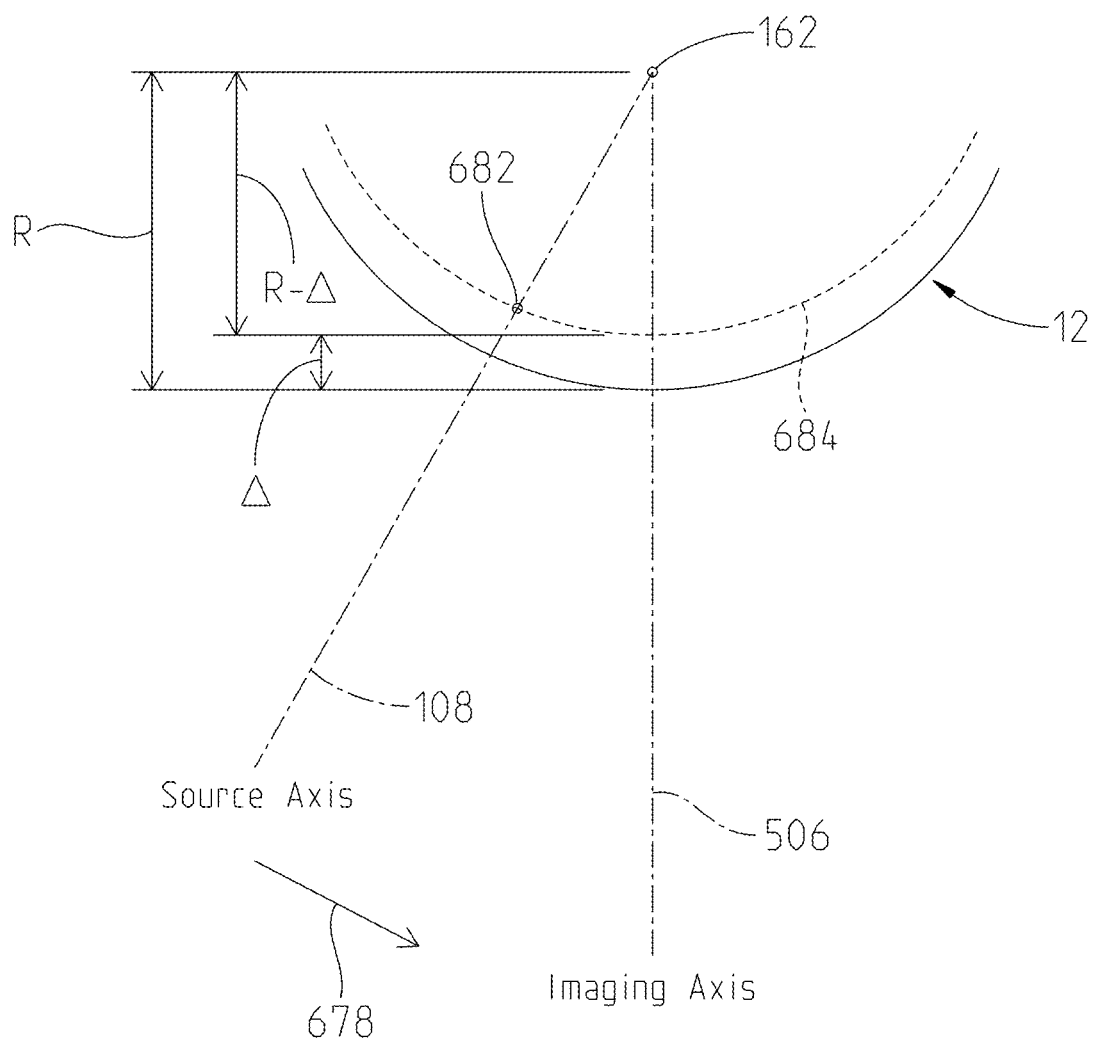
FIG. 22A illustrate focal depths for multiple exemplary contours.

In embodiments, controller 300 may also intentionally focus virtual vertical slit 650 at a location offset from cornea 12, such as behind cornea 12 deeper into eye 10. In a similar manner, controller 300 would then also focus observation system 104 at a depth corresponding to the offset from cornea 12. As shown in FIG. 22A, position 682 is positioned behind cornea 12, on a construction circle 684 of radius (R-Δ) wherein R is the radius of cornea 12 and Δ is the offset to construction circle 684. Each of cornea 12 and construction circle 684 have their respective centers of curvature aligned with axis 162.

Using the shape of construction circle 684, controller 300 may once again move virtual vertical slit 650 across eye 10 in transverse direction 678 while adjusting the focus of illumination system 102 and observation system 104 to obtain multiple images with observation system 104 of virtual vertical slit 650 focused on construction circle 684 at spaced apart locations. The focus of each of illumination system 102 and observation system 104 may be adjusted as explained above in connection with FIG. 22 with R-Δ replacing R. As such, controller 300 may conduct an examination of eye 10 at multiple depths and multiple transverse locations without moving either illumination system 102 or observation system 104 relative to eye 10.

Once again, although in FIG. 22A, construction circle 684 is represented by a sphere of radius R-Δ, controller 300 may use other shapes to correspond to the shape of construction circle 684, such as aspheric curves, polynomial curves, and other shapes. The example provided in FIG. 22A is a non-limiting example.

Figure 23:
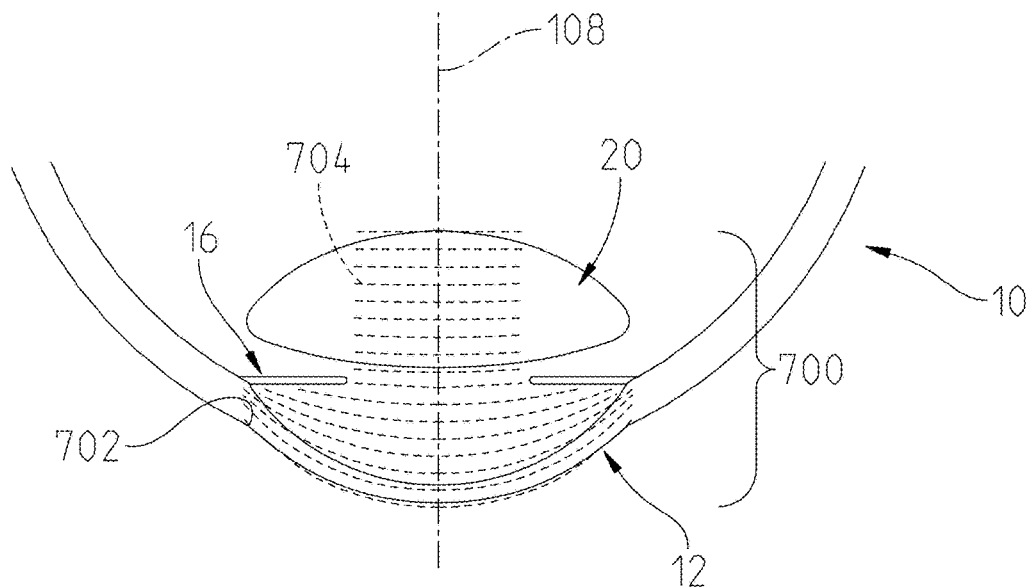
FIGS. 23 and 24 illustrate multiple exemplary contours for an eye examination.
Figure 24:
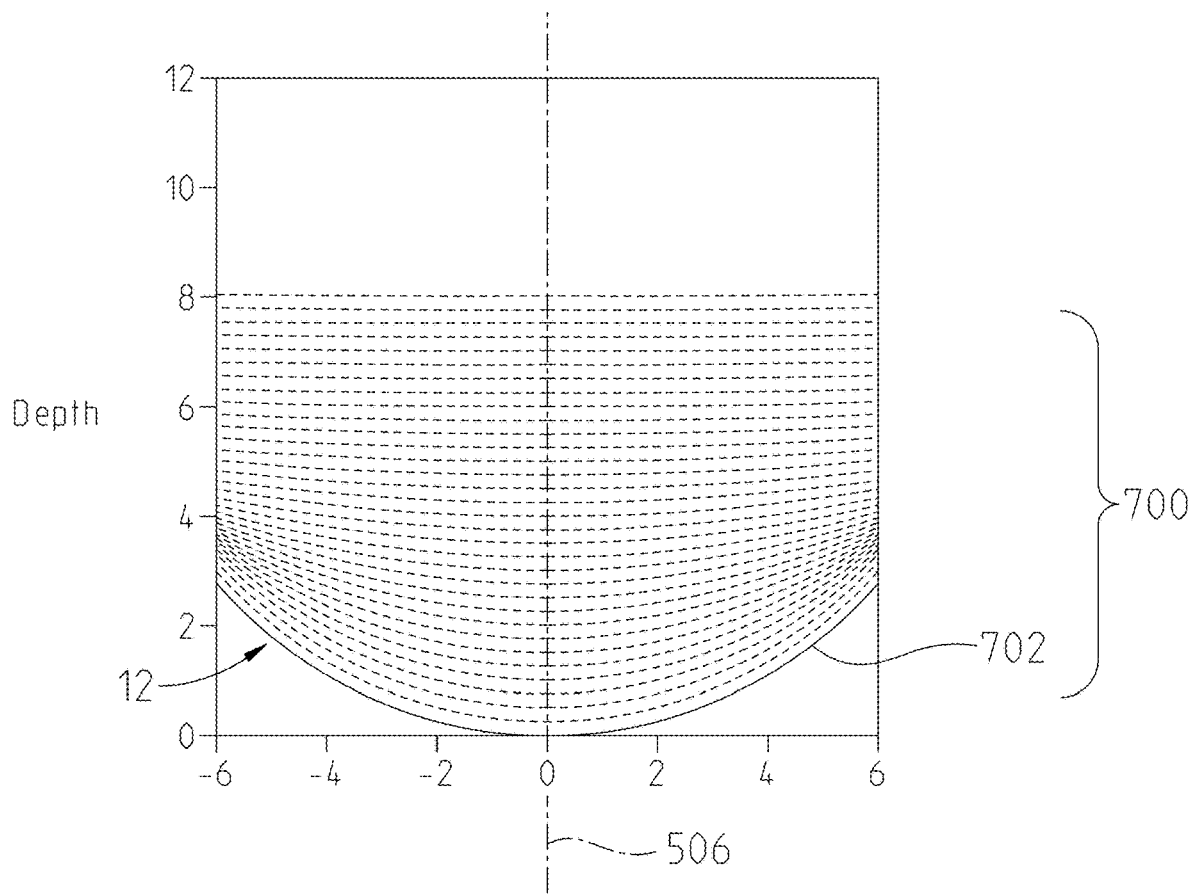

Referring to FIG. 23, a representation of a plurality of depth scan contours 700 are illustrated. As represented, a first contour 702 of the plurality of depth scan contours 700 generally matches cornea 12 and may be spherical similar to the examples in FIGS. 21 and 22 or aspherical or another suitable form. As the contours 700 are positioned deeper in eye 10, the contours 700 flatten out and either approach a linear form or are a linear form, see for example contour 704. An advantage of this, among others, is that deeper in the eye 10 structures that are to be imaged, such as the anterior surface of the crystalline lens as well as the iris are substantially flatter in comparison to the cornea. Additionally, in the case of pseudophakic eyes, the intraocular lens (IOL) as well as the remaining portion of the capsule are substantially flat. This approach allows the scan for the anterior and posterior surface of the cornea that are nearly concentric and the deeper structures (crystalline lens, iris, IOL) that are essentially flat. FIG. 24 shows another example of the plurality of contours 700. In embodiments, the contours 700 may flatten out as they progress from cornea 12 towards lens 20, approximate the anterior surface of lens 20 at a depth corresponding to the location of the anterior surface of lens 20, flatten out at depths within lens 20, and approximate the posterior surface of lens 20 at a depth corresponding to the location of the posterior surface of lens 20 (note the center of curvature of the contour corresponding to the posterior surface of lens 20 is closer to cornea 12 than the center of curvature of the contour corresponding to the anterior surface of lens 20). In embodiments, the reversal of curvature for the posterior surface of lens 20 is generated by controller 300 using a Gaussian function with a negative magnitude.

In embodiments, an average corneal and lens curvature data from a set of normal eyes or from a theoretical optical model of the eye such as the Gullstrand model of the eye is used by controller 300 to determine the plurality of depth scan contours 700.

Figure 25:
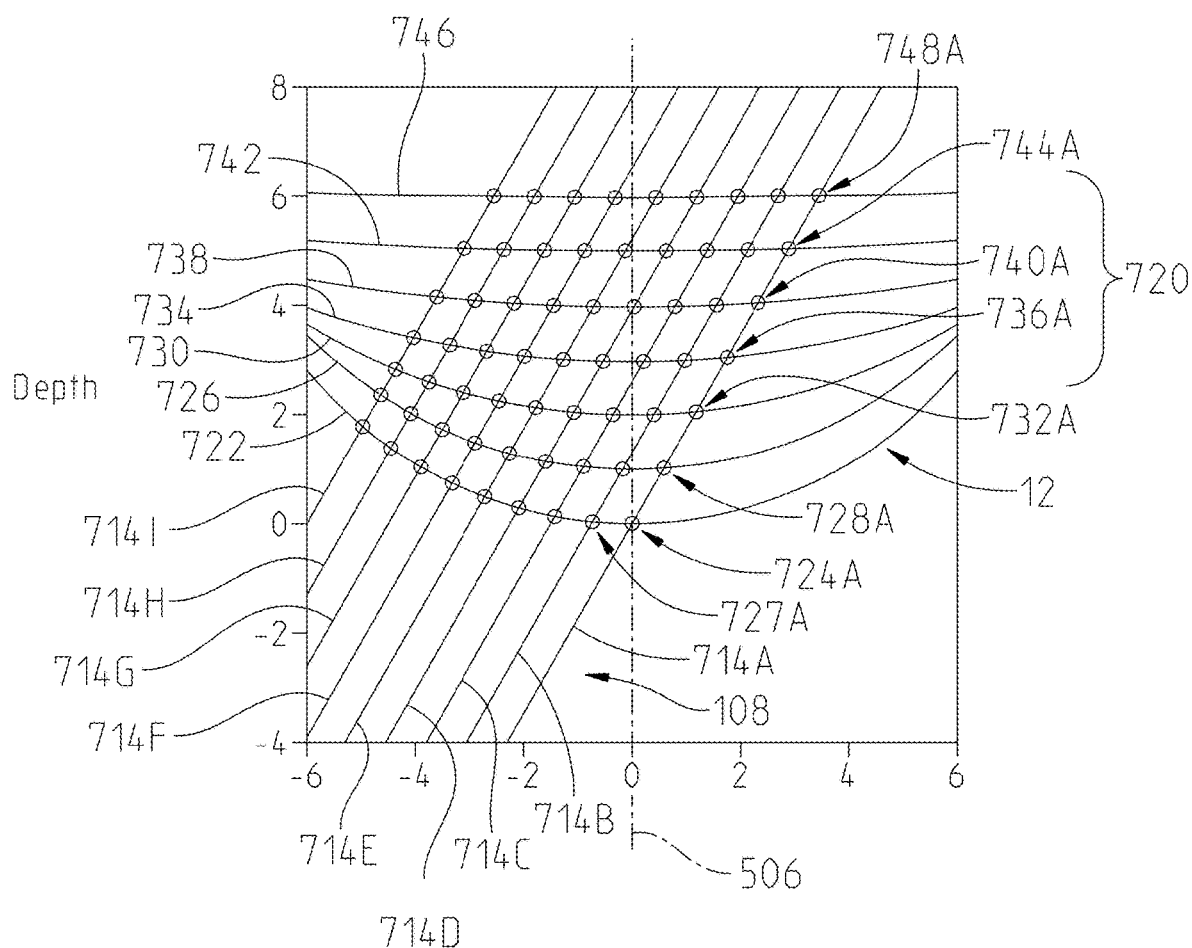
FIG. 25 illustrates multiple exemplary test locations for a plurality of contours for an eye exam.
Figure 26:
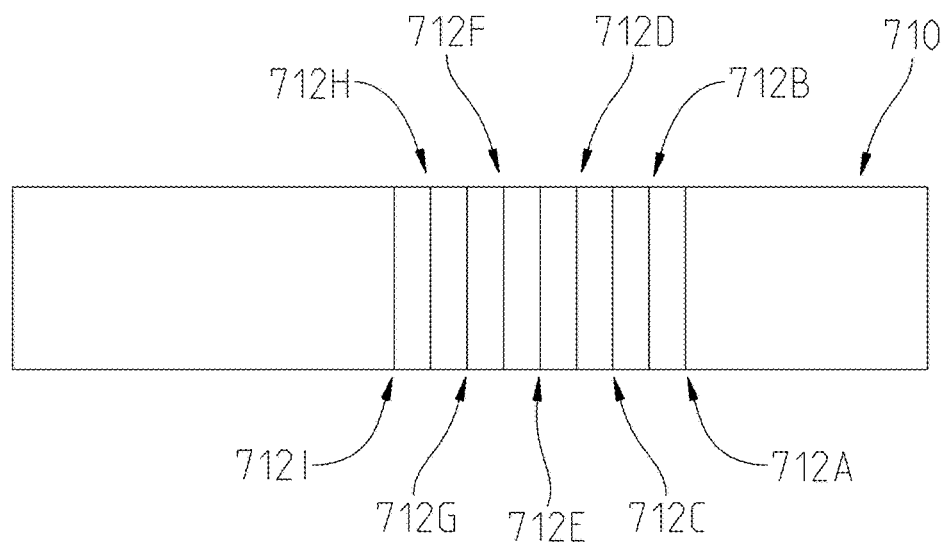
FIG. 26, illustrates multiple locations of a vertical slit to be projected by an exemplary illumination system during an eye examination.

Referring to FIGS. 25 and 26, a plurality of example focal locations are shown for a plurality of contours 720. In the illustrated embodiment seven contours 722, 726, 730, 734, 738, 742, and 746 are shown which correspond to various depth scan profiles. In other embodiments, more or fewer contours 720 may be implemented. Referring to FIG. 26, an exemplary image 710 projected by illumination system 102, and in particular source 200, is shown. Although shown as a single image, in embodiments, image 710 is a composite of a plurality of different images each containing one of the plurality of virtual vertical slit 712A-1 shown. In the illustrated embodiment, a first image would include virtual vertical slit 712A, a second image would include virtual vertical slit 712B, and so on for a total of nine separate images each projected independently and in embodiments sequentially. Although nine virtual vertical slits are shown, in embodiments, fewer or additional virtual vertical slits in fewer or additional images each projected independently and in embodiments sequentially. In embodiments, multiple spaced apart slits may be projected in the same image and exam logic 320 using image processing techniques may isolate the each respective slit in the images captured by the camera of observation system. An advantage, among others, of projecting multiple slits in the same image is to speed up data acquisition by exam logic 320.

Returning to FIG. 25, when the image containing virtual vertical slit 712A is projected by controller 300 onto eye 10 each of illumination system 102 and observation system 104 are focused at a position 724A for contour 722, at a position 728A for contour 726, a position 732A for contour 730, a position 736A for contour 734, a position 740A for contour 738, a position 744A for contour 742, and a position 748A for contour 746. Virtual vertical slit 712A is represented in FIG. 25 by ray line 714A. FIG. 25 further includes focal positions (not numbered, but represented by circles) for each of contours 720 for each of virtual vertical slits 712B-I which are represented by ray lines 714B-I. Thus, in the illustrated embodiment, exam logic 320 of controller 300 focuses each of illumination system 102 and observation system 104 at sixty-three separate focal locations without requiring movement of either of illumination system 102 or observation system 104 relative to eye 10. In other embodiments, exam logic 320 of controller 300 includes fewer or additional focal locations for an examination. In embodiments, at each of the points (such as 724A) shown in FIG. 25, a respective plane is imaged by observation system 500 that passes through the corresponding point and is normal to the optical axis 506 of the observation system 500. In embodiments, exam logic 320 aligns each of illumination system 102 and observation system 104 to the apex 514 of the cornea 12 of eye 10 in a first spatial configuration. While maintaining the illumination system 102 and the observation system 104 in the first spatial configuration, the exam logic 320 causes controller 300 to carry out the examination at the locations identified in FIG. 25. For example, controller 300 may perform the following steps: (a) projecting with the first adjustable optical assembly of the illumination system a first image from a digital projector towards the eye at a first focal depth (such as point 728A) relative to the apex of the cornea of the eye, the first image including a vertical slit in a first transverse position (such as slit 712A), (b) receiving light reflected by the eye from the projecting step (a) with a first camera through the second adjustable optical assembly of the observation system with the second adjustable optical assembly focused at the first focal depth relative to the apex of the cornea of the eye, (c) projecting with the first adjustable optical assembly the first image from the digital projector towards the eye at a second focal depth (such as point 732A) relative to the apex of the cornea of the eye, the second focal depth being different than the first focal depth, the first image including the vertical slit in the first transverse position, and (d) receiving light reflected by the eye from the projecting step (c) with the first camera through the second adjustable optical assembly with the second adjustable optical assembly focused at the second focal depth relative to the apex of the cornea of the eye. Controller continues on for various images of the vertical slit at various transverse positions and focal depths. In another example, controller 300 may perform the following steps (a) projecting with the first adjustable optical assembly of the illumination system a first image from a digital projector towards the eye at a first focal depth (such as point 728A) relative to the apex of the cornea of the eye, the first image including a vertical slit in a first transverse position (such as slit 712A), (b) receiving light reflected by the eye from the projecting step (a) with a first camera through the second adjustable optical assembly of the observation system with the second adjustable optical assembly focused at the first focal depth relative to the apex of the cornea of the eye, (c) projecting with the first adjustable optical assembly a second image from the digital projector towards the eye at a second focal depth (such as point 727A) relative to the apex of the cornea of the eye, the second focal depth being different than the first focal depth, the second image including the vertical slit in the second transverse position (such as slit 712B), the second transverse position being offset from the first transverse position, and (d) receiving light reflected by the eye from the projecting step (c) with the first camera through the second adjustable optical assembly with the second adjustable optical assembly focused at the second focal depth relative to the apex of the cornea of the eye.

Figure 27:
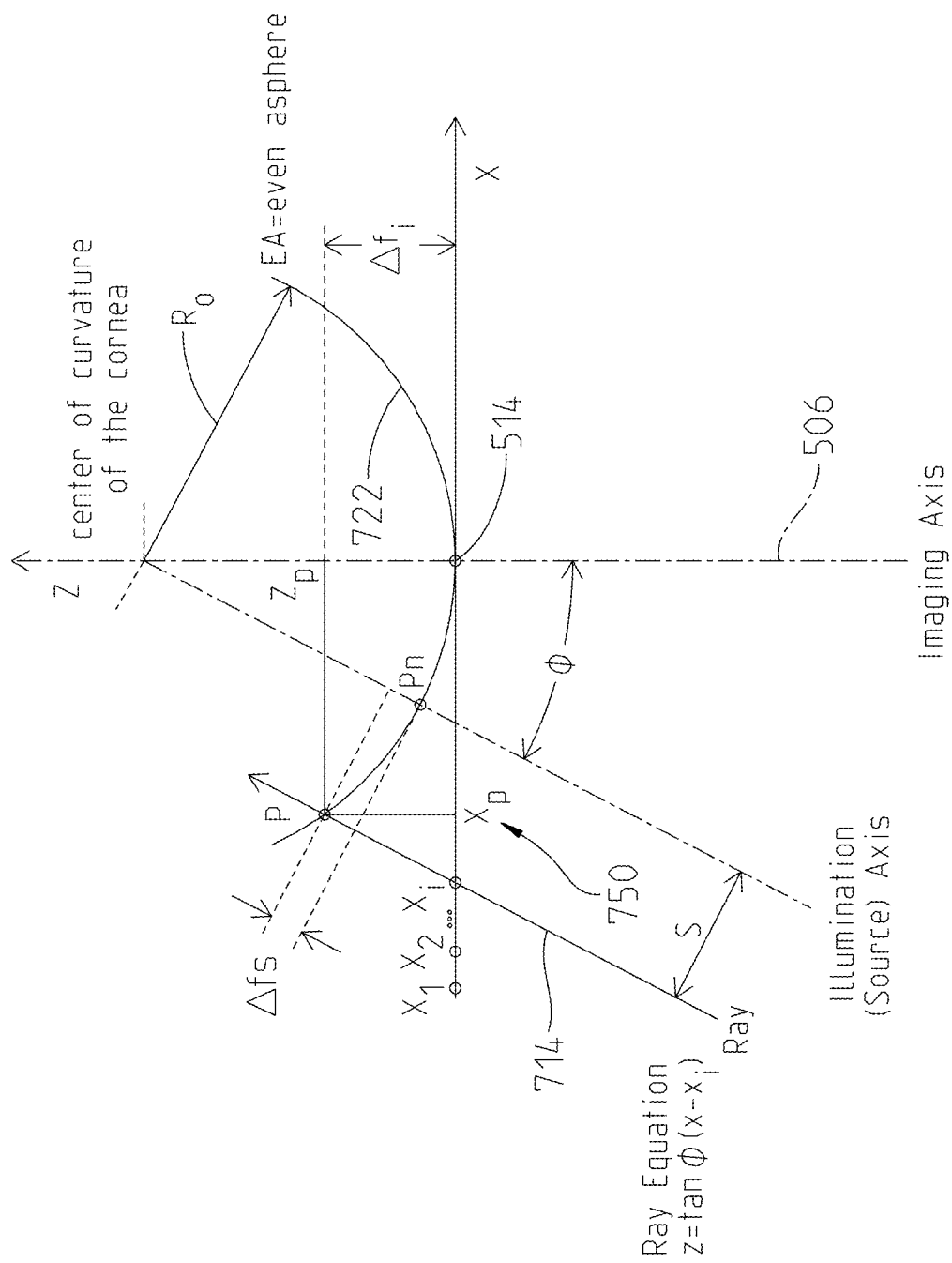
FIG. 27 illustrates relative positioning of a plurality of test locations on a contour.

Referring to FIGS. 27-30, an exemplary process for defining the contour curves 720 and corresponding focal depths for illumination system 102 and observation system 104 are shown. Referring to FIG. 27, a generic contour, illustratively contour 722, is shown for the desired depth scan profile and a generic virtual vertical slit, illustratively represented as being projected along ray line 714 are shown.

Figure 28:
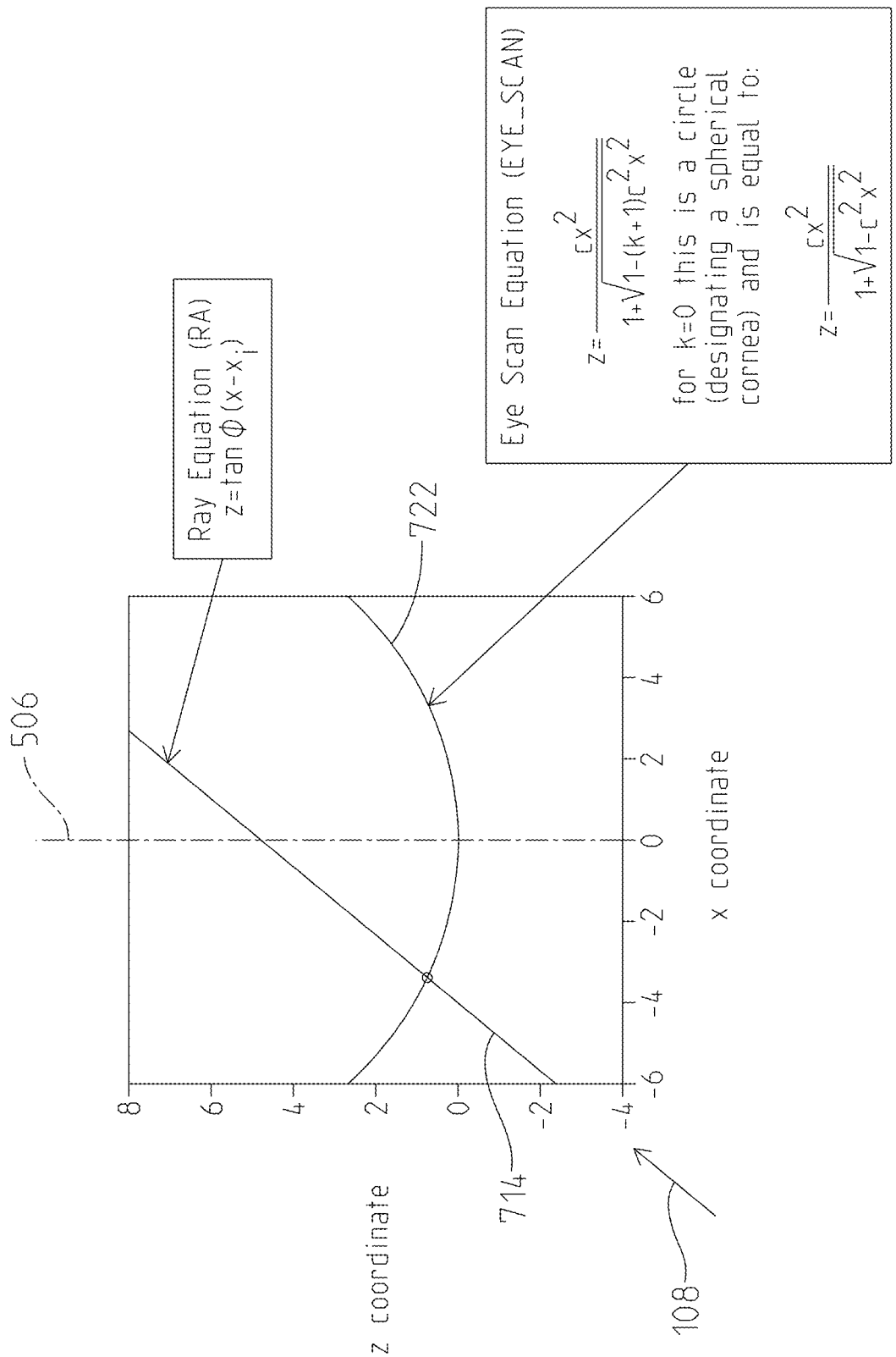
FIG. 28 illustrates a ray equation corresponding to a projection direction of a vertical slit of an exemplary illumination system and an eye scan contour.

In FIG. 27 contour 722 is an aspheric. Referring to FIG. 28, contour 722 follows the form of the Eye Scan Equation (a variant of the even asphere surface in parametric form) shown in FIG. 27 which specifies the depth z for contour 722 at a given x value for a given curvature c (c=1/R) and a conical constant k (for k=0 the eye equation becomes a circle). The ray line 714 on which the virtual vertical slit is to be projected follows the form of the Ray Equation shown in FIG. 27 which species the depth z for various x values.

Figure 30:
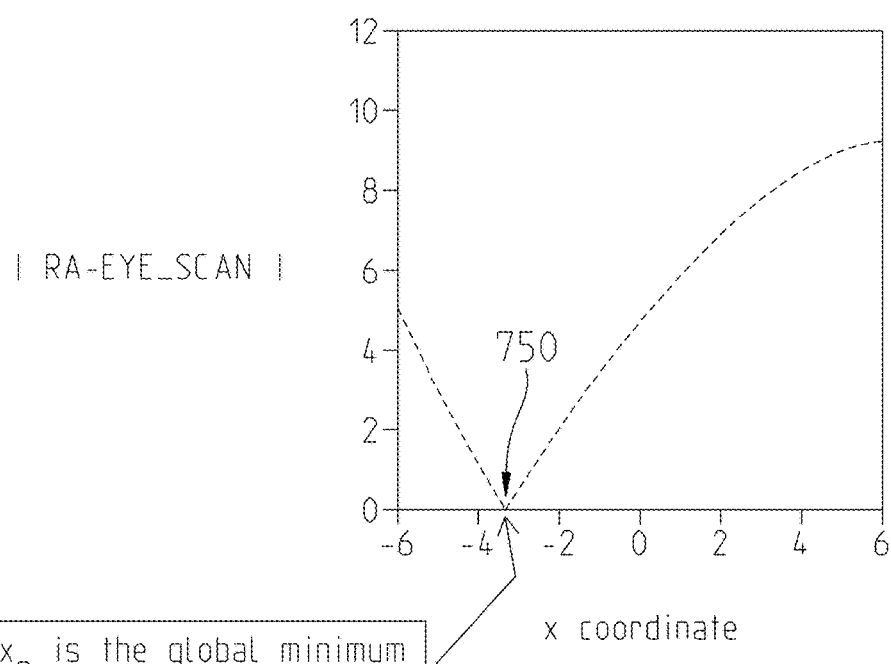
FIG. 30 illustrates a numerical solution to determining a transverse coordinate corresponding to an intersection point of the ray equation and eye scan contour of FIG. 28.

Now to determine the focal location for illumination system 102 and observation system 104, controller 300 determines the intersection of the Eye Scan Equation and the Ray Equation which is the focal depth for illumination system 102 and observation system 104. In embodiments, controller 300 determines the intersection by solving the set of equations, the Eye Scan Equation and the Ray Equation. In another embodiment, controller 300 determines the depth z for each of the Eye Scan Equation and the Ray Equation for a plurality of x values, as shown in FIG. 28. Next, controller 300 determines the absolute value of the difference between the Ray Equation and the Eye Scan Equation, as shown in FIG. 30. The global minimum of this difference is the x position 750 which corresponds to the Eye Scan Equation and the Ray Equation having the same depth z value. Returning to FIG. 27, this x position 750 is denoted as $x_p$ and the corresponding depth position is denoted as $z_p$ resulting in illumination system 102 being focused at point p having coordinates $(x_p, z_p)$ and observation system 104 being focused at a depth of $z_p$. In embodiments, the initial focus of illumination system 102 is at point $p_n$ in FIG. 27, thus controller 300 determines the $\Delta f_s$ ($\Delta$source) along the direction of ray line 714 from $p_n$. Further, controller 300 determines $\Delta f_i$ ($\Delta$observation) from location 514 where observation system 104 was initially focused. Controller 300 repeats this process for each planned scan position along a given contour and at the various depths. In embodiments, controller 300 scans all planned scan positions on a given contour prior to moving to the next contour. In embodiments, controller 300 scans for a given ray line 714 all depths (each planned contour) prior to moving the slit to the next planned ray line.

Figure 29:
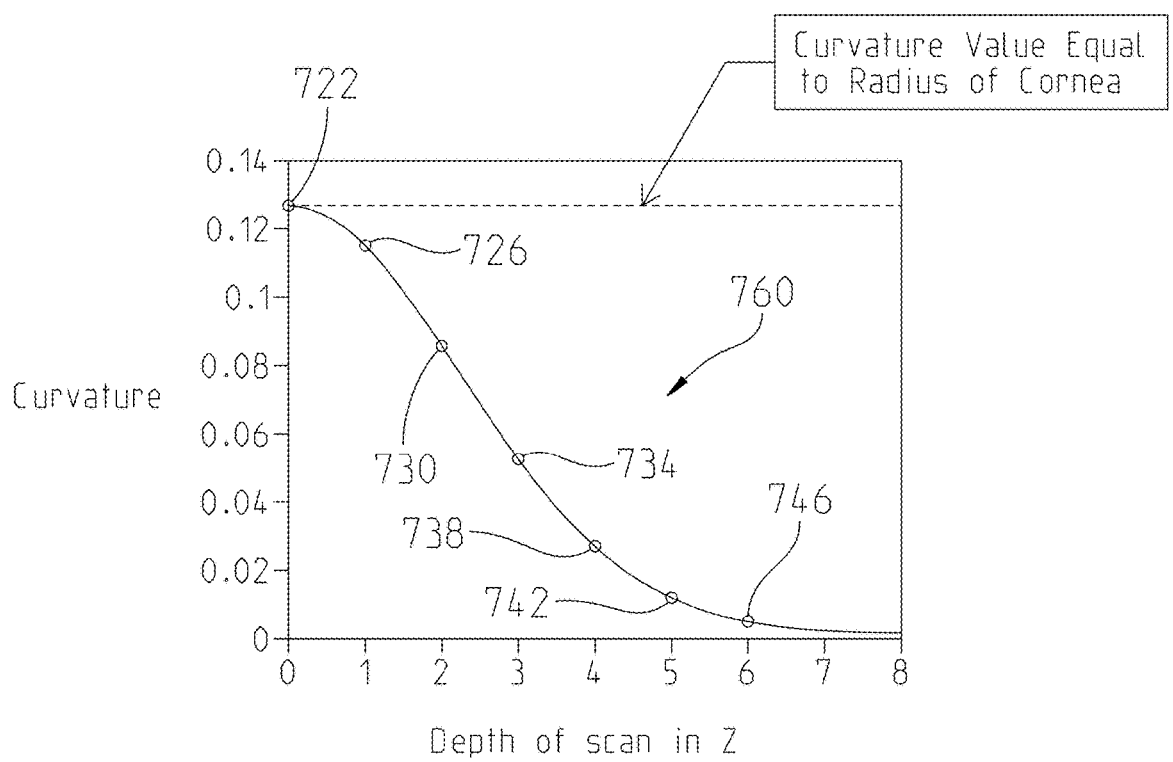
FIG. 29 illustrates an exemplary curvature value for a plurality of contours.

As shown in FIG. 25, in embodiments, as a planned scan goes deeper into the eye the scan contours become more linear and have less variation in depth. In embodiments, this flattening of the contour lines is controlled by controller 300 by altering the curvature value in the Eye Scan Equation (see FIG. 28) for each successive contour. In one example, controller 300 may linearly decrease the curvature value to flatten out the contours. In another example, controller 300 follows a Gaussian distribution, such as distribution 760 shown in FIG. 29 to control the flattening of the contours in the depth (z) direction. The curvature values corresponding to each of contours 722, 726, 730, 734, 738, 742, and 746 are shown in FIG. 29.

Figure 31:
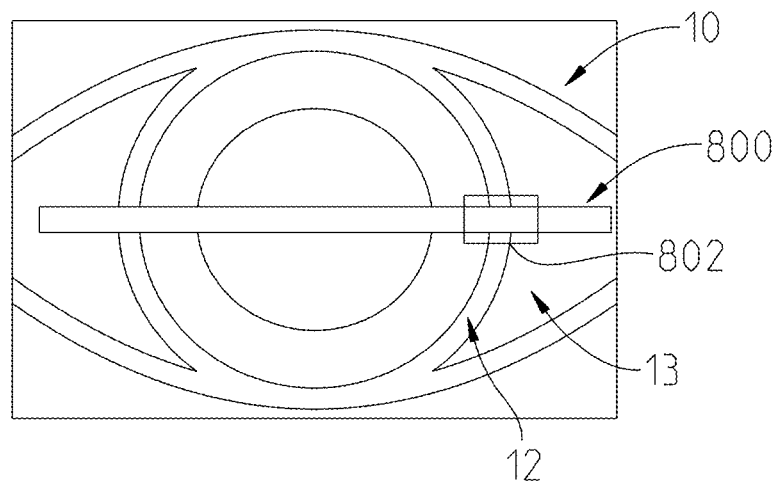
FIGS. 31 and 32 illustrate an exemplary limbus detection method.
Figure 32:
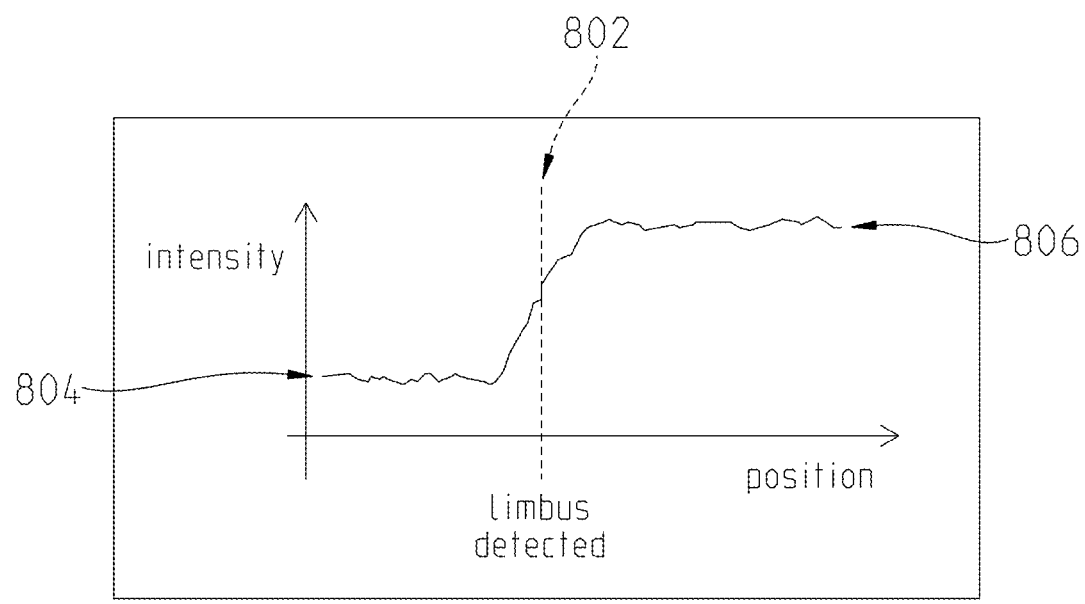

Examination system 100 may be used to determine additional characteristics for an eye 10 under examination. Referring to FIG. 31, eye 10 is illuminated with a virtual horizontal slit 800 which stretches across the field of view of observation system 104. Referring to FIG. 32, controller 300 may scan the intensity values received by first camera 502 to determine a location of a limbus 802 of eye 10. Limbus 802 is the intersection of the transparent cornea 12 of the eye 10 and the opaque sclera 13 of the eye 10. As shown in FIG. 32, the reflected light from the cornea 12 is generally at a first low level 804 and the reflected light from the sclera 13 is generally at a second high level 806. In embodiments, controller 300 determines when the reflected light has an intensity value halfway between level 804 and level 806 and that location corresponds to the location of the limbus 802. For virtual horizontal slit 800, controller 300 should detect both a left side limbus location and a right side limbus location. In embodiment, controller 300 may use the determined limbus locations to assist in aligning examination system 100 to eye 10.

Figure 33A:
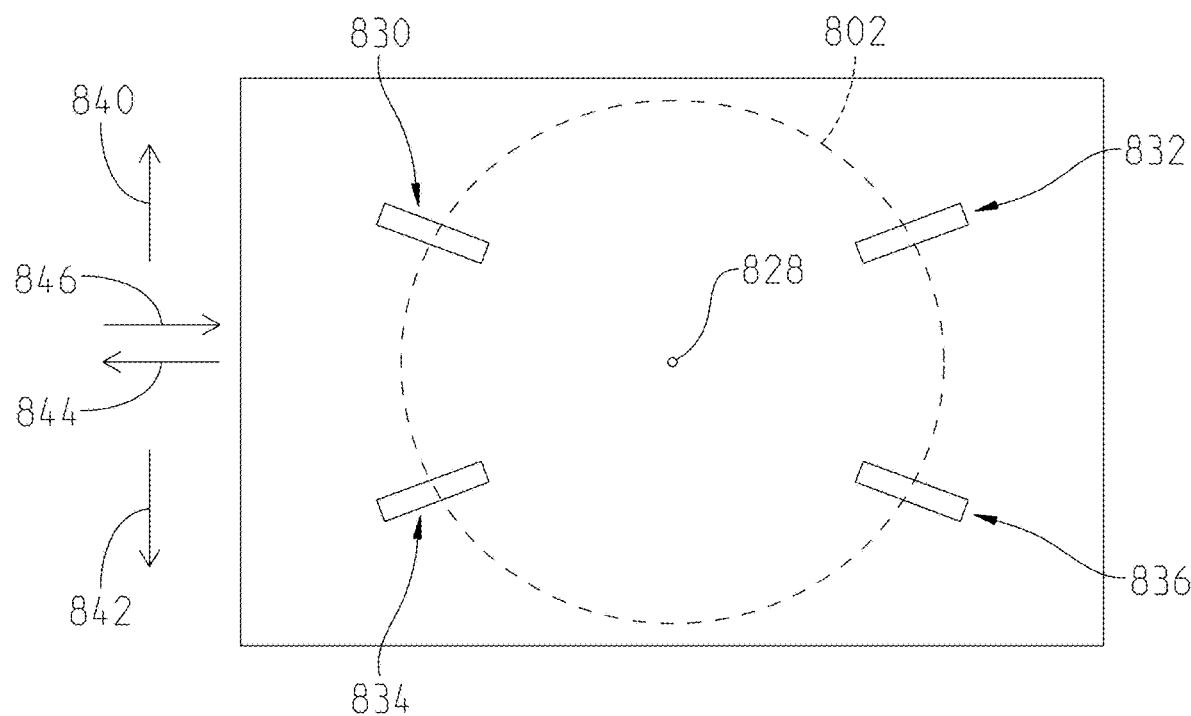
FIGS. 33A-B illustrate an exemplary eye movement detection method.

Further, the determination of the location of the limbus 802 may be used to monitor if the subject moves their eye during an examination. Referring to FIG. 33A, controller 300 may project with source 200 a plurality of slits, illustratively a left upper slit 830 angled towards a center 828 of eye 10, a right upper slit 832 angled toward center 828 of eye 10, a left lower slit 834 angled toward center 828 of eye 10, and a right lower slit 836 angled toward center 828 of eye 10. The location of limbus 802 may be determined by controller 300 for each of these slits, left upper slit 830, right upper slit 832, left lower slit 834, and right lower slit 836. If the location of limbus 802 does not change for any of left upper slit 830, right upper slit 832, left lower slit 834, and right lower slit 836, then controller 300 determines eye 10 has not moved.

If the location of limbus 802 moves outward away from center 828 for left upper slit 830 and right upper slit 832 and inward towards center 828 for left lower slit 834 and right lower slit 836, controller 300 determines that eye 10 has moved upward in direction 840. If the location of limbus 802 moves outward away from center 828 for left lower slit 834 and right lower slit 836 and inward towards center 828 for left upper slit 830 and right upper slit 832, controller 300 determines that eye 10 has moved downward in direction 842. The movement of eye 10 in direction 840 or direction 842 may be determined with only two of the four of left upper slit 830, right upper slit 832, left lower slit 834, and right lower slit 836.

If the location of limbus 802 moves outward away from center 828 for right upper slit 832 and right lower slit 836 and inward towards center 828 for left upper slit 830 and left lower slit 834, controller 300 determines that eye 10 has moved leftward in direction 844. If the location of limbus 802 moves inward towards center 828 for right upper slit 832 and right lower slit 836 and outward away from center 828 for left upper slit 830 and left lower slit 834, controller 300 determines that eye 10 has moved rightward in direction 846. The movement of eye 10 in direction 844 or direction 846 may be determined with only two of the four of left upper slit 830, right upper slit 832, left lower slit 834, and right lower slit 836.

In embodiments, controller 300 utilizes at least a portion of left upper slit 830, right upper slit 832, left lower slit 834, and right lower slit 836 to monitor for eye movement while scanning a virtual vertical slit, such as virtual vertical slit 650, across eye 10 as described herein. In embodiments, if an eye movement is detected, controller 300 determines the direction (as mentioned above) and magnitude of the movement with at least a portion of left upper slit 830, right upper slit 832, left lower slit 834, and right lower slit 836 and adjusts the focal positions of the illumination system and observation system for virtual vertical slit 650 based thereon to continue the exam. In embodiments, if an eye movement is detected, controller 300 monitors for a first period of time to see if eye 10 returns to its original position and if so continues with the examination with virtual vertical slit 650 and if not stops the examination, and optionally provides an alert to the operator.

In embodiments, other features of the eye 10 under examination may be used by controller 300 to track eye movement. For example, controller 300 may determine the relatively round margin of the pupil of the eye 10 or the limbus and track their location from frame to frame, such as determining a center of one or each and tracking this center location from frame to frame.

In embodiments, exam logic 320 of controller 300 analyzing captured images to determine if the subject has blinked. For example, a blurred image may be associated with a blink and controller 300 maintains the projected slit 712 and cameras at the current focus depths until a focused image is obtained and thereafter subsequently moves on to the next location in the scan being performed by exam logic 320 of controller 300.

Figure 33B:
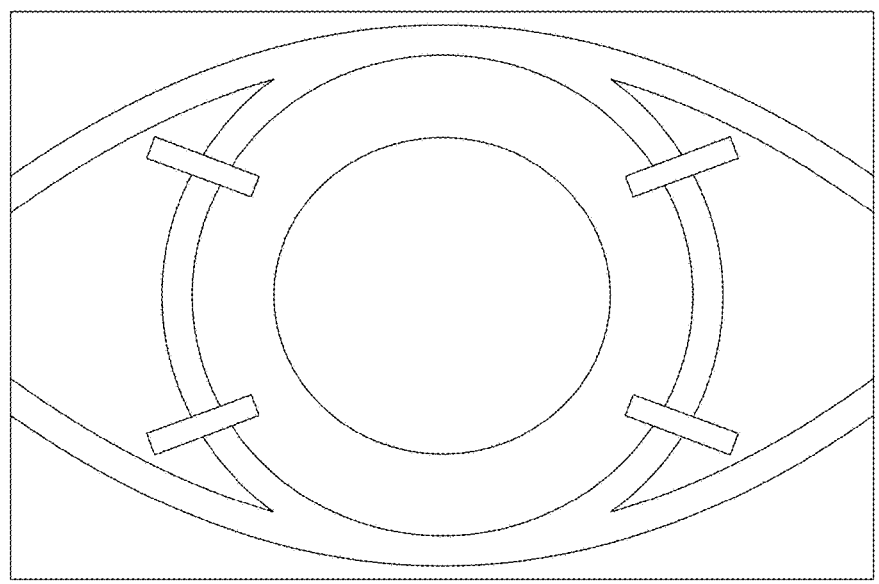

In embodiments, exam logic 320 of controller 300 identifies the limbus 802 and limits a vertical extent of slit 712 to not extend beyond the perimeter of the limbus 802. A diameter and center 828 of the limbus may be determined with a test pattern, such as shown in FIG. 33B. Controller 300 then knowing the position of the slit 712 to be projected may determine the intersection with the limbus 802 and truncate the slit 712 to not extend beyond the limbus 802. An advantage, among others, of truncating slit 712 is to avoid distractions to the viewer of observation system 104 from overexposed sclera regions in the captured images. Further or alternatively, a brightness level of slit 712 may be altered along its length to dim regions outside of the limbus 802 and/or in the perilimbal area prior to reaching the actual limbus. As such, in one embodiment, slit 712 would have a first brightness level across the cornea, at least one lower brightness level at the edge of the limbus and outside of the limbus. In another embodiment, slit 712 would have a first brightness level across the cornea, at least one lower brightness level at the edge of the limbus, and be truncated outside of the limbus.

In embodiments, exam logic 320 of controller 300 identifies the limbus 802. A diameter and center 828 of the limbus may be determined with a test pattern, such as shown in FIG. 33B. Controller 300 then knowing that the limbus has a diameter of "D" may instruct illumination system 102 to generate a test pattern with projector 402 which includes a ring of light or a partial ring of light having a diameter equal to about "D" and to project the ring of light or partial ring of light onto eye 10 with the ring of light or partial ring of light generally aligned with the limbus. This will cause a portion of the light to internally reflected within cornea 12 and allow the visualization of subtle corneal scars or other pathology. In embodiments, a thickness of the ring of light or partial ring of light is about 1 millimeter.

Referring to FIGS. 34-42, an exemplary examination system 1000 is shown. In embodiments, examination system 1000 operates in accordance with the descriptions of examination system 100 herein.

Figure 34:
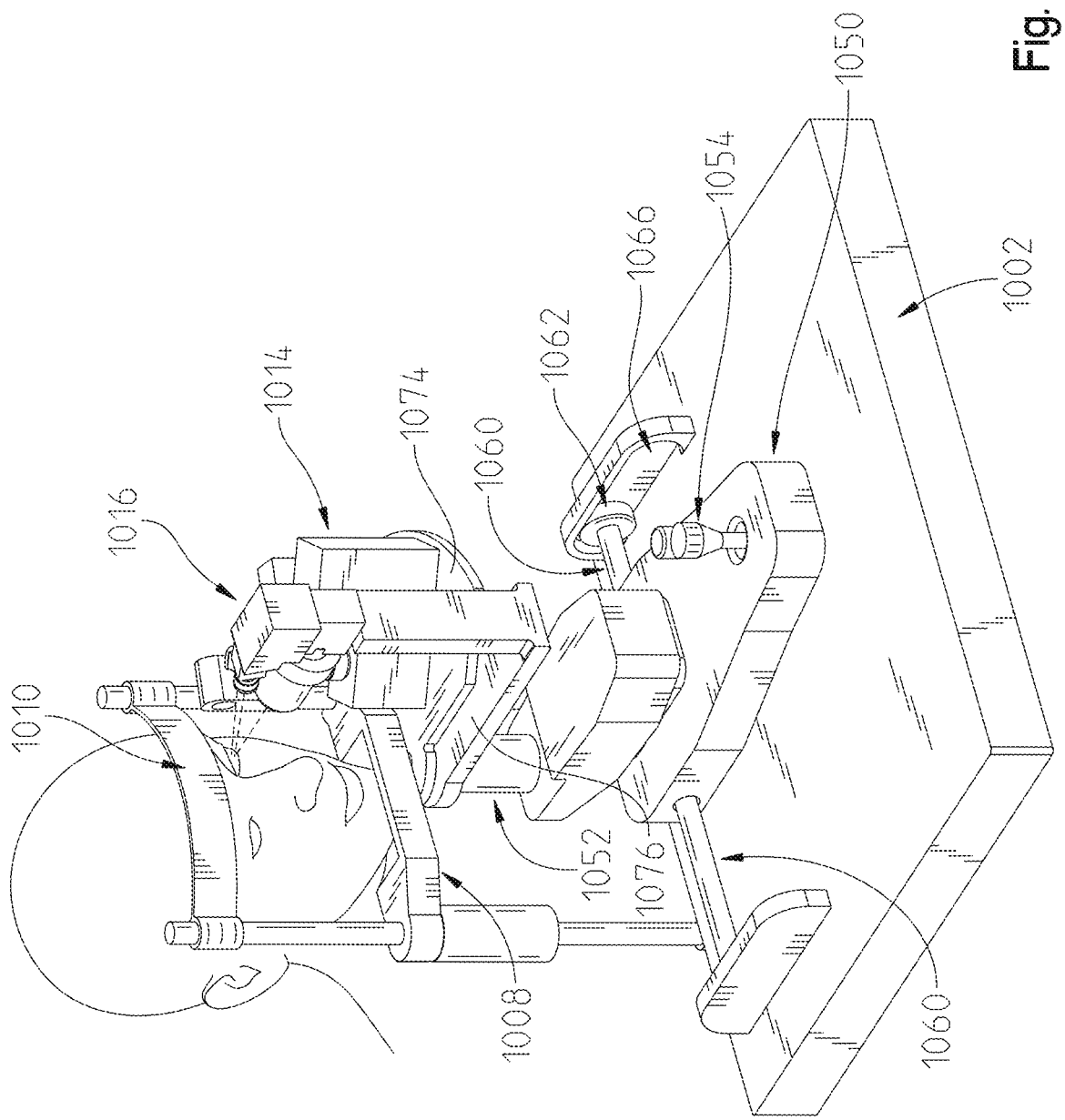
FIG. 34 is a front perspective view of an exemplary examination system.
Figure 35:
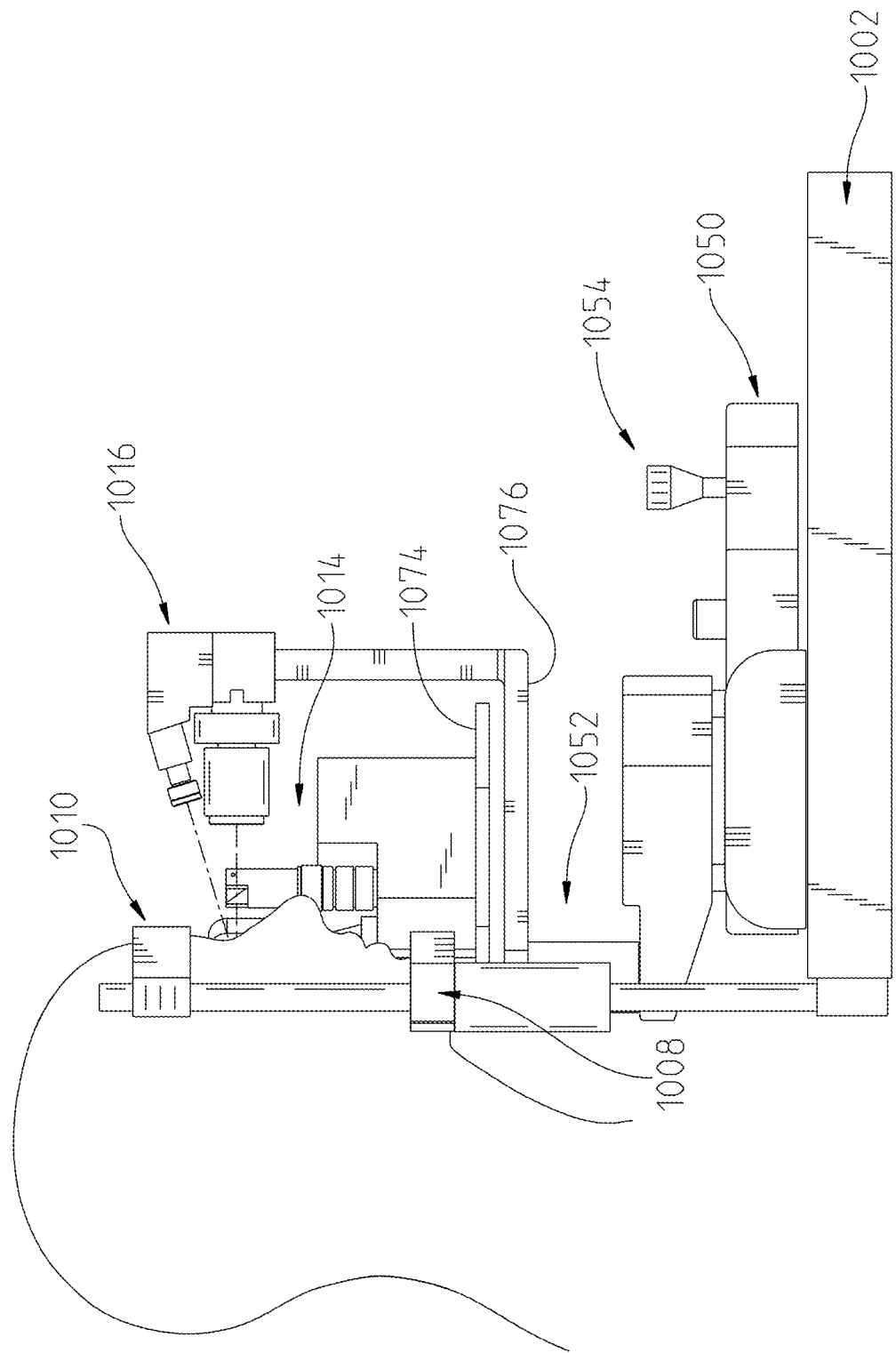
FIG. 35 is a side view of the exemplary examination system of FIG. 34.
Figure 36:
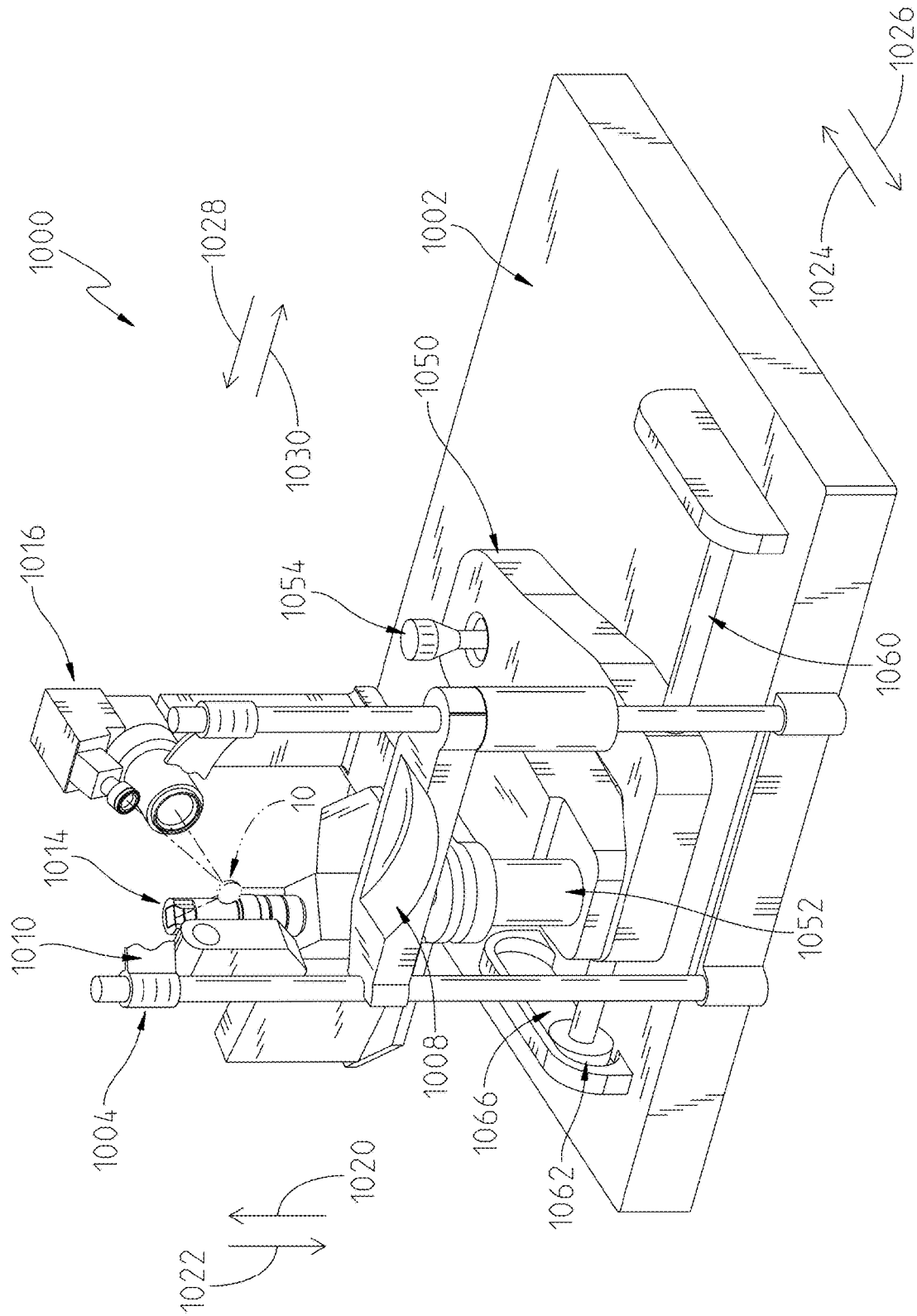
FIG. 36 is a rear perspective view of the exemplary examination system of FIG. 34.
Figure 37:
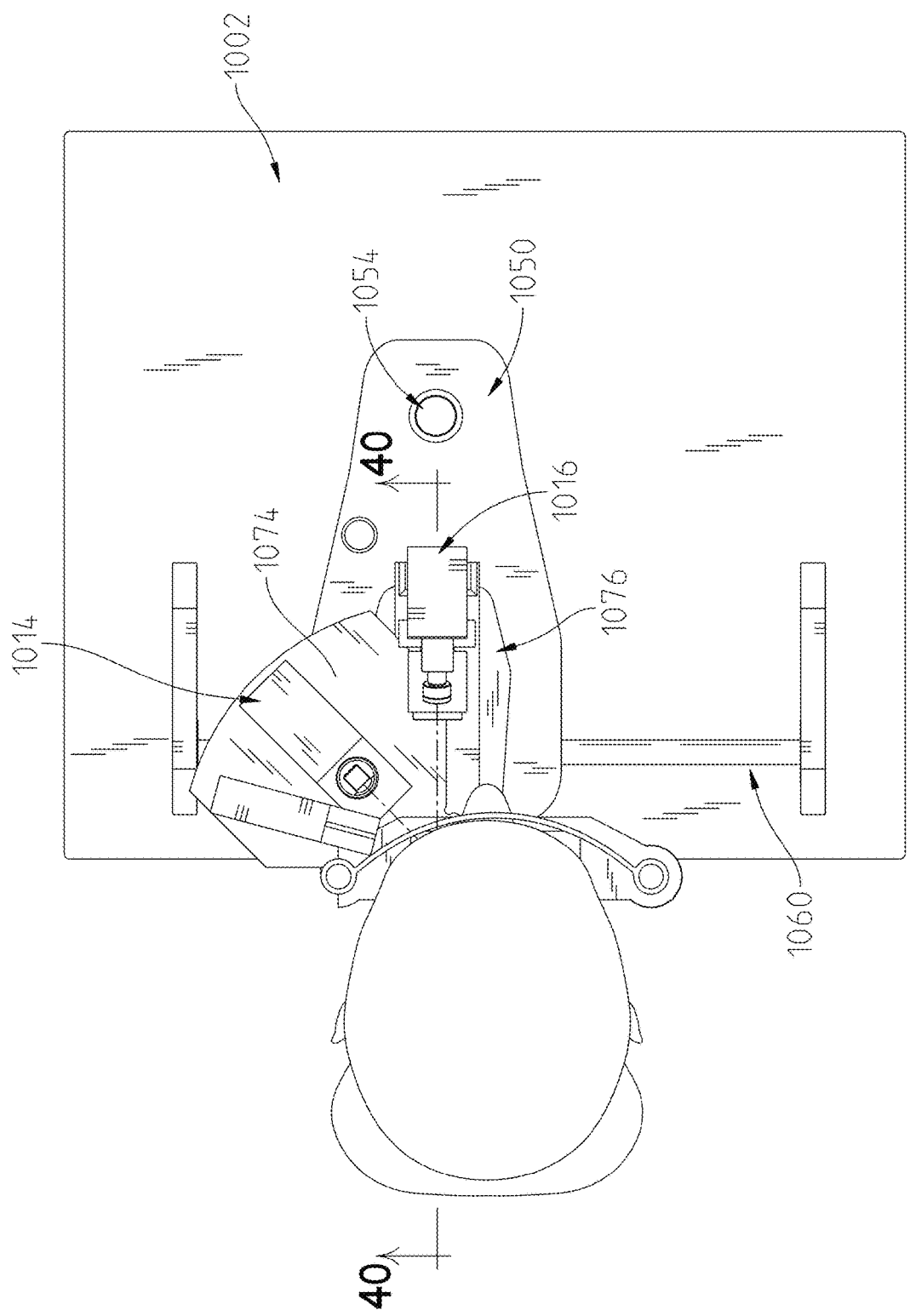
FIG. 37 is a top view of the exemplary examination system of FIG. 34 with the illumination system and observation system at different angular locations.
Figure 38:
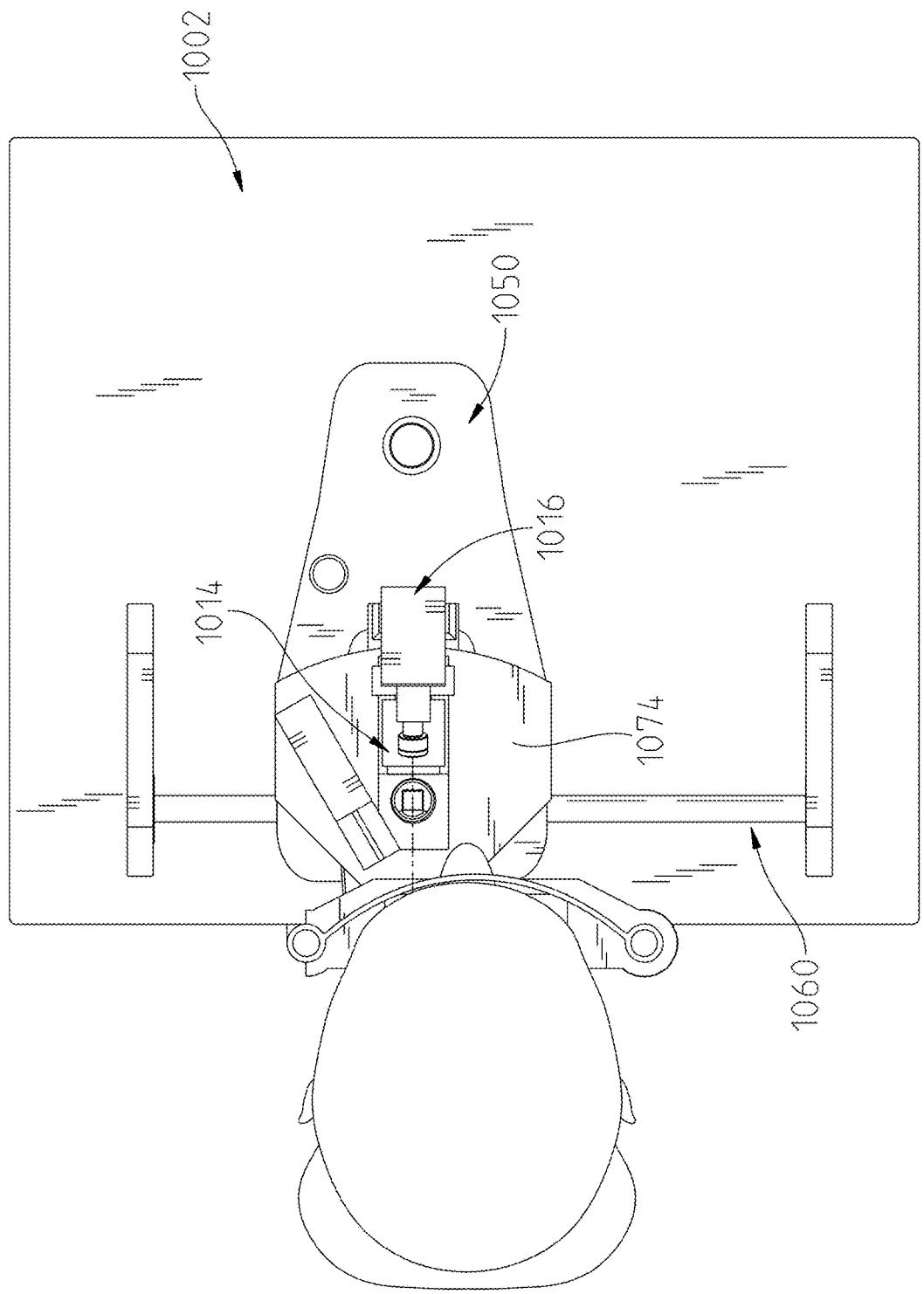
FIG. 38 is a second top view of the exemplary examination system of FIG. 34 with the illumination system and observation system at the same angular location.
Figure 39:
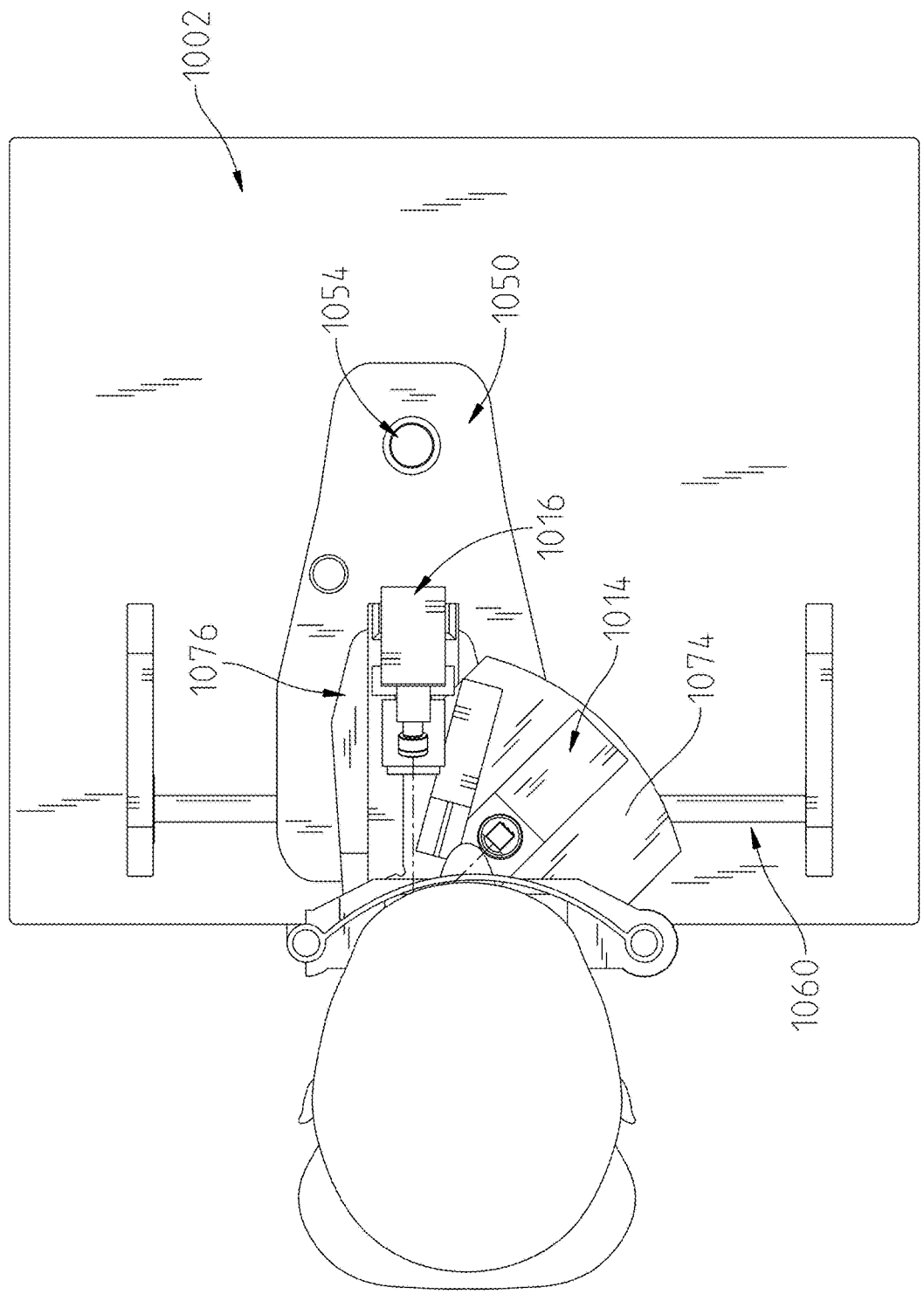
FIG. 39 is a third top view of the exemplary examination system of FIG. 34 with the illumination system and observation system at different angular locations.
Figure 40:
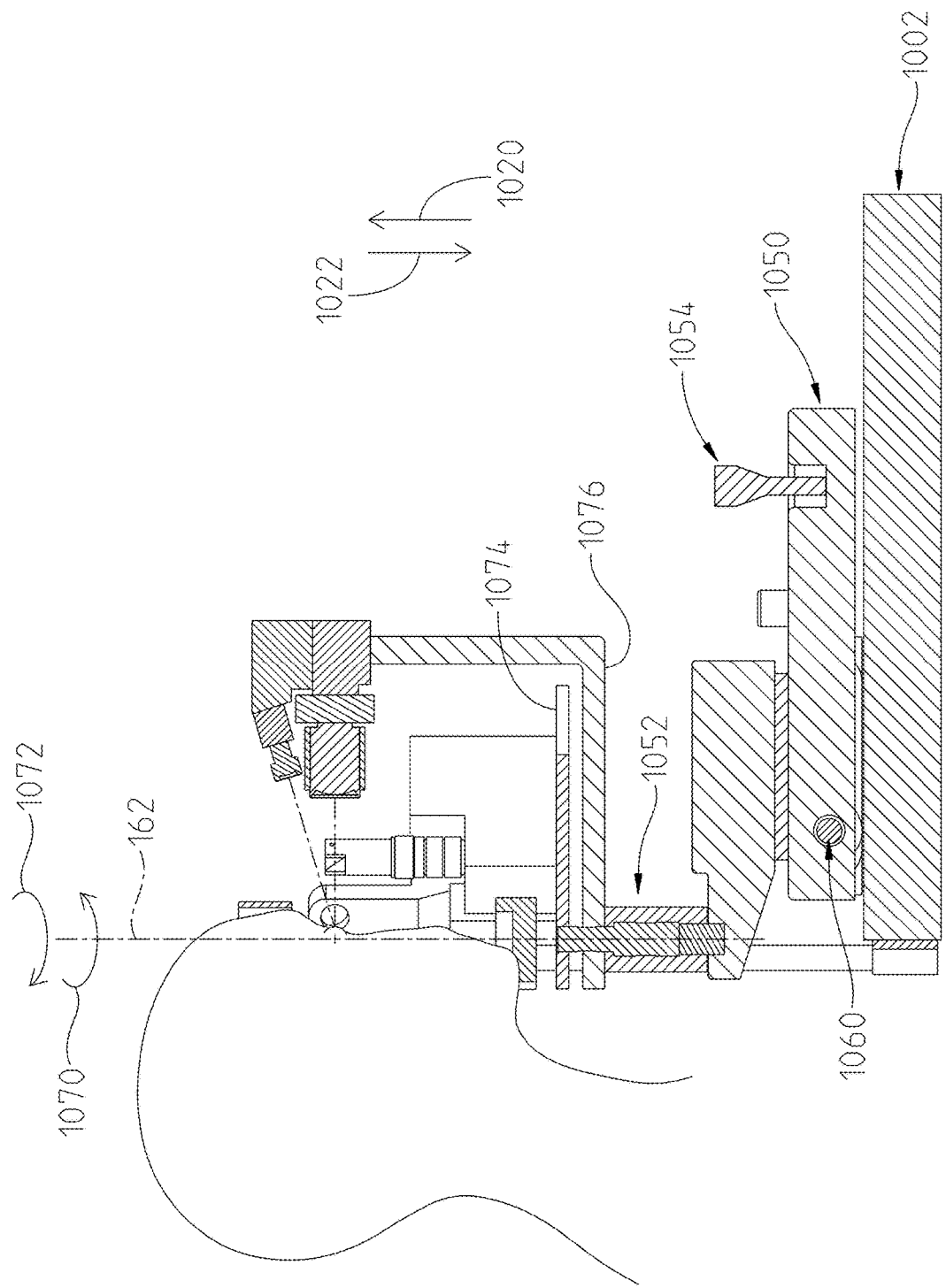
FIG. 40 is a cross-sectional view of the exemplary examination system of FIG. 34 along lines 40-40 in FIG. 37.

Referring to FIGS. 34-36, examination system 1000 includes a base 1002 to which a patient support 1004 is coupled. Patient support 1004 includes a pair of upstanding members 1006 which support a chin rest 1008 and a forehead rest 1010. Chin rest 1008 and forehead rest 1010 are moveable up in direction 1020 and down in direction 1022 (y-axis) to vertically position eye 10 of a patient relative to an illumination system 1014 and an observation system 1016 of examination system 1000.

Each of illumination system 1014 and observation system 1016 are supported by a movable base 1050 which in turn is supported by base 1002. Moveable base 1050 is moveable relative to base 1002 in direction 1024 away from eye 10 and direction 1026 towards eye 10 (z-axis) and in direction 1028 and direction 1030 (x-axis). The movement of moveable base 1050 relative to base 1002 results in the movement of both illumination system 1014 and observation system 1016. In the illustrated embodiments, movable base 1050 is moved in the x-axis and z-axis by the operator grasping input 1054 and moving movable base 1050. Movable base 1050 receives a shaft 1060 and is translatable along shaft 1060 in direction 1028 and direction 1030 to move movable base 1050 relative to base 1002 in the x-axis. Further, each end of shaft 1060 has a wheel 1062 coupled thereto which is received in a race 1066 of base 1002. Each wheel 1062 rolls in the respective race 1066 in direction 1024 and direction 1026 to move movable base 1050 relative to base 1002 in the z-axis. In one embodiment, one of illumination system 1014 and observation system 1016 is not supported by moveable base 1050 and thus does not move in concert with moveable base 1050 when moveable base 1050 is moved relative to base 1002.

Illumination system 1014 and observation system 1016 are both supported on a column 1052 of movable base 1050. Further, referring to FIG. 40, each of illumination system 1014 and observation system 1016 are rotatable relative to moveable base 1050 in direction 1070 and direction 1072 about axis 162. Illumination system 1014 is supported on a platform 1074 and observation system 1016 is supported on a platform 1076. Each of platform 1074 and platform 1076 are individually rotatable relative to moveable base 1050. As such, illumination system 1014 may be rotated relative to moveable base 1050 without a corresponding rotation of observation system 1016 relative to moveable base 1050 or vice versa.

Although illumination system 1014 and observation system 1016 are shown being rotatable about a vertical axis, axis 162, one or both of illumination system 1014 and observation system 1016 may be rotatable about a horizontal axis parallel to the x-axis or another axis in a plane defined by the x-axis and the y-axis. In one embodiment, each of illumination system 1014 and observation system 1016 is rotatable about a separate axis relative to moveable base 1050. In the illustrated embodiment, illumination system 1014 and observation system 1016 are each individually rotatable relative to movable base 1050 about axis 162 and are rotatable relative to each other about axis 162.

Figure 41:
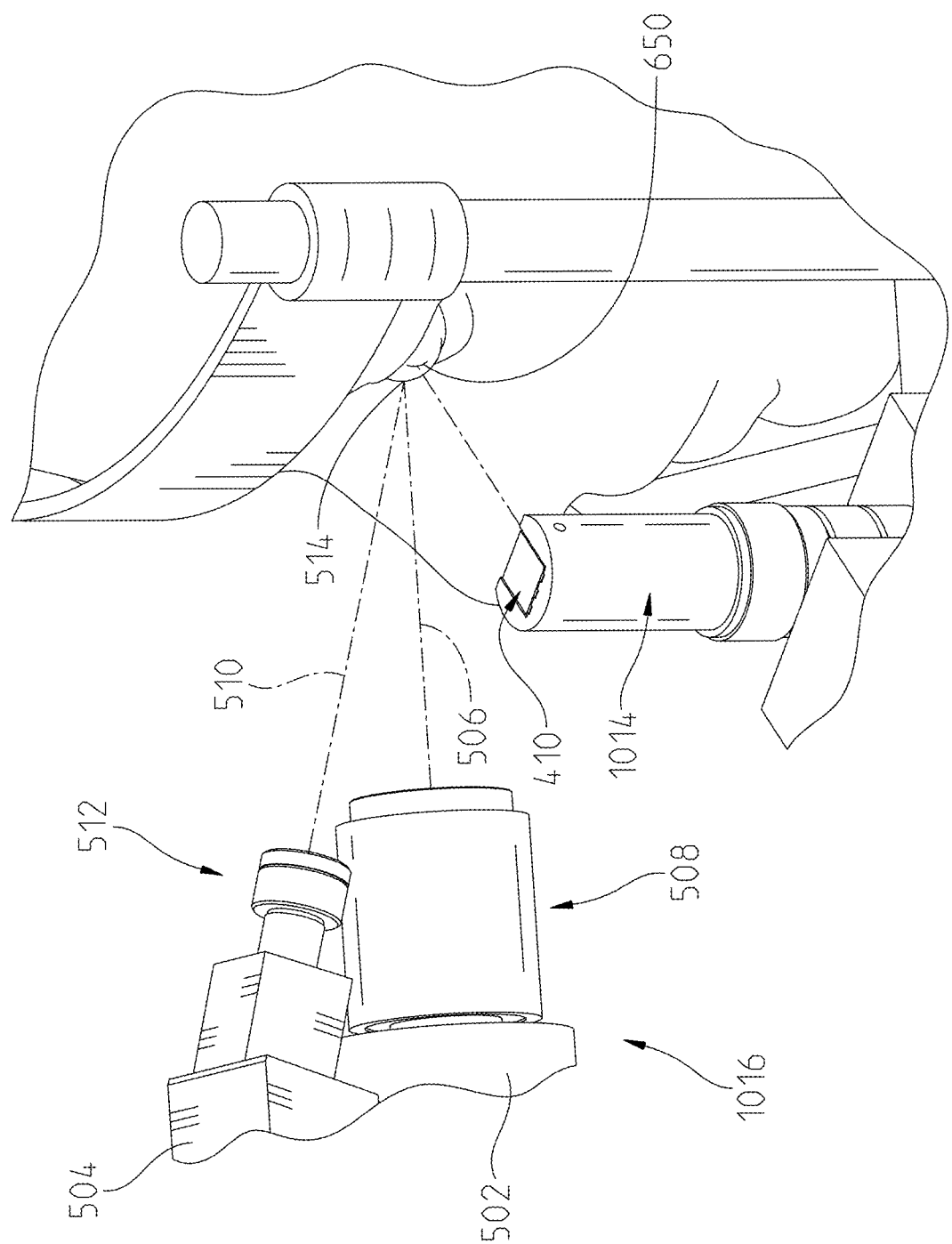
FIG. 41 is a detail view of a portion of the exemplary examination system of FIG. 34 and the eye of a patient.

Referring to FIG. 41, illumination system 1014 is positionable relative to eye 10 to project virtual vertical slit 650 on eye 10. In embodiments, illumination system 1014 includes the components of illumination system 400 and operates as discussed herein. In embodiments, observation system 1016 includes the components of observation system 500 and operates as discussed herein. As shown in FIG. 41, axis 506 of first camera 502 and axis 510 of second camera 504 intersect at location 514.

Figure 42:
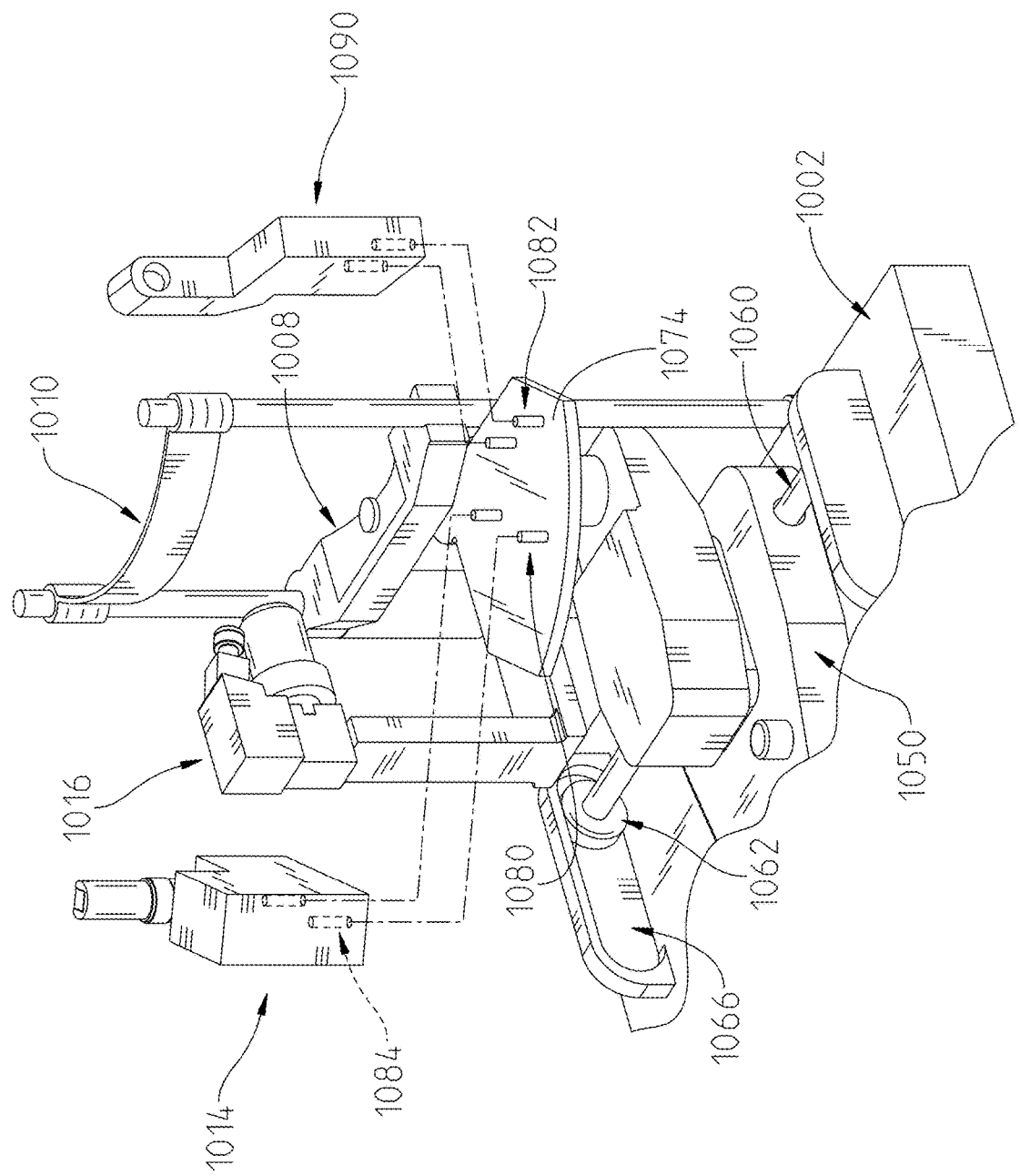
FIG. 42 is a perspective view of the exemplary examination system of FIG. 34 illustrating a mounting system of the illumination system.

Referring to FIG. 42, in embodiments, platform 1074 includes mounts 1080 and 1082, illustratively pins, each of which may interface with corresponding mounts 1084 to secure illumination system 1014 to platform 1074. Thus, illumination system 1014 may be positionable at various locations on platform 1074. Further, additional components, such as a beamsplitter 1090, or other components, such as such as OCT, fundus camera, intraocular lens biometer, topographer, contact or non-contact tonometer, specular microscope (for imaging the endothelium) and other suitable devices. In embodiments, component 1090 may be a support for an additional lens or lenses, such as an aspheric lens to enhance a visualization of the central retina of eye 10 with first camera 502.

The following examples provide non-limiting embodiments of the present disclosure.

Example 1. A medical device for imaging at least a portion of an eye of a patient is provided. The medical device comprising: a patient support adapted to position the eye of the patient; a movable base moveable relative to the patient support; and an illumination system including at least one source producing light to illuminate the eye and an illumination system support arm supporting the at least one source. The illumination system support arm being supported by the moveable base and rotatable relative to the moveable base. The illumination system including a first adjustable optical assembly. The medical device further comprising an observation system including a first camera configured to receive imaging rays produced by reflection of light from the eye of the patient, and an observation system support arm supporting the first camera. The observation system support arm being supported by the moveable base and rotatable relative to the moveable base and rotatable relative to the illumination system support arm. The observation system including a second adjustable optical assembly having an optical axis. The observation system imaging at least one plane which is normal to the optical axis of the second adjustable optical assembly. The medical device further comprising a controller operatively coupled to the first adjustable optical assembly of the illumination system and to the second adjustable optical system of the observation system. The controller configured to adjust the first adjustable optical assembly of the illumination system and the second adjustable optical system of the observation system to a plurality of focal depths relative to the patient support and adjust a rotational position of the illumination system support arm relative to the observation system support arm.

Example 2. The medical device of Example 1, wherein the movable base remains stationary relative to the patient support.

Example 3. The medical device of any one of Examples 1 and 2, wherein the controller is configured to adjust both the first adjustable optical assembly of the illumination system and the second adjustable optical system of the observation system at a first focal depth of the plurality of focal depths relative to the patient support while the movable base remains stationary relative to the patient support; and adjust both the first adjustable optical assembly of the illumination system and the second adjustable optical system of the observation system at a second focal depth of the plurality of focal depths relative to the patient support while the movable base remains stationary relative to the patient support, the second focal depth of the plurality of focal depths being different than the first focal depth of the plurality of focal depths.

Example 4. The medical device of any one of Examples 1 and 2, wherein the controller based on a set of locations to focus each of the first adjustable optical assembly of the illumination system and the second adjustable optical system of the observation system focuses both of the first adjustable optical assembly of the illumination system and the second adjustable optical system of the observation system at a respective focal depth of each location in the set of locations sequentially.

Example 5. The medical device of Example 4, wherein the illumination system projects a test pattern which is focused by the first adjustable optical assembly of the illumination system.

Example 6. The medical device of Example 5, wherein illumination system includes a digital projector which displays the test pattern.

Example 7. The medical device of Example 6, wherein the test pattern includes a vertical slit focused at a first focal depth of the plurality of focal depths for a first subset of the set of locations, the first subset including a first plurality of locations and the controller is configured to project a series of images with the digital projector, each respective image of the series of images having the vertical slit positioned to project to a respective location of the first plurality of locations at the first focal depth.

Example 8. The medical device of Example 7, wherein the first plurality of locations includes a first location of the first plurality of locations having a first transverse position relative to an optical axis of the illumination system and a first image of the series of images includes the vertical slit positioned to project to the first transverse position relative to the optical axis of the illumination system and wherein the first plurality of locations includes a second location of the first plurality of locations having a second transverse position relative to the optical axis of the illumination system, the second transverse position being offset from the first transverse position and a second image of the series of images includes the vertical slit positioned to project to the second transverse location relative to the optical axis of the illumination system.

Example 9. The medical device of Example 6, wherein the test pattern has a first color value in a first image and a second color value in a second image, the second color value being different from the first color value.

Example 10. The medical device of any one of Examples 6-9, wherein the test pattern further includes one or more of a time stamp, a patient name, an indication of nasal and temporal sides of a projected image.

Example 11. The medical device of any one of Examples 6-10, wherein the test pattern further includes a watermark.

Example 12. The medical device of any one of Examples 5, 6, and 9-11, wherein the test pattern includes a vertical slit.

Example 13. The medical device of any one of Examples 5, 6, and 9-11, wherein the test pattern includes multiple slits including a first slit and a second slit spaced apart from the first slit.

Example 14. The medical device of Example 12, wherein the vertical slit is focused at a first focal depth of the plurality of focal depths for a first subset of the set of locations, the first subset including a first plurality of locations.

Example 15. The medical device of Example 14, wherein the first plurality of locations includes a first location of the first plurality of locations having a first transverse position relative to an optical axis of the illumination system and a second location of the first plurality of locations having a second transverse position relative to the optical axis of the illumination system, the second transverse position being offset from the first transverse position.

Example 16. The medical device of Example 12, wherein the illumination system is focused at a first focal depth and a first transverse position offset from an optical axis of the illumination system for a first location of the set of locations and is focused at a second focal depth and a second transverse position offset from the optical axis of the illumination system for a second location of the set of locations, the second focal depth being offset from the first focal depth and the second transverse location being offset from the first transverse location.

Example 17. The medical device of Example 16, wherein the illumination system is focused at the second focal depth and a third transverse position offset from the optical axis of the illumination system for a third location of the set of locations, the third transverse location being offset from the second transverse location.

Example 18. The medical device of Example 17, wherein the observation system is focused along an optical axis of the observation system at the first focal depth for the first location of the set of locations and at the second focal depth for the second location of the set of locations and the third location of the set of locations.

Example 19. The medical device of any one of Examples 1-18, wherein the first adjustable optical assembly of the illumination system includes a first tunable lens.

Example 20. The medical device of any one of Examples 1-19, wherein the first adjustable optical assembly of the illumination system includes a second tunable lens.

Example 21. The medical device of any one of Examples 1-20, wherein the at least one source producing one of a ring of light and a partial ring of light, and wherein the controller is further configured to align the one of the ring of light and the partial ring of light to a limbus of the eye of the patient.

Example 22. The medical device of any one of Examples 1-21, wherein the controller is further configured to determine a movement of the eye during an examination.

Example 23. The medical device of Example 22, wherein the controller based on images captured by the observation system determines the movement of the eye during an examination.

Example 24. The medical device any one of Examples 22 and 23, wherein the controller is further configured to determine a direction and a magnitude of the movement of the eye and adjust the first adjustable optical assembly of the illumination system and the second adjustable optical system of the observation system.

Example 25. The medical device of any one of Examples 1-24, wherein the controller is further configured to determine a blink of the eye during an examination.

Example 26. The medical device of Example 1, wherein the controller is configured to (a) adjust the first adjustable optical assembly to project a first image from a digital projector of the illumination system towards the eye at a first focal depth, the first image including a first vertical slit; (b) adjust the second adjustable optical system of the observation system to the first focal depth; (c) capture a first image with the first camera of the observation system at the first focal depth of the first vertical slit; (d) adjust the first adjustable optical assembly to project the first image from the digital projector of the illumination system towards the eye at a second focal depth, the second focal depth being different than the first focal depth, the first image including the first vertical slit; (e) adjust the second adjustable optical system of the observation system to the second focal depth; and (f) capture a second image with the first camera of the observation system at the second focal depth of the first vertical slit.

Example 27. The medical device of Example 26, wherein each of the movable base, the illumination arm, and the observation arm remain stationary relative to the patient support as the controller executes (a)-(f).

Example 28. The medical device of Example 1, wherein the controller is configured to (a) adjust the first adjustable optical assembly to project a first image from a digital projector of the illumination system towards the eye at a first focal depth, the first image including a first vertical slit; (b) adjust the second adjustable optical system of the observation system to the first focal depth; (c) capture a first image with the first camera of the observation system at the first focal depth of the first vertical slit; (d) adjust the first adjustable optical assembly to project a second image from the digital projector of the illumination system towards the eye at a second focal depth, the second focal depth being different than the first focal depth, the second image including a second vertical slit offset from a location of the first vertical slit in the first image; (e) adjust the second adjustable optical system of the observation system to the second focal depth; and (f) capture a second image with the first camera of the observation system at the second focal depth of the second vertical slit.

Example 29. The medical device of Example 28, wherein each of the movable base, the illumination arm, and the observation arm remain stationary relative to the patient support as the controller executes (a)-(f).

Example 30. A medical device for imaging at least a portion of an eye of a patient is provided. The medical device comprising: a patient support adapted to position the eye of the patient; a movable base movable relative to the patient support; and an illumination system including at least one source producing light to illuminate the eye and an illumination system support arm supporting the at least one source. The illumination system support arm being supported by the movable base and rotatable relative to the movable base. The illumination system including a first adjustable optical assembly. The medical device further comprising an observation system including a first camera configured to receive imaging rays produced by reflection of light from the eye of the patient, and an observation system support arm supporting the first camera. The observation system support arm being supported by the movable base and rotatable relative to the movable base and rotatable relative to the illumination system support arm, the observation system including a second adjustable optical assembly. At least one of the first adjustable optical assembly of the illumination system and the second adjustable optical assembly of the observation system includes a tunable lens. The medical device further comprising a controller operatively coupled to the first adjustable optical assembly of the illumination system and to the second adjustable optical system of the observation system. The controller configured to adjust the first adjustable optical assembly of the illumination system and the second adjustable optical system of the observation system to a plurality of focal depths relative to the patient support; and adjust a rotational position of the illumination system support arm relative to the observation system support arm.

Example 31. The medical device of Example 30, wherein the first adjustable optical assembly of the illumination system includes a first tunable lens.

Example 32. The medical device of any one of Examples 30 and 31, wherein the second adjustable optical assembly of the observation system includes a second tunable lens.

Example 33. The medical device of any one of Examples 30-32, wherein the controller is further configured to determine a movement of the eye during an examination.

Example 34. The medical device of Example 33, wherein the controller based on images captured by the observation system determines the movement of the eye during an examination.

Example 35. The medical device any one of Examples 33 and 34, wherein the controller is further configured to determine a direction and a magnitude of the movement of the eye and adjust the first adjustable optical assembly of the illumination system and the second adjustable optical system of the observation system.

Example 36. The medical device of any one of Examples 30-35, wherein the controller is further configured to determine a blink of the eye during an examination.

Example 37. The medical device of any one of Examples 30-36, wherein the controller is configured to (a) adjust the first adjustable optical assembly to project a first image from a digital projector of the illumination system towards the eye at a first focal depth, the first image including a first vertical slit; (b) adjust the second adjustable optical system of the observation system to the first focal depth; (c) capture a first image with the first camera of the observation system at the first focal depth of the first vertical slit; (d) adjust the first adjustable optical assembly to project the first image from the digital projector of the illumination system towards the eye at a second focal depth, the second focal depth being different than the first focal depth, the first image including the first vertical slit; (e) adjust the second adjustable optical system of the observation system to the second focal depth; and (f) capture a second image with the first camera of the observation system at the second focal depth of the first vertical slit.

Example 38. The medical device of Example 37, wherein each of the movable base, the illumination arm, and the observation arm remain stationary relative to the patient support as the controller executes (a)-(f).

Example 39. The medical device of any one of Examples 30-36, wherein the controller is configured to (a) adjust the first adjustable optical assembly to project a first image from a digital projector of the illumination system towards the eye at a first focal depth, the first image including a first vertical slit; (b) adjust the second adjustable optical system of the observation system to the first focal depth; (c) capture a first image with the first camera of the observation system at the first focal depth of the first vertical slit; (d) adjust the first adjustable optical assembly to project a second image from the digital projector of the illumination system towards the eye at a second focal depth, the second focal depth being different than the first focal depth, the second image including a second vertical slit offset from a location of the first vertical slit in the first image; (e) adjust the second adjustable optical system of the observation system to the second focal depth; and (f) capture a second image with the first camera of the observation system at the second focal depth of the second vertical slit.

Example 40. The medical device of Example 39, wherein each of the movable base, the illumination arm, and the observation arm remain stationary relative to the patient support as the controller executes (a)-(f).

Example 41. A medical device for imaging at least a portion of an eye of a patient is provided. The medical device comprising: a patient support adapted to position the eye of the patient; a movable base moveable relative to the patient support; and an illumination system including at least one source producing light to illuminate the eye and an illumination system support arm supporting the at least one source. The illumination system support arm being supported by the moveable base and rotatable relative to the moveable base. The medical device further comprising an observation system including a plurality of cameras each configured to receive imaging rays produced by reflection of light from the eye of the patient, and at least one observation system support arm supporting the plurality of cameras. The at least one observation system support arm being supported by the moveable base and rotatable relative to the moveable base and rotatable relative to the illumination system support arm. The medical device further comprising a storage device operatively coupled to at least one of the plurality of cameras to receive and store a plurality of images of the eye imaged by the least one of the plurality of cameras; and a controller operatively coupled to the storage device and configured to determine an alignment of the observation system relative to the eye of the patient.

Example 42. The medical device of Example 41, wherein the plurality of cameras includes a first camera and a first optical assembly having a first input optical axis and positioned to provide a first image to the first camera and a second camera and a second optical assembly having a second input optical axis and positioned to provide a second image to the second camera.

Example 43. The medical device of Example 41, wherein the plurality of cameras includes a first camera and a first optical assembly having a first input optical axis and positioned to provide a first image to the first camera, a second camera and a second optical assembly having a second input optical axis and positioned to provide a second image to the second camera, and a third camera and a third optical assembly having a third input optical axis and positioned to provide a third image to the third camera, the second camera and the third camera forming a stereo pair.

Example 44. The medical device of Example 42, wherein each of the first optical assembly and the second optical assembly are positioned to receive imaging rays produced by reflection of light from the eye of the patient.

Example 45. The medical device of any one of Examples 42 and 44, wherein the second input optical axis intersects the first input optical axis at a position within a focal range of the first optical assembly and within a focal range of the second optical assembly.

Example 46. The medical device of Example 45, wherein the first input optical axis and the second input optical axis are vertically aligned.

Example 47. The medical device of any one of Examples 42-46, wherein the illumination system is configured to provide a test pattern to illuminate the portion of the eye of the patient, the first image of the first optical assembly captured by the first camera includes a first portion of a reflection of the test pattern, the second image of the second optical assembly captured by the second camera includes a second portion of the reflection of the test pattern, and the controller is configured to determine the alignment of the observation system relative to the eye based the first portion of the reflection of the test pattern and the second portion of the reflection of the test pattern.

Example 48. The medical device of Example 47, wherein the controller is capable of determining the observation system is aligned with relative to the eye of the patient when the first portion of the reflection of the test pattern and the second portion of the reflection of the test pattern on a reflected test pattern exhibit a first characteristic.

Example 49. The medical device of any one of Examples 47 and 48, wherein the controller is capable of determining the observation system is misaligned with relative to the eye of the patient by being too close to the eye when the first portion of the reflection of the test pattern and the second portion of the reflection of the test pattern on a reflected test pattern exhibit a second characteristic.

Example 50. The medical device of any one of Examples 47-49, wherein the controller is capable of determining the observation system is misaligned with relative to the eye of the patient by being too far from the eye when the first portion of the reflection of the test pattern and the second portion of the reflection of the test pattern on a reflected test pattern exhibit a third characteristic.

Example 51. The medical device of any one of Examples 47-50, wherein the test pattern is a line.

Example 52. The medical device of Example 51, wherein the first characteristic corresponds to the line in the first portion of the reflection of the test pattern being aligned with the line in the second portion of the reflection of the test pattern.

Example 53. The medical device of any one of Examples 51 and 52, wherein the second characteristic corresponds to the line in the first portion of the reflection of the test pattern being misaligned with the line in the second portion of the reflection of the test pattern.

Example 54. The medical device of any one of Examples 51-53, wherein the line in the first portion of the reflection of the test pattern is in a non-overlapping relationship with the line in the second portion of the reflection of the test pattern for each of the first characteristic, the second characteristic, and the third characteristic.

Example 55. The medical device of any of Examples 41-54, wherein the controller is configured to move the movable base relative to the patent support when the observation system is misaligned relative to the eye of the patient.

Example 56. The medical device of any one of Examples 47-55, further comprising a display operatively coupled to the controller to display the first image of the first portion of the reflection of the test pattern and the second image of the second portion of the reflection of the test pattern.

Example 57. The medical device of any one of Examples 47-56, wherein the illumination system includes a digital projector which produces the test pattern.

Example 58. A method of aligning an imaging system to an eye of a patient is provided. The method comprising the steps of: projecting a test pattern on the eye of the patient with an illumination system; receiving a first portion of a reflection of the test pattern from the eye along a first direction with a first camera; receiving a second portion of the reflection of the test pattern from the eye along a second direction with a second camera, a first axis of the first direction intersecting with a second axis of the second direction at an intersection; and moving the first camera and the second camera relative to the eye of the patient until the first portion of the reflection of the test pattern and the second portion of the reflection of the test pattern have a first characteristic.

Example 59. The method of Example 58, further comprising displaying the first portion of the reflection of the test pattern and the second portion of the reflection of the test pattern on a display.

Example 60. The method of any one of Examples 58 and 59, further comprising the steps of supporting the illumination system, the first camera, and the second camera on a movable base such that the illumination system, the first camera and the second camera move as a unit relative to the eye of the patient.

Example 61. The method of any one of Examples 58-60, wherein the test pattern includes an elongated feature having a longitudinal axis in a third direction, the third direction being normal to a plane defined by the first direction and the second direction and passing through the intersection of the first axis and the second axis.

Example 62. The method of Example 61, wherein the first portion of the reflection of the test pattern includes a first portion of the elongated feature of the test pattern and the second portion of the reflection of the test pattern includes a second portion of the elongated feature of the test pattern.

Example 63. The method of Example 62, wherein the first characteristic corresponds to the first portion of the elongated feature of the test pattern and the second portion of the elongated feature of the test pattern being aligned along a fourth direction normal to the third direction and in the plane.

Example 64. The method of Example 62, wherein the first portion of the elongated feature of the test pattern and the second portion of the elongated feature of the test pattern are aligned along a fourth direction normal to the third direction and in the plane indicating that the first camera and the second camera are aligned to a surface of a cornea of the eye of the patient.

Example 65. The method of any one of Examples 62 and 63, wherein the first portion of the elongated feature of the test pattern and the second portion of the elongated feature of the test pattern are offset along the fourth direction in a second characteristic indicating that at least one of the first camera and the second camera are misaligned to the eye of the patient.

Example 66. The method of any one of Examples 58-65, wherein the step of moving the first camera and the second camera relative to the eye of the patient until the first portion of the reflection of the test pattern and the second portion of the reflection of the test pattern have the first characteristic includes receiving a manual input to a support of at least one of the first camera and the second camera to reposition the at least one of the first camera and the second camera relative to the eye of the patient.

Example 67. The method of any one of Examples 58-65, wherein the step of moving the first camera and the second camera relative to the eye of the patient until the first portion of the reflection of the test pattern and the second portion of the reflection of the test pattern have the first characteristic includes actuating a positioning system of the first camera and the second camera with a movement command from a controller based on the first portion of the reflection of the test pattern and the second portion of the reflection of the test pattern having a characteristic different from the first characteristic.

Example 68. The method of any one of Examples 58-67, wherein the step of projecting the test pattern on the eye of the patient with the illumination system includes programming a digital projector to display the test pattern.

Example 69. The method of any one of Examples 58-68, wherein the test pattern is a horizontal line.

Example 70. A medical device for imaging at least a portion of an eye of a patient is provided. The medical device comprising: an illumination system configured to project a test pattern on the eye of the patient; a first camera positioned to capture a first image of a first portion of a reflection of the test pattern from the eye along a first direction; a second camera positioned to capture a second image of a second portion of the reflection of the test pattern from the eye along a second direction; and a display to configured to display at the same time at least a first portion the test pattern based on the first image and a second portion of the test pattern based on the second image to provide an indication of an alignment state of the first camera and the second camera relative to the eye of the patient.

Example 71. The medical device of Example 70, wherein if the first portion of the test pattern is aligned with the second portion of the test pattern on the display then the alignment state of the first camera and the second camera relative to the eye of the patient is aligned.

Example 72. The medical device of any one of Examples 70 and 71, wherein if the first portion of the test pattern is offset relative to the second portion of the test pattern on the display then the alignment state of the first camera and the second camera relative to the eye of the patient is misaligned.

Example 73. The medical device of any one of Examples 70-72, wherein the test pattern includes an elongated feature having a longitudinal axis in a third direction.

Example 74. The medical device of Example 73, wherein the third direction is normal to a plane defined by the first direction and the second direction.

Example 75. The medical device of any one of Examples 73 and 74, wherein the first portion of the test pattern based on the first image includes a first portion of the elongated feature and the second portion of the test pattern based on the second image includes a second portion of the elongated feature.

Example 76. The medical device of Example 75, wherein the first portion of the elongated feature and the second portion of the elongated feature of the test pattern are aligned along the third direction when the alignment state of the first camera and the second camera relative to the eye of the patient is aligned.

Example 77. The medical device of any one of Examples 75 and 76, wherein the first portion of the elongated feature and the second portion of the elongated feature of the test pattern are offset in a fourth direction normal to the third direction when the alignment state of the first camera and the second camera relative to the eye of the patient is misaligned.

Example 78. The medical device of Example 77, wherein when the second portion of the elongated feature of the test pattern is offset to a first side of the first portion of the elongated feature the first camera and the second camera are too close relative to the eye of the patient and when the second portion of the elongated feature of the test pattern is offset to a second side of the first portion of the elongated feature, the second side being opposite the first side, the first camera and the second camera are too far relative to the eye of the patient Example 79. The medical device of any one of Examples 72-78, further comprising a movable base supporting the illumination system, the first camera, and the second camera.

Example 80. The medical device of any one of Examples 70-79, wherein the illumination system includes a digital projector programmed to display the test pattern which is projected by an optical system of the illumination system.

Example 81. The medical device of any one of Examples 70-80, wherein the test pattern is a horizontal line.

Example 82. A medical device for imaging at least a portion of an eye of a patient is provided. The medical device comprising: a patient support adapted to position the eye of the patient; a movable base moveable relative to the patient support; an illumination system including a digital projector producing at least one image to illuminate the eye and an illumination system support arm supporting the at least one source. The illumination system support arm being supported by the moveable base and rotatable relative to the moveable base. The illumination system including a first adjustable optical assembly. The medical device further comprising an observation system including a first camera configured to receive imaging rays produced by reflection of light from the eye of the patient, and an observation system support arm supporting the first camera. The observation system support arm being supported by the moveable base and rotatable relative to the moveable base and rotatable relative to the illumination system support arm, the observation system including a second adjustable optical assembly. The medical device further comprising a controller operatively coupled to the first adjustable optical assembly of the illumination system and to the second adjustable optical system of the observation system. The controller configured to adjust the first adjustable optical assembly of the illumination system and the second adjustable optical system of the observation system to a plurality of focal depths relative to the patient support while the movable base remains stationary relative to the patient support, wherein a first subset of the plurality of focal depths are part of a first contour and a second subset of the plurality of focal depths are part of a second contour, the second contour being offset relative to the first contour, and wherein the digital projector produces a first image having a first vertical slit for a first focal depth of the first subset of the plurality of focal depths and a first focal depth of second subset of the plurality of focal depths and the digital projector produces a second image having a second vertical slit, offset relative to a location of the first vertical slit in the first image, for a second focal depth of the first subset of the plurality of focal depths and a second focal depth of second subset of the plurality of focal depths.

Example 83. The medical device of Example 82, wherein the first contour has a first shape and the second contour has a second shape, the second shape being different than the first shape.

Example 84. The medical device of Example 83, wherein the second shape is flatter than the first shape.

Example 85. The medical device of any one of Examples 82-84, wherein the first adjustable optical assembly of the illumination system includes a first tunable lens.

Example 86. The medical device of any one of Examples 82-85, wherein the second adjustable optical assembly of the observation system includes a second tunable lens.

Example 87. The medical device of any one of Examples 82-86, wherein the controller is further configured to determine a movement of the eye during an examination.

Example 88. The medical device of Example 87, wherein the controller based on images captured by the observation system determines the movement of the eye during an examination.

Example 89. The medical device any one of Examples 87 and 88, wherein the controller is further configured to determine a direction and a magnitude of the movement of the eye and adjust the first adjustable optical assembly of the illumination system and the second adjustable optical system of the observation system.

Example 90. The medical device of any one of Examples 82-89, wherein the controller is further configured to determine a blink of the eye during an examination.

Example 91. A medical device for imaging at least a portion of an eye of a patient is provided. The medical device comprising: a patient support adapted to position the eye of the patient; a movable base moveable relative to the patient support; and an illumination system including at least one source producing light to illuminate the eye and an illumination system support arm supporting the at least one source. The illumination system support arm being supported by the moveable base and rotatable relative to the moveable base, the at least one source producing one of a ring of light and a partial ring of light. The medical device further comprising an observation system including a first camera configured to receive imaging rays produced by reflection of light from the eye of the patient, and an observation system support arm supporting the first camera. The observation system support arm being supported by the moveable base and rotatable relative to the moveable base and rotatable relative to the illumination system support arm.

Example 92. The medical device of Example 91, further comprising a controller operatively coupled to the at least one source, the controller configured to align the one of the ring of light and the partial ring of light to the limbus.

Example 93. The medical device of any one of Examples 91 and 92, wherein the illumination system including a first adjustable optical assembly.

Example 94. The medical device of any one of Examples 91-93, wherein the observation system including a second adjustable optical assembly.

Example 95. The medical device of any one of Examples 91-94, wherein the at least one source is a digital projector.

Example 96. A medical device for imaging at least a portion of an eye of a patient is provided. The medical device comprising: an illumination system including a digital projector producing at least one image to illuminate the eye and a first adjustable optical assembly to project the at least one image towards the eye; and an observation system including a second adjustable optical assembly positioned to receive imaging rays produced by reflection of light from the eye of the patient due to the projection of the at least one image towards the eye by the illumination system and a first camera configured receive the imaging rays from the second adjustable optical assembly. The illumination system and the observation system being positioned in a first spatial configuration with an optical axis of the first adjustable optical assembly and an optical axis of the second optical assembly intersecting at an apex of a cornea of the eye. The medical device further comprising a controller operatively coupled to the illumination system and to the observation system. The controller configured to adjust the first adjustable optical assembly of the illumination system and the second adjustable optical system of the observation system to a plurality of focal depths relative to the eye while the illumination system and observation system are in the first spatial configuration.

Example 97. The medical device of Example 96, wherein the at least one image includes a test pattern.

Example 98. The medical device of Example 97, wherein the test pattern includes a vertical slit and in a first image of the at least one image the vertical slit is in a first transverse position and in a second image of the at least one image the vertical slit is in a second transverse position, the second traverse position in second image of the at least one image being spaced apart from the first transverse position in the first image.

Example 99. The medical device of Example 98, wherein the controller focuses the first adjustable optical assembly of the illumination system at a first focal depth of the plurality of focal depths when the first image of the at least one image is produced by the digital projector to focus the vertical slit in the first transverse position on the cornea at a first location offset from the apex of the cornea and focuses the first adjustable optical assembly of the illumination system at a second focal depth of the plurality of focal depths when the second image of the at least one image is produced by the digital projector to focus the vertical slit in the second transverse position on the cornea at a second location offset from the apex of the cornea, the second location on the cornea being offset from the first location on the cornea.

Example 100. The medical device of Example 99, wherein the controller further focuses the second adjustable optical assembly of the observation system at the first focal depth of the plurality of focal depths when the first image of the at least one image is produced by the digital projector to focus the vertical slit in the first transverse position on the cornea at the first location offset from the apex of the cornea and focuses the second adjustable optical assembly of the observation system at the second focal depth of the plurality of focal depths when the second image of the at least one image is produced by the digital projector to focus the vertical slit in the second transverse position on the cornea at the second location offset from the apex of the cornea.

Example 101. The medical device of Example 98, wherein the controller is configured to adjust the first adjustable optical assembly of the illumination system and the second adjustable optical system of the observation system to a plurality of focal depths relative to the apex of the cornea while the illumination system and observation system are in the first spatial configuration, wherein a first subset of the plurality of focal depths are part of a first contour and a second subset of the plurality of focal depths are part of a second contour, the second contour being offset relative to the first contour, and wherein the digital projector produces the first image having the vertical slit in the first transverse position for a first focal depth of the first subset of the plurality of focal depths of the first contour and a first focal depth of second subset of the plurality of focal depths of the second contour and the digital projector produces the second image having the vertical slit in the second transverse position for a second focal depth of the first subset of the plurality of focal depths and a second focal depth of second subset of the plurality of focal depths.

Example 102. The medical device of Example 101, wherein the first contour has a first shape and the second contour has a second shape, the second shape being different than the first shape.

Example 103. The medical device of Example 102, wherein the second shape is flatter than the first shape.

Example 104. The medical device of any one of Examples 96-103, wherein the first adjustable optical assembly of the illumination system includes a first tunable lens.

Example 105. The medical device of any one of Examples 96-104, wherein the second adjustable optical assembly of the observation system includes a second tunable lens.

Example 106. The medical device of Example 97, wherein the test pattern has a first color value in a first image and a second color value in a second image, the second color value being different from the first color value.

Example 107. The medical device of any one of Examples 97-106, wherein the test pattern further includes one or more of a time stamp, a patient name, an indication of nasal and temporal sides of a projected image.

Example 108. The medical device of any one of Examples 97-107, wherein the test pattern further includes a watermark.

Example 109. The medical device of Example 97, wherein the test pattern includes multiple slits including a first slit and a second slit spaced apart from the first slit.

Example 110. The medical device of any one of Examples 96-109, wherein the controller is further configured to determine a movement of the eye during an examination.

Example 111. The medical device of Example 110, wherein the controller based on images captured by the observation system determines the movement of the eye during an examination.

Example 112. The medical device any one of Examples 110 and 111, wherein the controller is further configured to determine a direction and a magnitude of the movement of the eye and adjust the first adjustable optical assembly of the illumination system and the second adjustable optical system of the observation system.

Example 113. The medical device of any one of Examples 96-112, wherein the controller is further configured to determine a blink of the eye during an examination.

Example 114. The medical device of any one of Examples 96-113, further comprising a base, the illumination system being coupled to the base and the observation system being coupled to the base.

Example 115. The medical device of Example 114, wherein the illumination system is movable relative to the base.

Example 116. The medical device of any one of Examples 114 and 115, wherein the illumination system is movable relative to the observation system.

Example 117. The medical device of Example 116, wherein the illumination system is rotatable relative to the base about a first rotation axis.

Example 118. The medical device of Example 117, wherein the illumination system includes an illumination system support arm supporting the at least one source.

Example 119. The medical device of any one of Examples 117 and 118, wherein the observation system is rotatable relative to the base about the first rotation axis.

Example 120. The medical device of Example 119, wherein the observation system includes an observation system support arm supporting the first camera.

Example 121. The medical device of Example 116, further comprising a patient support adapted to position the eye of the patient. The base is a movable base moveable relative to the patient support. The illumination system further includes an illumination system support arm supporting the at least one source. The illumination system support arm being supported by the moveable base and rotatable relative to the moveable base. The observation system further includes an observation system support arm supporting the first camera. The observation system support arm being supported by the moveable base and rotatable relative to the moveable base and rotatable relative to the illumination system support arm.

Example 122. The medical device of any one of Examples 114-120, further comprising a patient support adapted to position the eye of the patient, and wherein the base is a movable base movable relative to the patient support.

Example 123. A method of examining an eye of a patient is provided. The method comprising the steps of: positioning an illumination system and an observation system in a first spatial configuration relative to the eye, the first spatial configuration having an optical axis of a first adjustable optical assembly of the illumination system and an optical axis of a second optical assembly of the observation system intersecting at an apex of a cornea of the eye; and while maintaining the illumination system and the observation system in the first spatial configuration performing the following steps: (a) projecting with the first adjustable optical assembly a first image from a digital projector towards the eye at a first focal depth relative to the apex of the cornea of the eye, the first image including a vertical slit in a first transverse position, (b) receiving light reflected by the eye from the projecting step (a) with a first camera through the second adjustable optical assembly with the second adjustable optical assembly focused at the first focal depth relative to the apex of the cornea of the eye, (c) projecting with the first adjustable optical assembly the first image from the digital projector towards the eye at a second focal depth relative to the apex of the cornea of the eye, the second focal depth being different than the first focal depth, the first image including the vertical slit in the first transverse position, and (d) receiving light reflected by the eye from the projecting step (c) with the first camera through the second adjustable optical assembly with the second adjustable optical assembly focused at the second focal depth relative to the apex of the cornea of the eye.

Example 124. A method of examining an eye of a patient is provided. The method comprising the steps of: positioning an illumination system and an observation system in a first spatial configuration relative to the eye, the first spatial configuration having an optical axis of a first adjustable optical assembly of the illumination system and an optical axis of a second optical assembly of the observation system intersecting at an apex of a cornea of the eye; and while maintaining the illumination system and the observation system in the first spatial configuration performing the following steps: (a) projecting with the first adjustable optical assembly a first image from a digital projector towards the eye at a first focal depth relative to the apex of the cornea of the eye, the first image including a vertical slit in a first transverse position, (b) receiving light reflected by the eye from the projecting step (a) with a first camera through the second adjustable optical assembly with the second adjustable optical assembly focused at the first focal depth relative to the apex of the cornea of the eye, (c) projecting with the first adjustable optical assembly a second image from the digital projector towards the eye at a second focal depth relative to the apex of the cornea of the eye, the second focal depth being different than the first focal depth, the second image including the vertical slit in the second transverse position, the second transverse position being offset from the first transverse position, and (d) receiving light reflected by the eye from the projecting step (c) with the first camera through the second adjustable optical assembly with the second adjustable optical assembly focused at the second focal depth relative to the apex of the cornea of the eye.

Example 125. A medical device for imaging at least a portion of an eye of a patient is provided. The medical device comprising: a patient support adapted to position the eye of the patient; a movable base moveable relative to the patient support; an illumination system including at least one source producing light to illuminate the eye and an illumination system support arm supporting the at least one source; an observation system including a plurality of cameras each configured to receive imaging rays produced by reflection of light from the eye of the patient, and at least one observation system support arms supporting the imaging system; a storage device operatively coupled to at least one of the plurality of cameras to receive and store a plurality of images of the eye imaged by the least one of the plurality of cameras; and a controller operatively coupled to the storage device and configured to determine an alignment of the observation system relative to the eye of the patient. The illumination system support arm being supported by the moveable base and rotatable relative to the moveable base. The at least one observation system support arm being supported by the moveable base and rotatable relative to the moveable base and rotatable relative to the illumination system support arm.

Example 126. The medical device of Example 125, wherein the plurality of cameras includes a first camera and a first optical assembly having a first input optical axis and positioned to provide a first image to the first camera and a second camera and a second optical assembly having a second input optical axis and positioned to provide a second image to the second camera.

Example 127. The medical device of Example 125, wherein the plurality of cameras includes a first camera and a first optical assembly having a first input optical axis and positioned to provide a first image to the first camera, a second camera and a second optical assembly having a second input optical axis and positioned to provide a second image to the second camera, and a third camera and a third optical assembly having a third input optical axis and positioned to provide a third image to the third camera, the second camera and the third camera forming a stereo pair.

Example 128. The medical device of Example 125, wherein each of the first optical assembly and the second optical assembly are positioned to receive imaging rays produced by reflection of light from the eye of the patient.

Example 129. The medical device of any one of Examples 126 and 128, wherein the second input optical axis intersects the first input optical axis at a position within a focal range of the first camera and within a focal range of the second camera.

Example 130. The medical device of Example 129, wherein the first input optical axis and the second input optical axis are vertically aligned.

Example 131. The medical device of any one of Examples 126-130, wherein the illumination system is configured to provide a test pattern to illuminate the portion of the eye of the patient, the first image of the first optical assembly captured by the first camera includes a first portion of a reflection of the test pattern. The second image of the second optical assembly captured by the second camera includes a second portion of the reflection of the test pattern. The controller is configured to determine the alignment of the observation system relative to the eye based the first portion of the reflection of the test pattern and the second portion of the reflection of the test pattern.

Example 132. The medical device of Example 131, wherein the controller is capable of determining the observation system is aligned with relative to the eye of the patient when the first portion of the reflection of the test pattern and the second portion of the reflection of the test pattern on a reflected test pattern exhibit a first characteristic.

Example 133. The medical device of any one of Examples 131 and 132, wherein the controller is capable of determining the observation system is misaligned with relative to the eye of the patient by being too close to the eye when the first portion of the reflection of the test pattern and the second portion of the reflection of the test pattern on a reflected test pattern exhibit a second characteristic.

Example 134. The medical device of any one of Examples 131-133, wherein the controller is capable of determining the observation system is misaligned with relative to the eye of the patient by being too far from the eye when the first portion of the reflection of the test pattern and the second portion of the reflection of the test pattern on a reflected test pattern exhibit a third characteristic.

Example 135. The medical device of any one of Examples 131-134, wherein the test pattern is a line.

Example 136. The medical device of Example 135, wherein the first characteristic corresponds to the line in the first portion of the reflection of the test pattern being aligned with the line in the second portion of the reflection of the test pattern.

Example 137. The medical device of any one of Examples 135 and 12, wherein the second characteristic corresponds to the line in the first portion of the reflection of the test pattern being misaligned with the line in the second portion of the reflection of the test pattern.

Example 138. The medical device of any one of Examples 135-137, wherein the line in the first portion of the reflection of the test pattern is in a non-overlapping relationship with the line in the second portion of the reflection of the test pattern for each of the first characteristic, the second characteristic, and the third characteristic.

Example 139. The medical device of any of Examples 125-138, wherein the controller is configured to move the movable base relative to the patent support when the observation system is misaligned relative to the eye of the patient.

Example 140. The medical device of any one of Examples 131-139, further comprising a display operatively coupled to the controller to display the first image of the first portion of the reflection of the test pattern and the second image of the second portion of the reflection of the test pattern.

Example 141. The medical device of any one of Examples 131-140, wherein the illumination system includes a digital light projector which produces the test pattern.

Various modifications and additions can be made to the exemplary embodiments. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations of the disclosed embodiments together with all equivalents thereof.

We claim:

1. A medical device for imaging at least a portion of an eye of a patient, the medical device comprising:
    an illumination system including a digital projector producing at least one image to illuminate the eye and a first adjustable optical assembly to project the at least one image towards the eye;
    an observation system including a second adjustable optical assembly positioned to receive imaging rays produced by reflection of light from the eye of the patient due to the projection of the at least one image towards the eye by the illumination system and a first camera configured receive the imaging rays from the second adjustable optical assembly, the illumination system and the observation system being positioned in a first spatial configuration with an optical axis of the first adjustable optical assembly and an optical axis of the second optical assembly intersecting at an apex of a cornea of the eye; and
    a controller operatively coupled to the illumination system and to the observation system, the controller configured to adjust the first adjustable optical assembly of the illumination system and the second adjustable optical system of the observation system to a plurality of focal depths relative to the eye while the illumination system and observation system are in the first spatial configuration.

2. The medical device of claim 1, wherein the at least one image includes a test pattern.

3. The medical device of claim 2, wherein the test pattern includes a vertical slit and in a first image of the at least one image the vertical slit is in a first transverse position and in a second image of the at least one image the vertical slit is in a second transverse position, the second traverse position in second image of the at least one image being spaced apart from the first transverse position in the first image.

4. The medical device of claim 3, wherein the controller focuses the first adjustable optical assembly of the illumination system at a first focal depth of the plurality of focal depths when the first image of the at least one image is produced by the digital projector to focus the vertical slit in the first transverse position on the cornea at a first location offset from the apex of the cornea and focuses the first adjustable optical assembly of the illumination system at a second focal depth of the plurality of focal depths when the second image of the at least one image is produced by the digital projector to focus the vertical slit in the second transverse position on the cornea at a second location offset from the apex of the cornea, the second location on the cornea being offset from the first location on the cornea.

5. The medical device of claim 4, wherein the controller further focuses the second adjustable optical assembly of the observation system at the first focal depth of the plurality of focal depths when the first image of the at least one image is produced by the digital projector to focus the vertical slit in the first transverse position on the cornea at the first location offset from the apex of the cornea and focuses the second adjustable optical assembly of the observation system at the second focal depth of the plurality of focal depths when the second image of the at least one image is produced by the digital projector to focus the vertical slit in the second transverse position on the cornea at the second location offset from the apex of the cornea.

6. The medical device of claim 3, wherein the controller is configured to adjust the first adjustable optical assembly of the illumination system and the second adjustable optical system of the observation system to a plurality of focal depths relative to the apex of the cornea while the illumination system and observation system are in the first spatial configuration, wherein a first subset of the plurality of focal depths are part of a first contour and a second subset of the plurality of focal depths are part of a second contour, the second contour being offset relative to the first contour, and wherein the digital projector produces the first image having the vertical slit in the first transverse position for a first focal depth of the first subset of the plurality of focal depths of the first contour and a first focal depth of second subset of the plurality of focal depths of the second contour and the digital projector produces the second image having the vertical slit in the second transverse position for a second focal depth of the first subset of the plurality of focal depths and a second focal depth of second subset of the plurality of focal depths.

7. The medical device of claim 6, wherein the first contour has a first shape and the second contour has a second shape, the second shape being different than the first shape.

8. The medical device of claim 7, wherein the second shape is flatter than the first shape.

9. The medical device of claim 1, wherein the first adjustable optical assembly of the illumination system includes a first tunable lens.

10. The medical device of claim 1, wherein the second adjustable optical assembly of the observation system includes a second tunable lens.

11. The medical device of claim 2, wherein the test pattern has a first color value in a first image and a second color value in a second image, the second color value being different from the first color value.

12. The medical device of claim 2, wherein the test pattern further includes one or more of a time stamp, a patient name, an indication of nasal and temporal sides of a projected image.

13. The medical device of claim 2, wherein the test pattern further includes a watermark.

14. The medical device of claim 2, wherein the test pattern includes multiple slits including a first slit and a second slit spaced apart from the first slit.

15. The medical device of claim 1, wherein the controller is further configured to determine a movement of the eye during an examination.

16. The medical device of claim 15, wherein the controller based on images captured by the observation system determines the movement of the eye during an examination.

17. The medical device of claim 15, wherein the controller is further configured to determine a direction and a magnitude of the movement of the eye and adjust the first adjustable optical assembly of the illumination system and the second adjustable optical system of the observation system.

18. The medical device of claim 1, wherein the controller is further configured to determine a blink of the eye during an examination.

19. The medical device of claim 1, further comprising a base, the illumination system being coupled to the base and the observation system being coupled to the base.

20. The medical device of claim 19, wherein the illumination system is movable relative to the base.

21. The medical device of claim 19, wherein the illumination system is movable relative to the observation system.

22. The medical device of claim 21, wherein the illumination system is rotatable relative to the base about a first rotation axis.

23. The medical device of claim 22, wherein the illumination system includes an illumination system support arm supporting the at least one source.

24. The medical device of claim 22, wherein the observation system is rotatable relative to the base about the first rotation axis.

25. The medical device of claim 24, wherein the observation system includes an observation system support arm supporting the first camera.

26. The medical device of claim 21, further comprising a patient support adapted to position the eye of the patient, wherein
the base is a movable base moveable relative to the patient support,
the illumination system further includes an illumination system support arm supporting the at least one source, the illumination system support arm being supported by the moveable base and rotatable relative to the moveable base, and
the observation system further includes an observation system support arm supporting the first camera, the observation system support arm being supported by the moveable base and rotatable relative to the moveable base and rotatable relative to the illumination system support arm.

27. The medical device of claim 19, further comprising a patient support adapted to position the eye of the patient, and wherein the base is a movable base movable relative to the patient support.

* * * * *